US012627830B2

(12) United States Patent
Sato

(10) Patent No.: US 12,627,830 B2
(45) Date of Patent: May 12, 2026

(54) IMAGE PROCESSING APPARATUS AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 18/131,591

(22) Filed: Apr. 6, 2023

(65) Prior Publication Data

US 2023/0247217 A1 Aug. 3, 2023

Related U.S. Application Data

(63) Continuation of application No. 16/386,739, filed on Apr. 17, 2019, now abandoned, which is a (Continued)

(30) Foreign Application Priority Data

Nov. 10, 2011 (JP) ................................. 2011-246543
Nov. 11, 2011 (JP) ................................. 2011-247489

(51) Int. Cl.
H04N 7/32 (2006.01)
H04N 19/503 (2014.01)
(Continued)

(52) U.S. Cl.
CPC ........... H04N 19/52 (2014.11); H04N 19/503 (2014.11); H04N 19/593 (2014.11); *H04N 19/33* (2014.11); *H04N 19/597* (2014.11)

(58) Field of Classification Search
CPC ........... H04N 19/00696; H04N 19/503; H04N 19/593; H04N 19/52; H04N 19/597; H04N 19/33
See application file for complete search history.

(56) References Cited

U.S. PATENT DOCUMENTS 6,167,092 A * 12/2000 Lengwehasatit ...... G06F 17/147
382/250
6,275,533 B1 * 8/2001 Nishi ..................... H04N 19/18
375/E7.15
(Continued)

FOREIGN PATENT DOCUMENTS

CN 101188766 A 5/2008
CN 101677406 A 3/2010
(Continued)

OTHER PUBLICATIONS

Bross et al. "WD4: Working Draft 4 of High-Efficiency Video Coding", Jul. 14-22, 2011 (Year: 2011).*
(Continued)

*Primary Examiner* — Philip P. Dang
(74) *Attorney, Agent, or Firm* — Paratus Law Group, PLLC

(57) ABSTRACT

The present disclosure relates to an image processing apparatus and an image processing method capable of improving processing efficiency with pipeline processing in encoding or decoding of a motion vector. In a motion vector encoding unit, such configuration is adopted that when a spatial prediction motion vector is derived according to AMVP or Merge mode, the use of a motion vector of a PU adjacent to a top right of a PU in question is prohibited. Therefore, the motion vector encoding unit performs encoding processing of a motion vector by using only motion vector information of B1, B2 which are PUs located at Top with respect to the PU in question and A0, A1 which are PUs located at Left with respect to the PU in question. The present disclosure can be applied to, for example, an image processing apparatus.

9 Claims, 29 Drawing Sheets

Related U.S. Application Data continuation of application No. 14/348,097, filed as application No. PCT/JP2012/078427 on Nov. 2, 2012, now Pat. No. 10,616,599.

(51) Int. Cl.

| *H04N 19/52* | (2014.01) |
|---|---|
| *H04N 19/593* | (2014.01) |
| *H04N 19/33* | (2014.01) |
| *H04N 19/597* | (2014.01) |

(56)  References Cited

U.S. PATENT DOCUMENTS

| 6,570,510 B2 * | 5/2003 | Chen | H04N 19/645 |
| | | | 341/51 |
| 6,788,811 B1 * | 9/2004 | Matsuura | H04N 11/044 |
| | | | 348/438.1 |
| 6,842,483 B1 * | 1/2005 | Au | H04N 19/57 |
| | | | 375/E7.122 |
| 7,146,475 B2 * | 12/2006 | Perego | G06F 3/0617 |
| | | | 711/112 |
| 7,212,570 B2 * | 5/2007 | Akiyama | H04N 19/61 |
| | | | 375/E7.199 |
| 7,248,735 B2 * | 7/2007 | Funakubo | H04N 19/129 |
| | | | 375/E7.093 |
| 7,627,040 B2 * | 12/2009 | Woods | H04N 19/63 |
| | | | 375/240.26 |
| 7,653,133 B2 * | 1/2010 | Woods | H04N 19/107 |
| | | | 382/238 |
| 7,660,354 B2 * | 2/2010 | Shi | H04N 19/577 |
| | | | 375/240.15 |
| 7,702,013 B2 * | 4/2010 | Schwarz | H04N 19/93 |
| | | | 375/240.02 |
| 7,782,951 B2 * | 8/2010 | Muthukrishnan | H04N 19/53 |
| | | | 375/240.15 |
| 7,924,920 B2 * | 4/2011 | Hsu | H04N 19/117 |
| | | | 375/240.15 |
| 8,634,457 B2 * | 1/2014 | Lee | H04N 19/593 |
| | | | 375/240.12 |
| 8,660,176 B2 * | 2/2014 | Lee | H04N 19/112 |
| | | | 375/240.03 |
| 8,724,697 B2 * | 5/2014 | Lee | H04N 19/42 |
| | | | 375/240.06 |
| 8,861,617 B2 * | 10/2014 | Chen | H04N 19/147 |
| | | | 375/240.26 |
| 8,976,870 B1 * | 3/2015 | Cismas | H04N 19/52 |
| | | | 375/240.24 |
| 9,924,181 B2 * | 3/2018 | Chuang | H04N 19/33 |
| 10,097,810 B2 * | 10/2018 | Schwarz | H04N 19/597 |
| 10,212,419 B2 * | 2/2019 | Hinz | H04N 19/82 |
| 10,616,599 B2 * | 4/2020 | Sato | H04N 19/593 |
| 10,694,165 B2 * | 6/2020 | Schwarz | H04N 19/52 |
| 2005/0053147 A1 * | 3/2005 | Mukerjee | H04N 19/13 |
| | | | 375/E7.176 |
| 2005/0089097 A1 * | 4/2005 | Kuo | H04N 19/423 |
| | | | 375/E7.123 |
| 2005/0144517 A1 * | 6/2005 | Zayas | G06F 12/0866 |
| | | | 711/E12.019 |
| 2006/0012468 A1 * | 1/2006 | Finley | G01S 7/022 |
| | | | 340/438 |
| 2006/0062304 A1 * | 3/2006 | Hsia | H04N 19/176 |
| | | | 375/E7.176 |
| 2006/0193388 A1 * | 8/2006 | Woods | H04N 19/615 |
| | | | 375/E7.072 |
| 2007/0100967 A1 * | 5/2007 | Smith | G06F 8/20 |
| | | | 709/219 |
| 2007/0140590 A1 * | 6/2007 | Kimura | H04N 19/86 |
| | | | 382/275 |
| 2008/0037624 A1 * | 2/2008 | Walker | H04N 19/463 |
| | | | 375/E7.149 |
| 2008/0049845 A1 * | 2/2008 | Liu | H04N 19/137 |
| | | | 375/E7.176 |

| 2008/0056349 A1 * | 3/2008 | Lyashevsky | H04N 19/86 |
| | | | 375/240.1 |
| 2008/0056350 A1 * | 3/2008 | Lyashevsky | H04N 19/86 |
| | | | 375/240.1 |
| 2008/0056363 A1 * | 3/2008 | Lyashevsky | H04N 19/85 |
| | | | 375/E7.181 |
| 2008/0056364 A1 * | 3/2008 | Lyashevsky | H04N 19/85 |
| | | | 375/E7.181 |
| 2008/0229371 A1 * | 9/2008 | Mick | H04N 21/23473 |
| | | | 725/87 |
| 2008/0247462 A1 * | 10/2008 | Demos | H04N 19/63 |
| | | | 375/240.03 |
| 2008/0291995 A1 * | 11/2008 | Graham | H04N 19/156 |
| | | | 375/E7.137 |
| 2008/0304763 A1 * | 12/2008 | Nagori | H04N 19/61 |
| | | | 382/250 |
| 2008/0310507 A1 * | 12/2008 | Ye | H04N 19/18 |
| | | | 375/E7.199 |
| 2008/0317364 A1 * | 12/2008 | Gou | H04N 19/176 |
| | | | 382/233 |
| 2009/0002379 A1 * | 1/2009 | Baeza | H04N 19/42 |
| | | | 345/522 |
| 2009/0003446 A1 * | 1/2009 | Wu | H04N 19/176 |
| | | | 375/E7.19 |
| 2009/0003447 A1 * | 1/2009 | Christoffersen | H04N 19/117 |
| | | | 375/240.16 |
| 2009/0046941 A1 * | 2/2009 | Mietens | H04N 19/46 |
| | | | 382/250 |
| 2009/0129472 A1 * | 5/2009 | Panusopone | H04N 19/157 |
| | | | 375/E7.125 |
| 2009/0135911 A1 * | 5/2009 | Au | H04N 19/52 |
| | | | 375/E7.123 |
| 2009/0225846 A1 * | 9/2009 | Francois | H04N 19/16 |
| | | | 375/240.16 |
| 2009/0238279 A1 | 9/2009 | Tu et al. | |
| 2009/0296808 A1 * | 12/2009 | Regunathan | H04N 19/172 |
| | | | 375/240.03 |
| 2009/0316788 A1 * | 12/2009 | Techernatinsky | H04N 19/146 |
| | | | 375/240.24 |
| 2010/0061447 A1 * | 3/2010 | Tu | H04N 21/2383 |
| | | | 375/240.03 |
| 2010/0080284 A1 * | 4/2010 | Lee | H04N 19/16 |
| | | | 375/E7.076 |
| 2010/0080285 A1 * | 4/2010 | Lee | H04N 19/61 |
| | | | 375/E7.076 |
| 2010/0080296 A1 * | 4/2010 | Lee | H04N 19/44 |
| | | | 375/E7.076 |
| 2010/0119169 A1 * | 5/2010 | Haddad | H04N 19/61 |
| | | | 382/250 |
| 2010/0166070 A1 | 7/2010 | Goel | |
| 2010/0177821 A1 * | 7/2010 | Kadoto | H04N 19/105 |
| | | | 375/E7.243 |
| 2010/0177828 A1 * | 7/2010 | Rubinstein | H04N 19/11 |
| | | | 711/E12.007 |
| 2010/0235285 A1 * | 9/2010 | Hoffberg | G06Q 50/188 |
| | | | 705/37 |
| 2010/0322314 A1 * | 12/2010 | Huang | H04N 19/593 |
| | | | 375/240.27 |
| 2011/0002387 A1 * | 1/2011 | Chiu | H04N 19/61 |
| | | | 375/E7.123 |
| 2011/0103485 A1 * | 5/2011 | Sato | H04N 19/109 |
| | | | 375/E7.123 |
| 2011/0103486 A1 * | 5/2011 | Sato | H04N 19/46 |
| | | | 375/E7.123 |
| 2011/0107369 A1 * | 5/2011 | O'Brien | G06F 16/435 |
| | | | 725/38 |
| 2011/0170602 A1 * | 7/2011 | Lee | H04N 19/176 |
| | | | 375/E7.123 |
| 2011/0176611 A1 * | 7/2011 | Huang | H04N 19/46 |
| | | | 375/E7.123 |
| 2011/0188768 A1 * | 8/2011 | Pateux | H04N 19/105 |
| | | | 382/238 |
| 2011/0206123 A1 * | 8/2011 | Panchal | H04N 19/147 |
| | | | 375/E7.243 |
| 2011/0243233 A1 * | 10/2011 | Alshina | H04N 19/46 |
| | | | 375/240.16 |

(56)                    References Cited

U.S. PATENT DOCUMENTS

| | | | | |
|---|---|---|---|---|
| 2011/0249721 A1* | 10/2011 | Karczewicz | ......... | H04N 19/463 |
| | | | | 375/E7.126 |
| 2011/0249749 A1* | 10/2011 | Takahashi | .............. | H04N 19/52 |
| | | | | 375/E7.125 |
| 2011/0255598 A1* | 10/2011 | Lin | ......... | H04N 19/56 |
| | | | | 375/E7.125 |
| 2012/0177123 A1* | 7/2012 | Zhou | ...................... | H04N 19/52 |
| | | | | 375/E7.125 |
| 2012/0300850 A1* | 11/2012 | Yie | ......... | H04N 19/44 |
| | | | | 375/E7.256 |

FOREIGN PATENT DOCUMENTS

| | | |
|---|---|---|
| CN | 101990098 A | 3/2011 |
| CN | 102158709 A | 8/2011 |
| JP | 2008-109632 A | 5/2008 |
| WO | WO 2011/126345 A2 | 10/2011 |

OTHER PUBLICATIONS

ITU-T, "Series H: Audiovisual and Multimedia Systems Infrastructure of audiovisual services—Coding of moving video Advanced video coding for generic audiovisual" Mar. 2010 (Year: 2010).*

Bross et al. "BoG report of CE9: M V Coding and Skip/Merge operations", Mar. 16-23, 2011 (Year: 2011).*

Zhou, Scalable motion vector competition and simplified MVP calculation, Joint Collaborative Team on Video Coding (JCT-VC) of ITU-T SG16 WP3 and ISO/IEC JTC1/SC29/WG11, Jan. 20-28, 2011, p. 1-9, 4th Meeting, Daegu, South Korea.

Winken et al., Description of video coding technology proposal by Fraunhofer HHI, Joint Collaborative Team on Video Coding (JCT-VC) of ITU-T SG16 WP3 and ISO/IEC JTC1/SC29/WG11, Apr. 15-23, 2010, p. 1-44, 1st Meeting, Dresden, Germany.

Jung et al., Competition-Based Scheme for Motion Vector Selection and Coding, ITU_13 Telecommunications Standardization Sector Study Group 16 Question 6 Video Coding Experts Group (VCEG), Jul. 17-18, 2006, p. 1-7, 29th Meeting, Klagenfurt, Austria.

Sato, On Motion Vector Coding, Joint Collaborative Team on Video Coding (JCT-VC) of ITU-T SG16 WP3 and ISO/IEC JTC1/SC29/WG11, Jul. 21-28, 2010, p. 1-9, 2nd Meeting, Geneva, Switzerland.

Oct. 9, 2016, CN communication issued for related CN application No. 201280053690.6.

Apr. 30, 2019, Singaporean Search Report issued for related SG Application No. 10201507080R.

Bross et al., BoG report of CE9: Mv Coding and Skip/Merge operations, Joint Collaborative Team on Video Coding (JCT-VC) of ITU-T SG16 WP3 and ISO/IEC JTC1/SC29/WG11, Mar. 16-23, 2011, pp. 1-20, 5th Meeting: Geneva, CH.

Jun. 14, 2019, Singaporean Search Report issued for related SG Application No. 10201507085S.

* cited by examiner

IMAGE PROCESSING APPARATUS AND METHOD

CROSS REFERENCE TO PRIOR APPLICATION

This application is a continuation of U.S. patent application Ser. No. 16/386,739 (filed on Apr. 17, 2019), which is a continuation of U.S. patent application Ser. No. 14/348, 097 (filed on Mar. 28, 2014 and issued as U.S. Pat. No. 10,616,599 on Apr. 7, 2020), which is a National Stage Patent Application of PCT International Patent Application No. PCT/JP2012/078427 (filed on Nov. 2, 2012) under 35 U.S.C. § 371, which claims priority to Japanese Patent Application Nos. 2011-247489 (filed on Nov. 11, 2011) and 2011-246543 (filed on Nov. 10, 2011), which are all hereby incorporated by reference in their entirety.

TECHNICAL FIELD

The present disclosure relates to an image processing apparatus and an image processing method, and more particularly, relates to an image processing apparatus and an image processing method capable of improving the processing efficiency by pipeline processing in encoding or decoding of a motion vector.

BACKGROUND ART

In recent years, image information is treated as digital information, and at that occasion, an apparatus is becoming widely prevalent that compresses and encodes an image by employing a coding method for performing compression by orthogonal transformation and motion compensation such as discrete cosine transform using redundancy unique to image information for the purpose of highly efficient transmission and accumulation of information. Examples of the coding methods include MPEG (Moving Picture Experts Group) and the like.

In particular, MPEG2 (ISO/IEC 13818-2) is defined as a general-purpose image coding method, and is a standard that covers both of interlaced scanning images and progressive scanning images, and standard resolution images and high resolution images. For example, MPEG2 is now widely used for wide range of applications such as professional use and consumer use. For example, in a case of an interlaced scanning image of a standard resolution of 720 by 480 pixels, the amount of codes (bit rate) of 4 to 8 Mbps is allocated by using the MPEG2 compression method. Further, for example, in a case of an interlaced scanning image of a high resolution of 1920 by 1088 pixels, the amount of codes (bit rate) of 18 to 22 Mbps is allocated by using the MPEG2 compression method. Accordingly, high compression rate and high image quality can be achieved.

MPEG2 is mainly targeted for high image quality coding suitable for broadcasting, but does not support coding method of a less amount of codes (bit rate) than MPEG1. In other words, MPEG2 does not support higher compression rate. As portable terminals become widely prevalent, needs for such coding methods are considered to grow in the future, and in order to respond to such needs, MPEG 4 coding method has been standardized. With regard to image coding method, the specification is admitted as ISO/IEC14496-2 in international standard on December, 1998.

In the schedule of standardization, on March, 2003, H.264 and MPEG-4 Part 10 (Advanced Video Coding, hereinafter referred to as H.264/AVC) was made into an international standard.

Further, as an expansion of the H.264/AVC, FRExt (Fidelity Range Extension) including an encoding tool required for professional use such as RGB, 4:2:2, 4:4:4 and even 8×8 DCT and quantization matrix specified in the MPEG-2 was standardized on February, 2005. Accordingly, there was made a coding method capable of expressing even film noise included in a movie in a preferable manner using the H.264/AVC, and it is now being used for a wide range of applications such as Blu-Ray Disc (trademark).

However, recently, needs for still higher compression rate encoding has been enhanced, e.g., compressing an image of about 4000 by 2000 pixels which is four times the high-definition image, and distributing a high-definition image in an environment of a limited transmission capacity such as the Internet. For this reason, in VCEG (=Video Coding Expert Group) under ITU-T explained above, discussions about improvement of the encoding efficiency have been continuously conducted.

As one of such encoding efficiency improvements, in order to improve encoding of the motion vector using median prediction according to the AVC, adaptive use of any of not only "Spatial Predictor" derived from the median prediction defined in the AVC, but also "Temporal Predictor" and "Spatio-Temporal Predictor" as prediction motion vector information (hereinafter also referred to as MV Competition (MVCompetition)) has been suggested (for example, see Non-Patent Document 1).

It should be noted that, in the AVC, when prediction motion vector information is selected, a cost function value in High Complexity Mode or Low Complexity Mode implemented in the reference software of the AVC which is called JM (Joint Model) is used.

More specifically, a cost function value in a case where the prediction motion vector information is used is calculated, and the optimum prediction motion vector information is selected. In the image compression information, flag information indicating information about prediction motion vector information used for each block is transmitted.

By the way, there has been such concern that making a macro block size be 16 pixels by 16 pixels is not suitable for a large picture frame such as UHD (Ultra High Definition; 4000 pixels by 2000 pixels) which is a target of a next-generation coding method.

Accordingly, currently, for the purpose of further improving the encoding efficiency as compared with the AVC, a coding method called HEVC (High Efficiency Video Coding) is being standardized by JCTVC (Joint Collaboration Team-Video Coding) which is a joint standards organization of the ITU-T and the ISO/IEC.

According to the HEVC method, a coding unit (CU (Coding Unit)) is defined as the same processing unit as the macro block according to the AVC. The size of this CU, unlike the macro block of the AVC, is not fixed to 16 by 16 pixels, but in each sequence, the size is designated in the image compression information. In each sequence, the maximum size (LCU=Largest Coding Unit) and the minimum size (SCU=Smallest Coding Unit) of the CU are also specified. Further, the CU is divided into Prediction Units (PUs), which are areas serving as processing unit of intra- or inter-prediction (partial area s of image of picture unit), and divided into Transform Units (TUs) which are areas serving as processing unit of orthogonal transformation (partial area s of image of picture unit).

Furthermore, in Non-Patent Document 2, a quantization parameter QP can be transmitted in a Sub-LCU unit. In up to what size of Coding Unit the quantization parameter is to be transmitted is designated in image compression information for each picture. The information about the quantization parameter included in the image compression information is transmitted in a unit of each Coding Unit.

Further, as one of coding methods of motion information, a method called Motion Partition Merging (hereinafter also referred to as Merge Mode (Merge mode)) has been suggested (for example, see Non-Patent Document 2). In this method, when motion information of the block in question is the same as motion information of the surrounding blocks, only the flag information is transmitted. During decoding, the motion information of the block in question is restructured using the motion information of the surrounding blocks.

By the way, in Non-Patent Document 3, the following method has been suggested: when Spatial predictor of the PU in question which is a processing target is derived in MVCompetition or Merge mode explained above, the motion vector of a PU adjacent to the PU in question in terms of predetermined positional relationship among PUs adjacent to the PU in question is adopted as a candidate.

More specifically, the motion vector of $A_0$ which is a PU adjacent to the lower left of the PU in question and the motion vector of $A_1$ which is a PU located above $A_0$ among PUs adjacent to the left of the PU in question are adopted as candidates. In addition, the motion vector of $B_2$ which is a PU adjacent to the top left of the PU in question, and the motion vector of $B_0$ which is a PU adjacent to the top right of the PU in question, and the motion vector of $B_1$ which is a PU located adjacent to the left of $B_0$ among PUs adjacent to the top of the PU in question are adopted as candidates.

Then, scanning is performed in the order of $A_0$, $A_1$ and in the order of $B_0$, $B_1$, $B_2$, and the scanning is terminated when motion vector information having a reference frame equivalent to the motion vector information of the PU in question is detected.

CITATION LIST

Non-Patent Documents

Non-patent Document 1: Joel Jung, Guillaume Laroche, "Competition-Based Scheme for Motion Vector Selection and Coding", VCEG-AC06, ITU-Telecommunications Standardization SectorSTUDY GROUP 16 Question 6 Video Coding Experts Group (VCEG) 29th Meeting: Klagenfurt, Austria, 17-18 Jul. 2006 Non-patent Document 2: Martin Winken, Sebastian Bosse, Benjamin Bross, Philipp Helle, TobiasHinz, HeinerKirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI", JCTVC-A116, April, 2010 Non-patent Document 3: Minhua Zhou, "A Scalable motion vector competition and simplified MVP calculation", JCTVC-D055, Joint Collaborative Team on Video Coding (JCT-VC) of ITU-T SG16 WP3 and ISO/IEC JTC1/SC29/WG11 4th Meeting: Daegu, K R, 20-28 Jul. 2011

SUMMARY OF THE INVENTION

Problems to be Solved by the Invention

However, in the suggestion of the Non-Patent Document 3, it is necessary to perform processing on the PU in question after waiting for determination of the motion vector information with respect to a PU located at the top right among the adjacent PUs explained above. For this reason, there has been such concern that when processing for deriving Spatial predicor in the MVCompetition or Merge mode is tried to be achieved with pipeline, the PU located at the top right causes delay.

The present disclosure is made in view of such circumstances, and it is to improve the processing efficiency by pipeline processing in the encoding or decoding of a motion vector.

Solutions to Problems

An image processing apparatus according to an aspect of the present disclosure includes an adjacent motion vector information setting unit which, when a spatial prediction motion vector is generated with a prediction motion vector used for decoding of a motion vector of a current block of an image being as a target, prohibits use of a motion vector of a top right block located adjacent to top right of the current block; a prediction motion vector generation unit which generates a spatial prediction vector of the current block, using a motion vector other than the motion vector of the top right block which is prohibited from being used by the adjacent motion vector information setting unit, with a motion vector of a spatial adjacent block located adjacent to the current block in terms of space being as a target; and a motion vector decoding unit which decodes the motion vector of the current block, using the prediction motion vector of the current block.

The prediction motion vector generation unit can perform, with pipeline, generation processing of the spatial prediction vector with respect to the current block and generation processing of a spatial prediction vector with respect to a block subsequent to the current block in scan order.

The prediction motion vector generation unit can generate the spatial prediction vector of the current block, using a motion vector of a first block which is a spatial adjacent block of the current block and which is located at a right end with a top block in surface contact with a top of the current block being as a target.

The prediction motion vector generation unit can generate the spatial prediction vector of the current block, using a motion vector of a first block which is a spatial adjacent block of the current block and which is located at a right end with a top block in surface contact with a top of the current block being as a target, and a motion vector of a second block other than the first block with the top block being as a target.

The second block is a block which is located adjacent to left of the first block with the top block being as a target.

The second block is a block which is located around a center of a length in a horizontal direction of the current block with the top block being as a target.

The adjacent motion vector information setting unit can prohibit the use of the motion vector of the top right block in a maximum encoding unit.

A border determination unit is further provided which determines whether a border of the current block is a border of the maximum encoding unit, wherein the adjacent motion vector information setting unit can prohibit the use of the motion vector of the top right block only when the border determination unit determines that the border of the current block is the border of the maximum encoding unit.

The adjacent motion vector information setting unit can prohibit the use of the motion vector of the top right block in accordance with identification information for identifying whether the use of the motion vector of the top right block is prohibited in a prediction unit or the use of the motion vector of the top right block is prohibited in the maximum encoding unit.

In an image processing method according to an aspect of the present disclosure, when a spatial prediction motion vector is generated with a prediction motion vector used for decoding of a motion vector of a current block of an image being as a target, an image processing apparatus prohibits use of a motion vector of a top right block located adjacent to top right of the current block; generates a spatial prediction vector of the current block, using a motion vector other than the motion vector of the top right block which is prohibited from being used, with a motion vector of a spatial adjacent block located adjacent to the current block in terms of space being as a target; and decodes the motion vector of the current block, using the prediction motion vector of the current block.

An image processing apparatus according to another aspect of the present disclosure includes an adjacent motion vector information setting unit which, when a spatial prediction motion vector is generated with a prediction motion vector used for encoding of a motion vector of a current block of an image being as a target, prohibits use of a motion vector of a top right block located adjacent to top right of the current block; a prediction motion vector generation unit which generates a spatial prediction vector of the current block, using a motion vector other than the motion vector of the top right block which is prohibited from being used by the adjacent motion vector information setting unit, with a motion vector of a spatial adjacent block located adjacent to the current block in terms of space being as a target; and a motion vector encoding unit which encodes the motion vector of the current block, using the prediction motion vector of the current block.

The prediction motion vector generation unit can perform, with pipeline, generation processing of the spatial prediction vector with respect to the current block and generation processing of a spatial prediction vector with respect to a block subsequent to the current block in scan order.

The prediction motion vector generation unit can generate the spatial prediction vector of the current block, using a motion vector of a first block which is a spatial adjacent block of the current block and which is located at a right end with a top block in surface contact with a top of the current block being as a target.

The prediction motion vector generation unit can generate the spatial prediction vector of the current block, using a motion vector of a first block which is a spatial adjacent block of the current block and which is located at a right end with a top block in surface contact with a top of the current block being as a target, and a motion vector of a second block other than the first block with the top block being as a target.

The second block is a block which is located adjacent to left of the first block with the top block being as a target.

The second block is a block which is located around a center of a length in a horizontal direction of the current block with the top block being as a target.

The adjacent motion vector information setting unit can prohibit the use of the motion vector of the top right block in a maximum encoding unit.

A border determination unit is further provided which determines whether a border of the current block is a border of the maximum encoding unit, wherein the adjacent motion vector information setting unit can prohibit the use of the motion vector of the top right block only when the border determination unit determines that the border of the current block is the border of the maximum encoding unit.

The image processing apparatus may further include an identification information setting unit which sets identification information for identifying whether the use of the motion vector of the top right block is prohibited in a prediction unit or the use of the motion vector of the top right block is prohibited in the maximum encoding unit; and a transmission unit which transmits the identification information, which is set by the identification information setting unit, and a coded stream.

In an image processing method according to another aspect of the present disclosure, when a spatial prediction motion vector is generated with a prediction motion vector used for encoding of a motion vector of a current block of an image being as a target, an image processing apparatus prohibits use of a motion vector of a top right block located adjacent to top right of the current block; generates a spatial prediction vector of the current block, using a motion vector other than the motion vector of the top right block which is prohibited from being used, with a motion vector of a spatial adjacent block located adjacent to the current block in terms of space being as a target; and encodes the motion vector of the current block, using the prediction motion vector of the current block.

According to an aspect of the present disclosure, when a spatial prediction motion vector is generated with a prediction motion vector used for decoding of a motion vector of a current block of an image being as a target, a motion vector of a top right block located adjacent to top right of the current block is prohibited from being used, and a spatial prediction vector of the current block is generated, using a motion vector other than the motion vector of the current block which is prohibited from being used, with a motion vector of a spatial adjacent block located adjacent to the current block in terms of space being as a target. Then, the motion vector of the current block is decoded, using the prediction motion vector of the current block.

According to another aspect of the present disclosure, when a spatial prediction motion vector is generated with a prediction motion vector used for encoding of a motion vector of a current block of an image being as a target, a motion vector of a top right block located adjacent to top right of the current block is prohibited from being used, and a spatial prediction vector of the current block is generated, using a motion vector other than the motion vector of the top right block which is prohibited from being used, with a motion vector of a spatial adjacent block located adjacent to the current block in terms of space being as a target. Then, the motion vector of the current block is encoded, using the prediction motion vector of the current block.

It should be noted that the image processing apparatus explained above may be an independent apparatus, or may be an internal block constituting an image coding device or an image decoding device.

Effects of the Invention

According to an aspect of the present disclosure, an image can be decoded. In particular, the processing efficiency can be improved by pipeline processing.

According to another aspect of the present disclosure, an image can be encoded. In particular, the processing efficiency can be improved by pipeline processing.

US 12,627,830 B2

7

Figure 2:
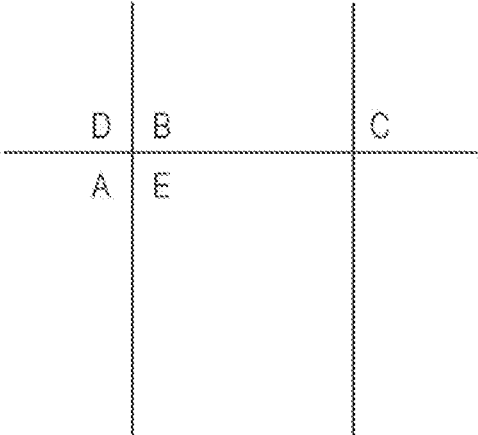

FIG. 2 is an explanatory diagram illustrating median operation.

Figure 3:
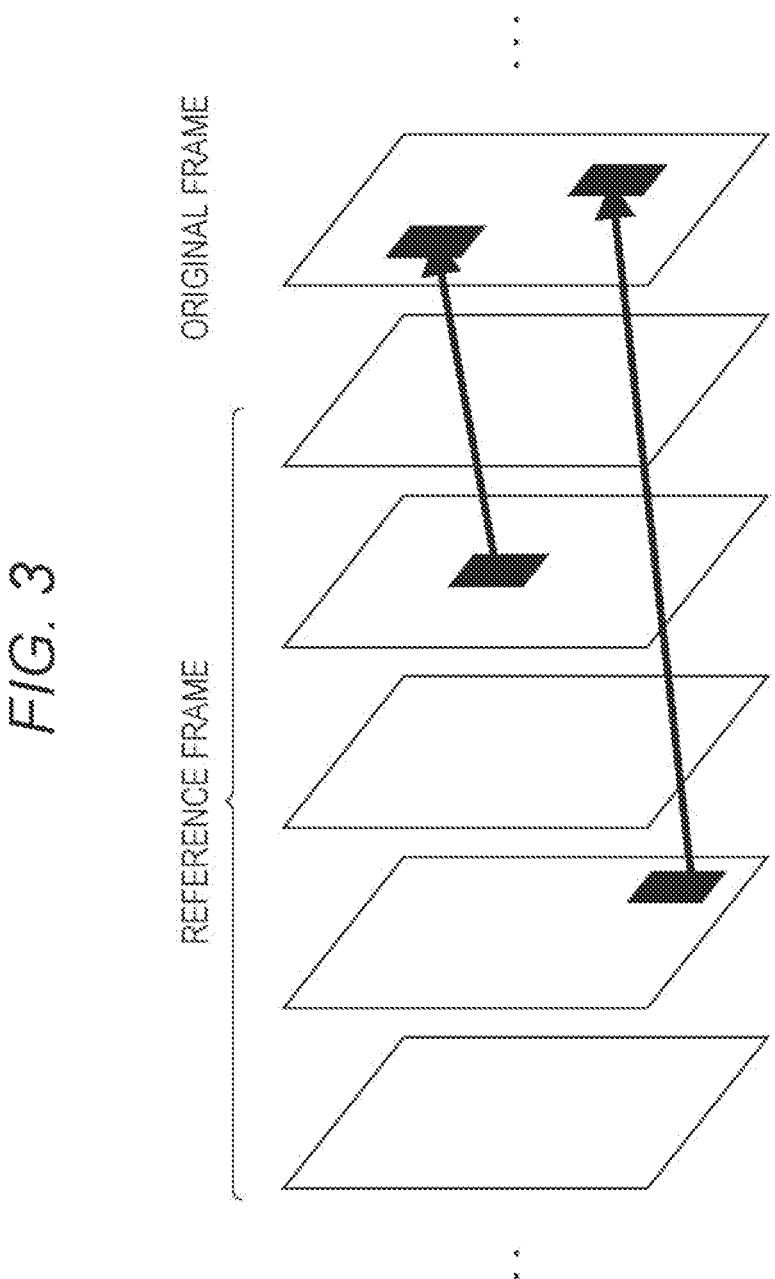

FIG. 3 is an explanatory diagram illustrating multi-reference frames.

Figure 4:
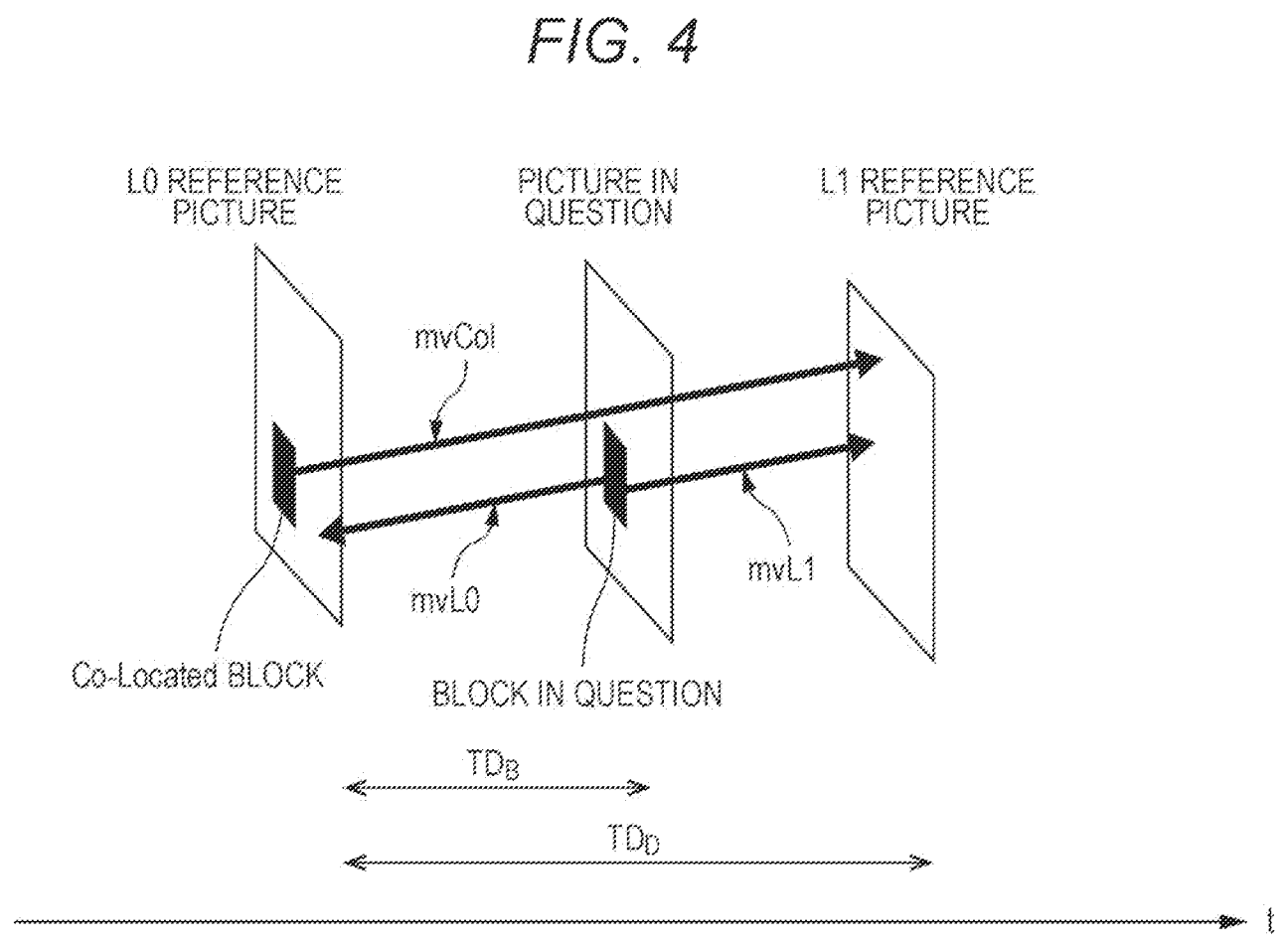

FIG. 4 is an explanatory diagram illustrating a temporal direct mode.

Figure 1:
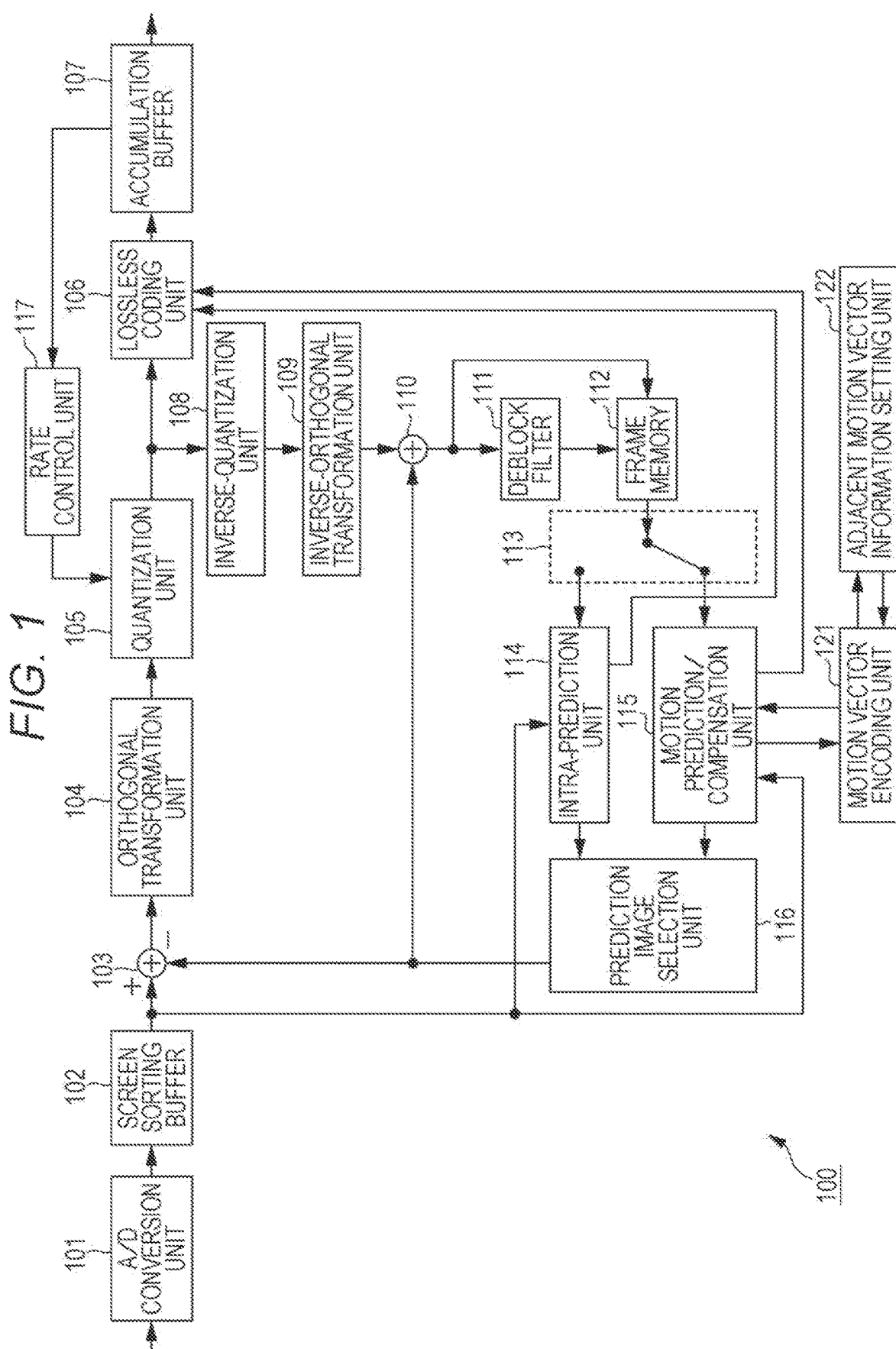
FIG. 1 is a block diagram illustrating an example of main configuration of an image coding device.

FIG. 1 is an explanatory diagram illustrating a motion vector coding method.

Figure 6:
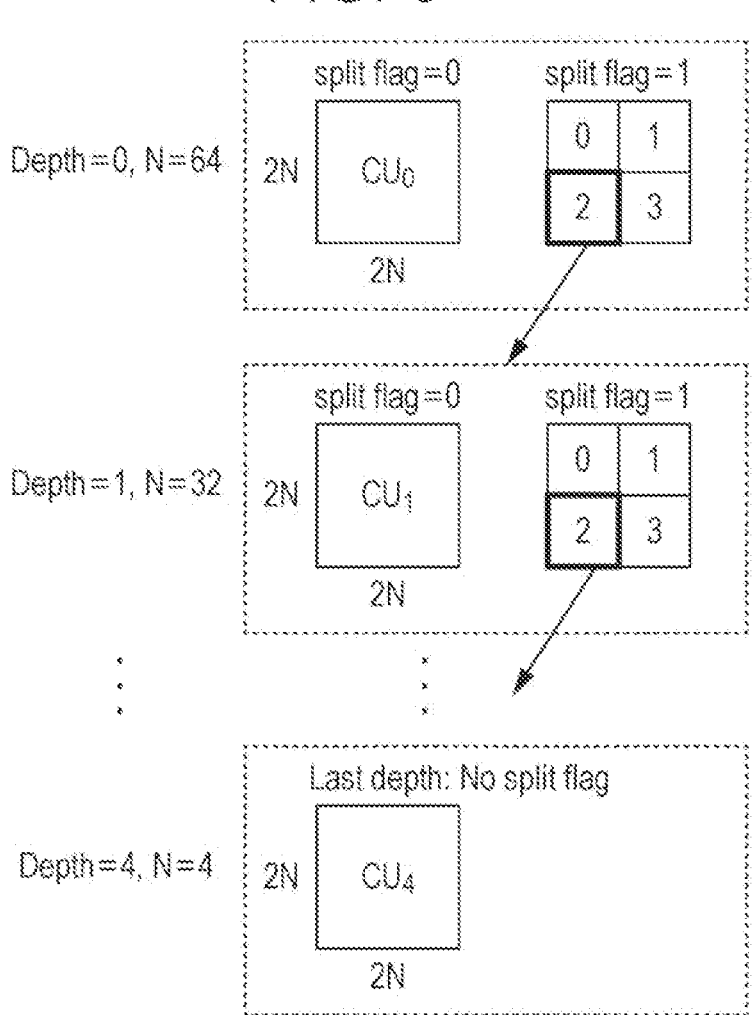

FIG. 6 is a figure illustrating an example of configuration of a coding unit.

Figure 7:
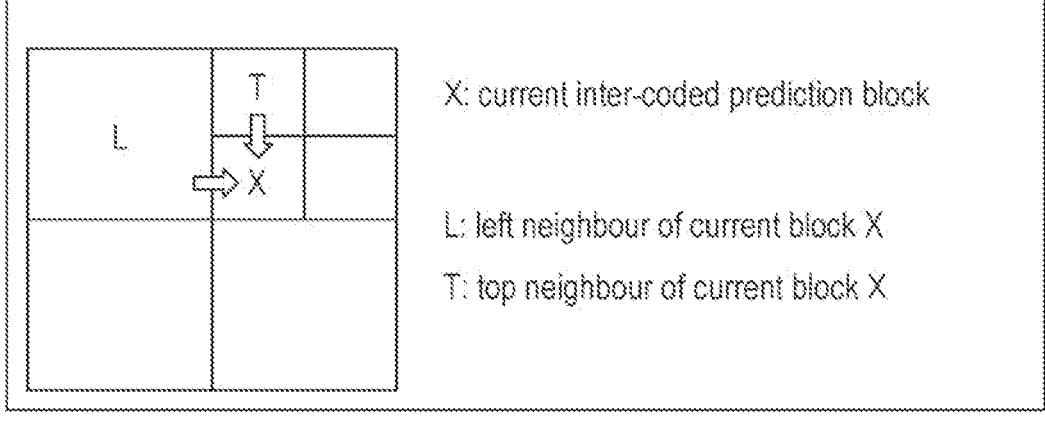

FIG. 7 is an explanatory diagram illustrating Motion Partition Merging.

Figure 8:
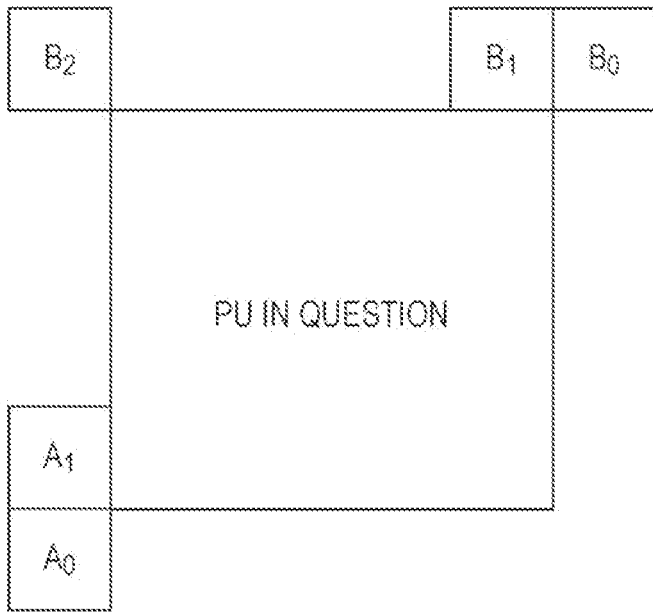

FIG. 8 is an explanatory diagram illustrating a generation method of a spatial prediction motion vector according to the related art.

Figure 9:
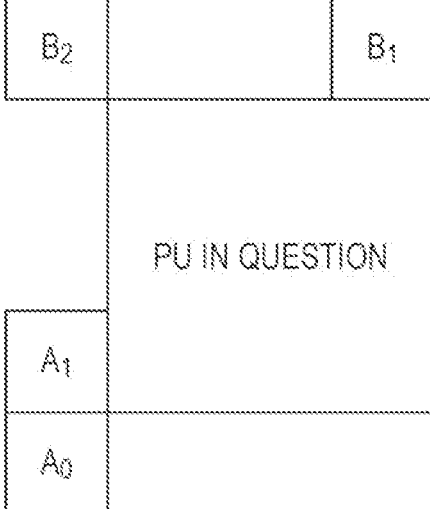

FIG. 9 is an explanatory diagram illustrating a generation method of a spatial prediction motion vector according to the present technique.

Figure 10:
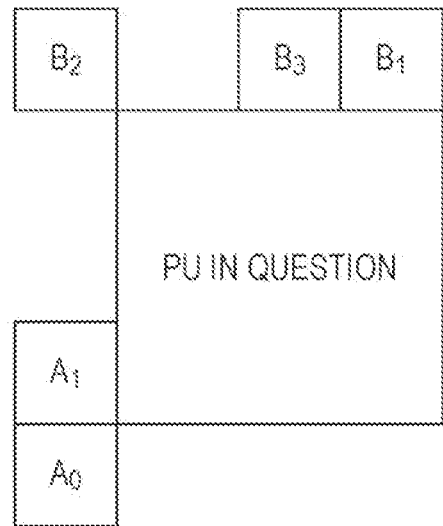

FIG. 10 is an explanatory diagram illustrating another generation method of a spatial prediction motion vector according to the present technique.

Figure 11:
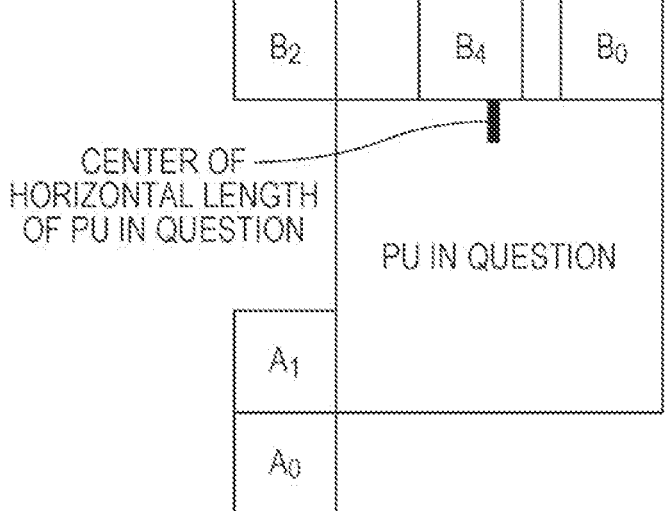

FIG. 11 is an explanatory diagram illustrating still another generation method of a spatial prediction motion vector according to the present technique.

Figure 12:
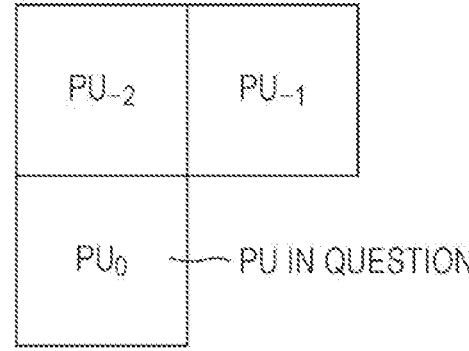

FIG. 12 is a figure illustrating positional relationship of PUs used for explanation of pipeline processing.

Figure 13:
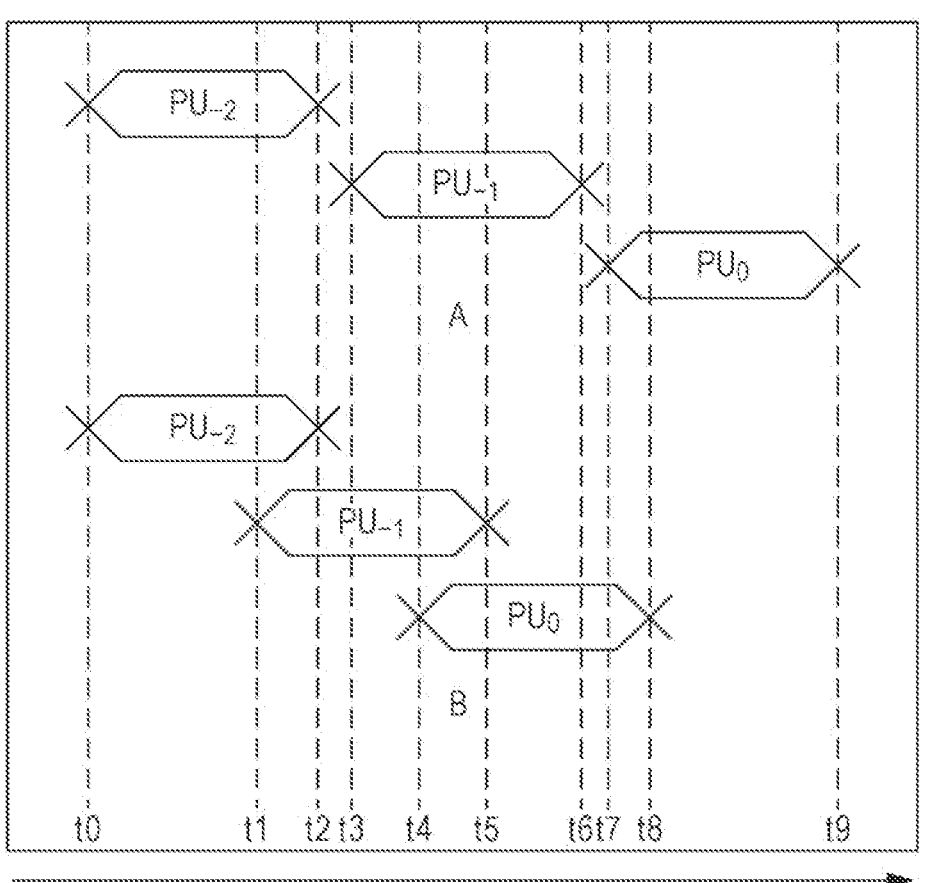

FIG. 13 is an explanatory diagram illustrating pipeline processing.

Figure 14:
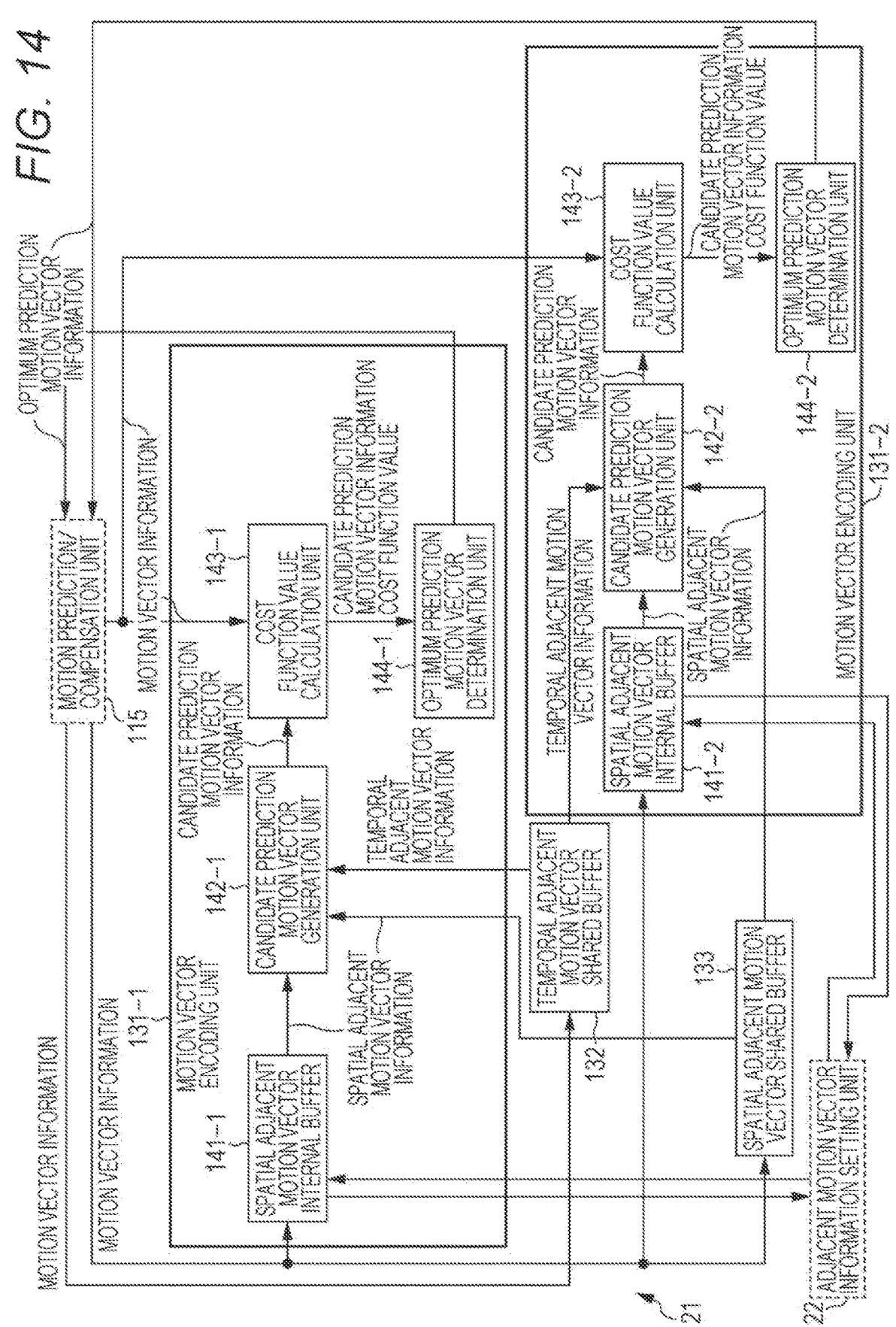

FIG. 14 is a block diagram illustrating an example of main configuration of a motion vector encoding unit.

Figure 15:
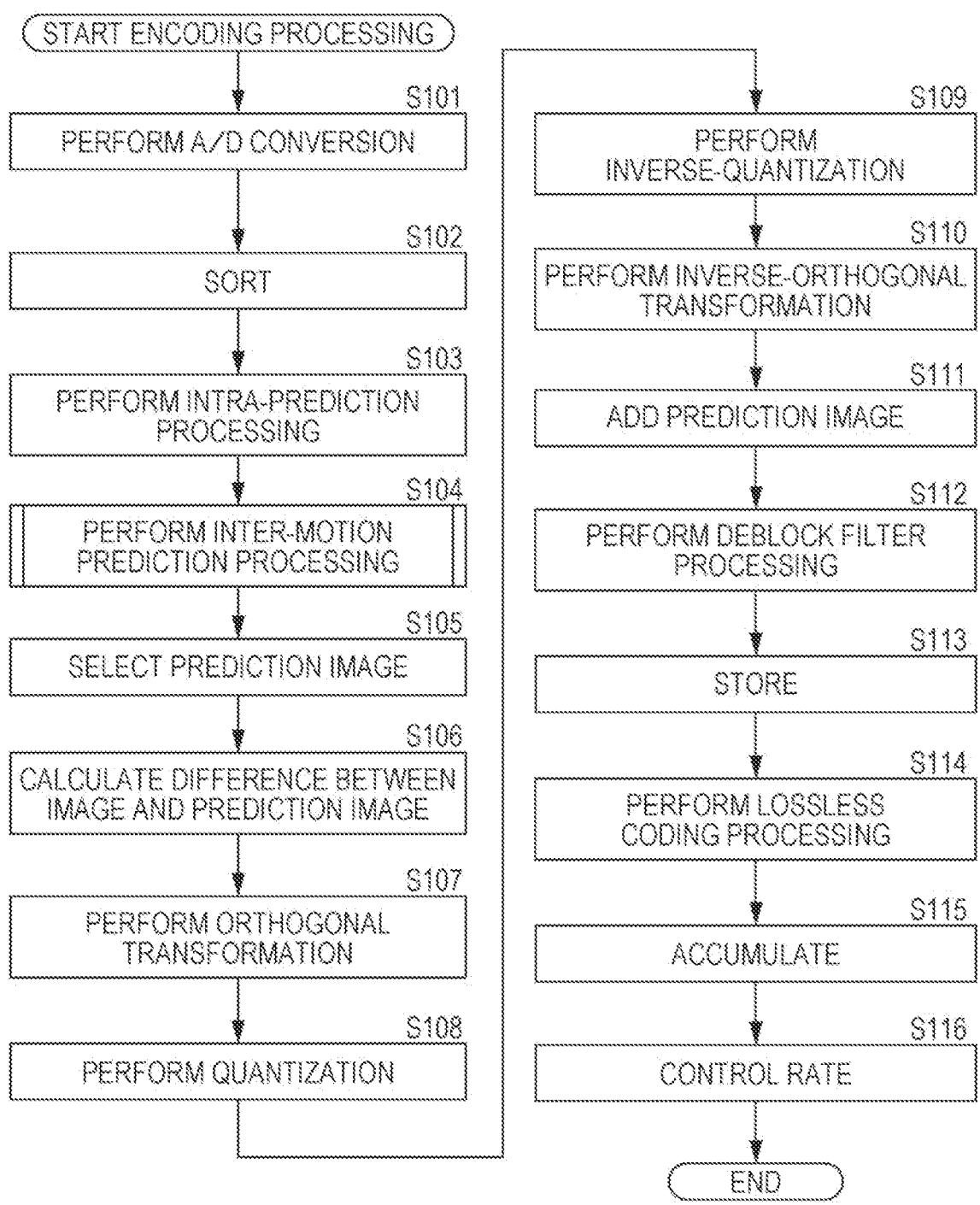

FIG. 15 is a flowchart explaining an example of a flow of coding processing.

Figure 16:
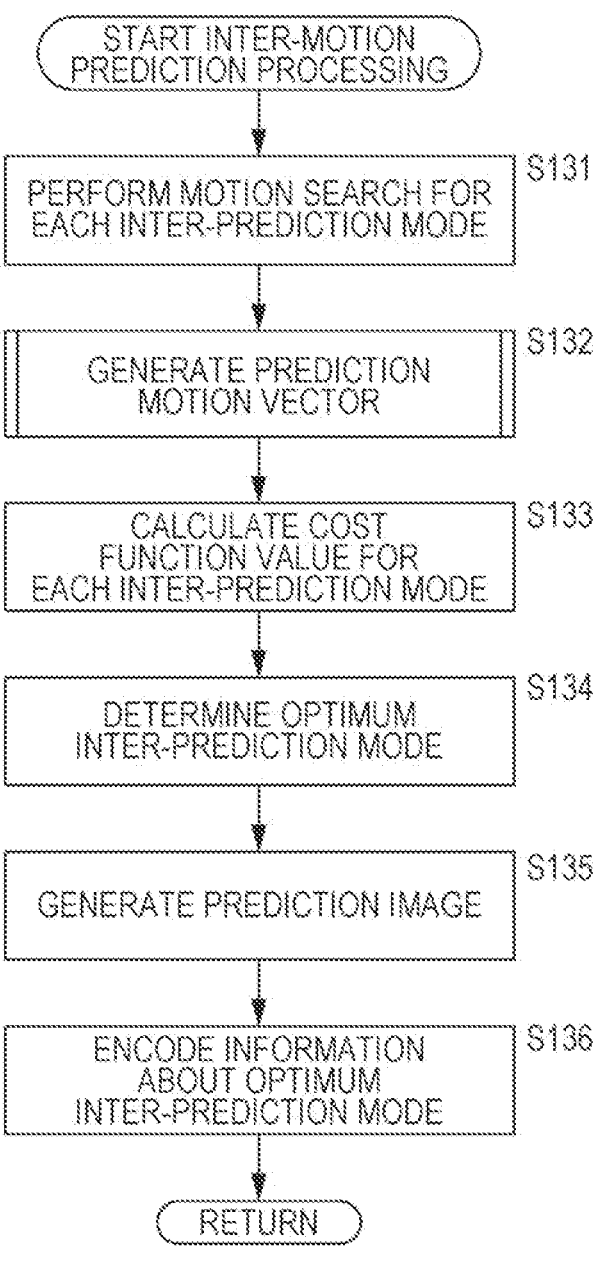

FIG. 16 is a flowchart explaining an example of a flow of inter-motion prediction processing.

Figure 17:
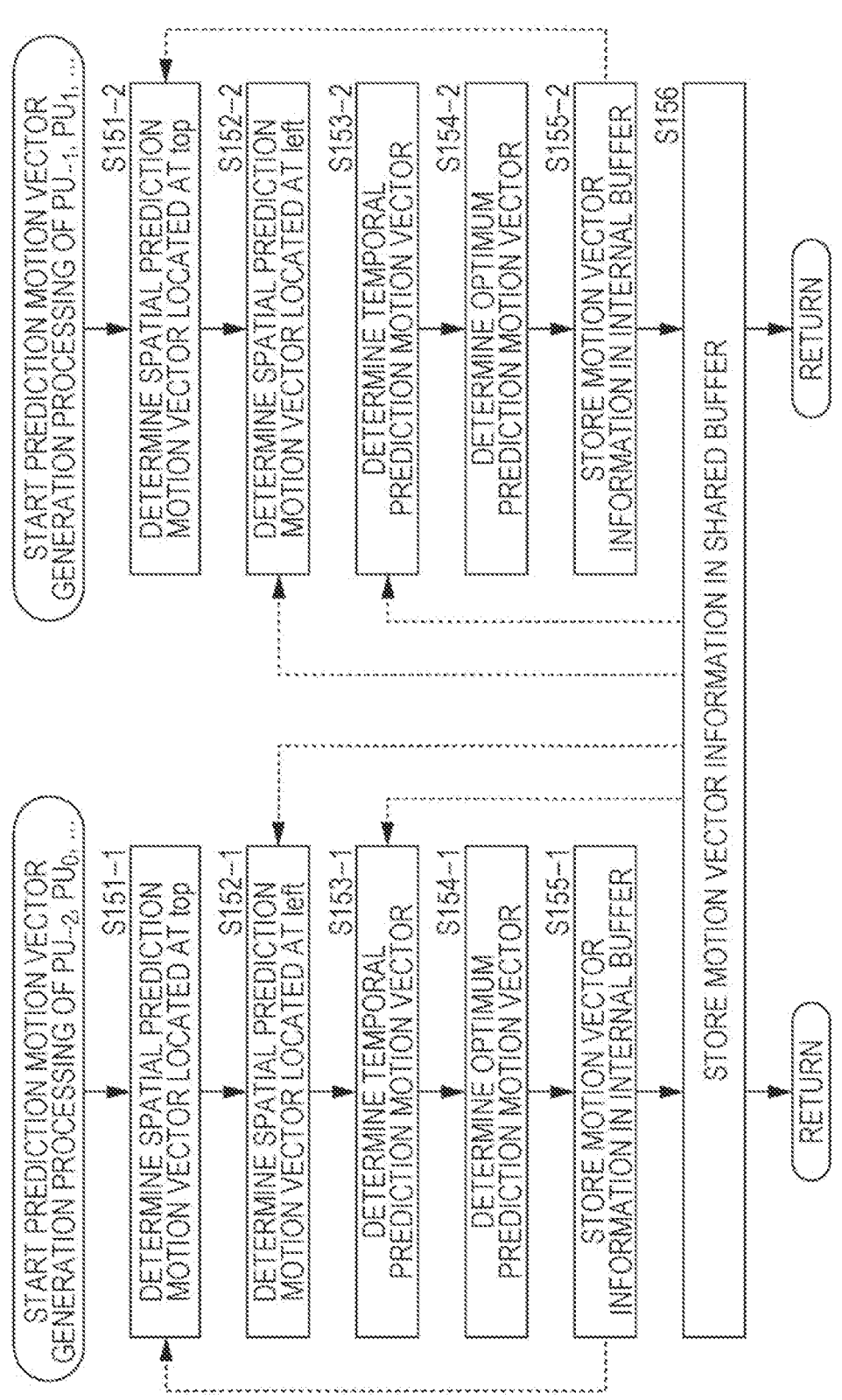

FIG. 17 is a flowchart explaining an example of a flow of prediction motion vector generation processing.

Figure 18:
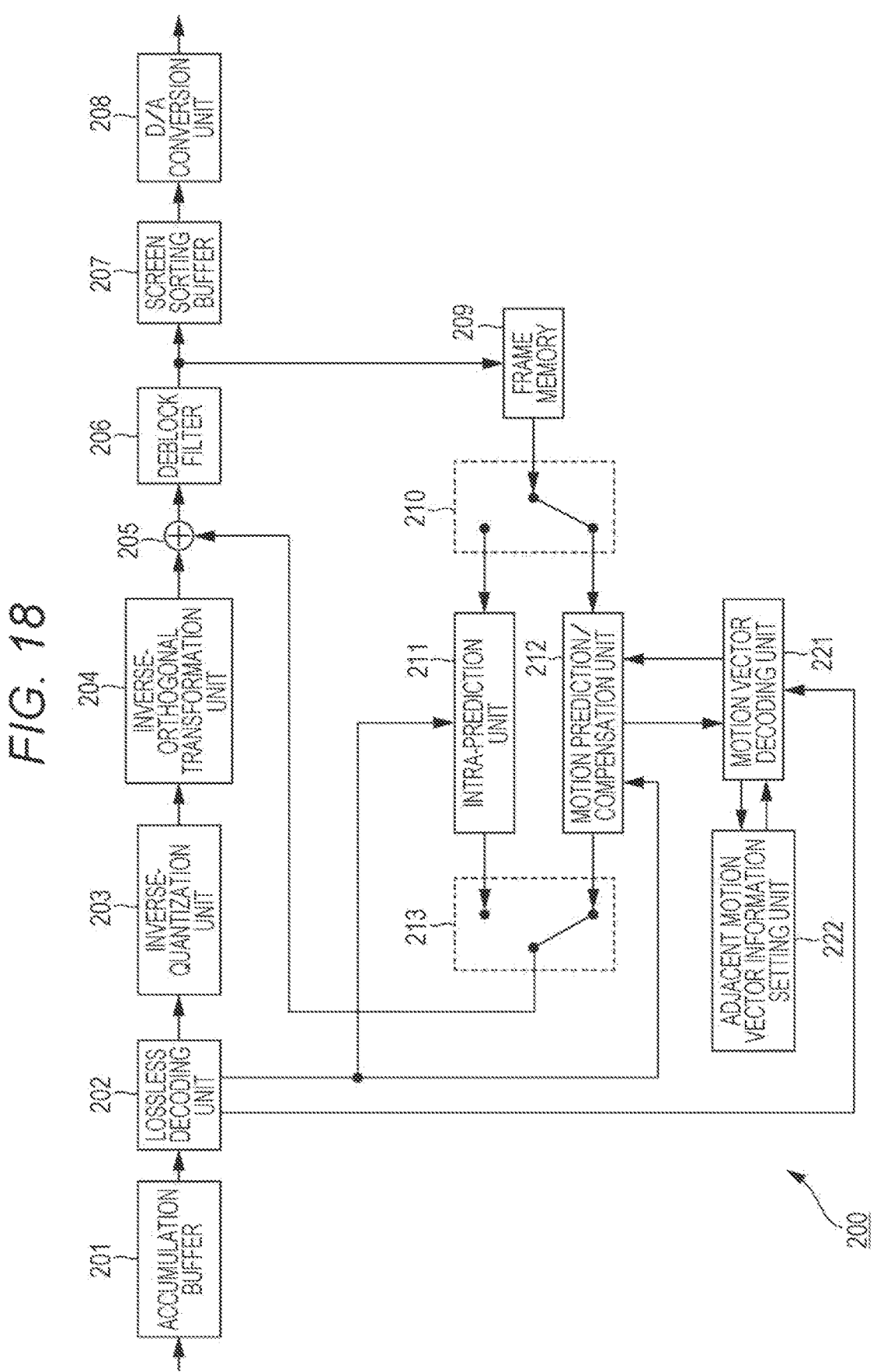

FIG. 18 is a block diagram illustrating an example of main configuration of an image decoding device.

Figure 19:
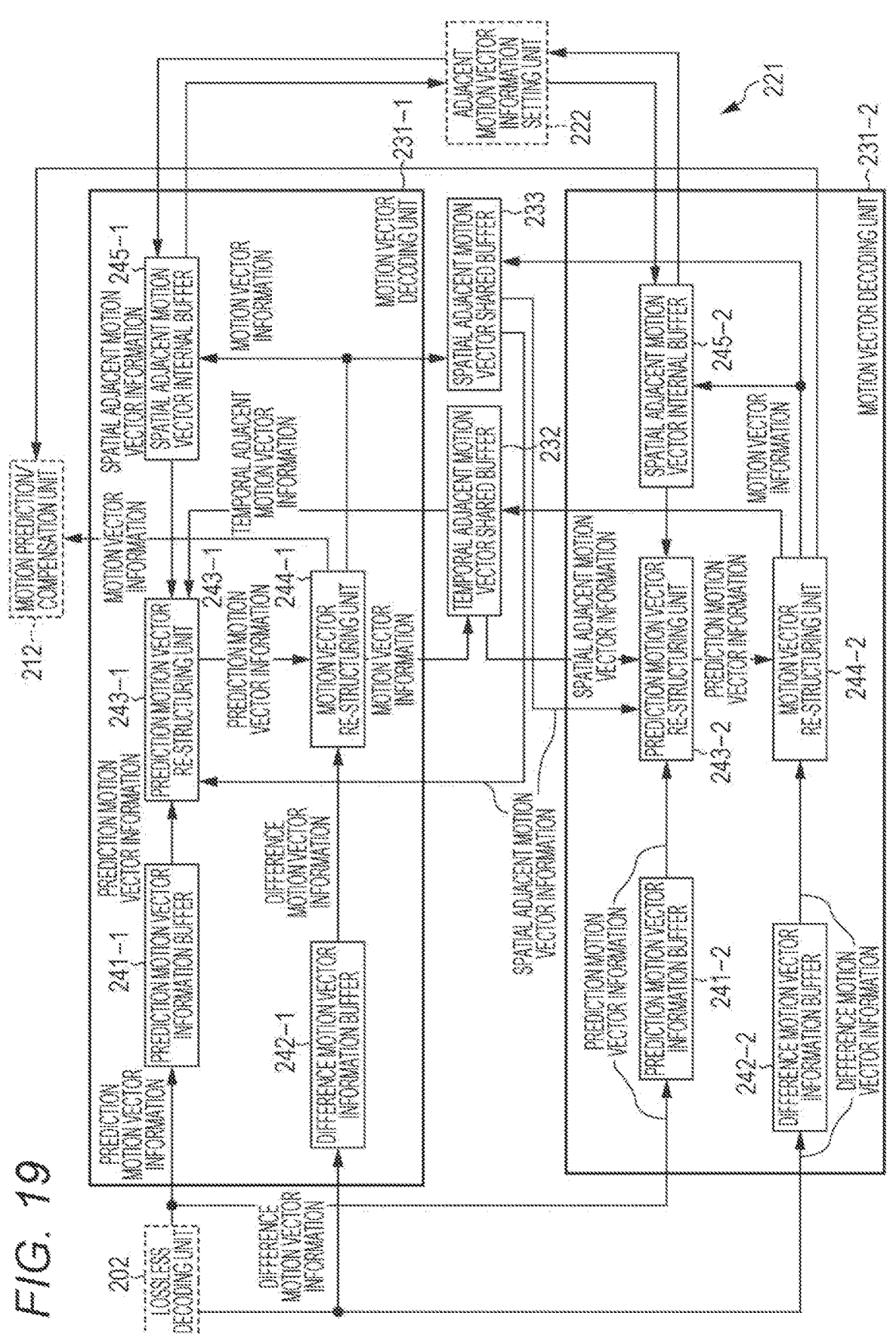

FIG. 19 is a block diagram illustrating an example of main configuration of a motion vector decoding unit.

Figure 20:
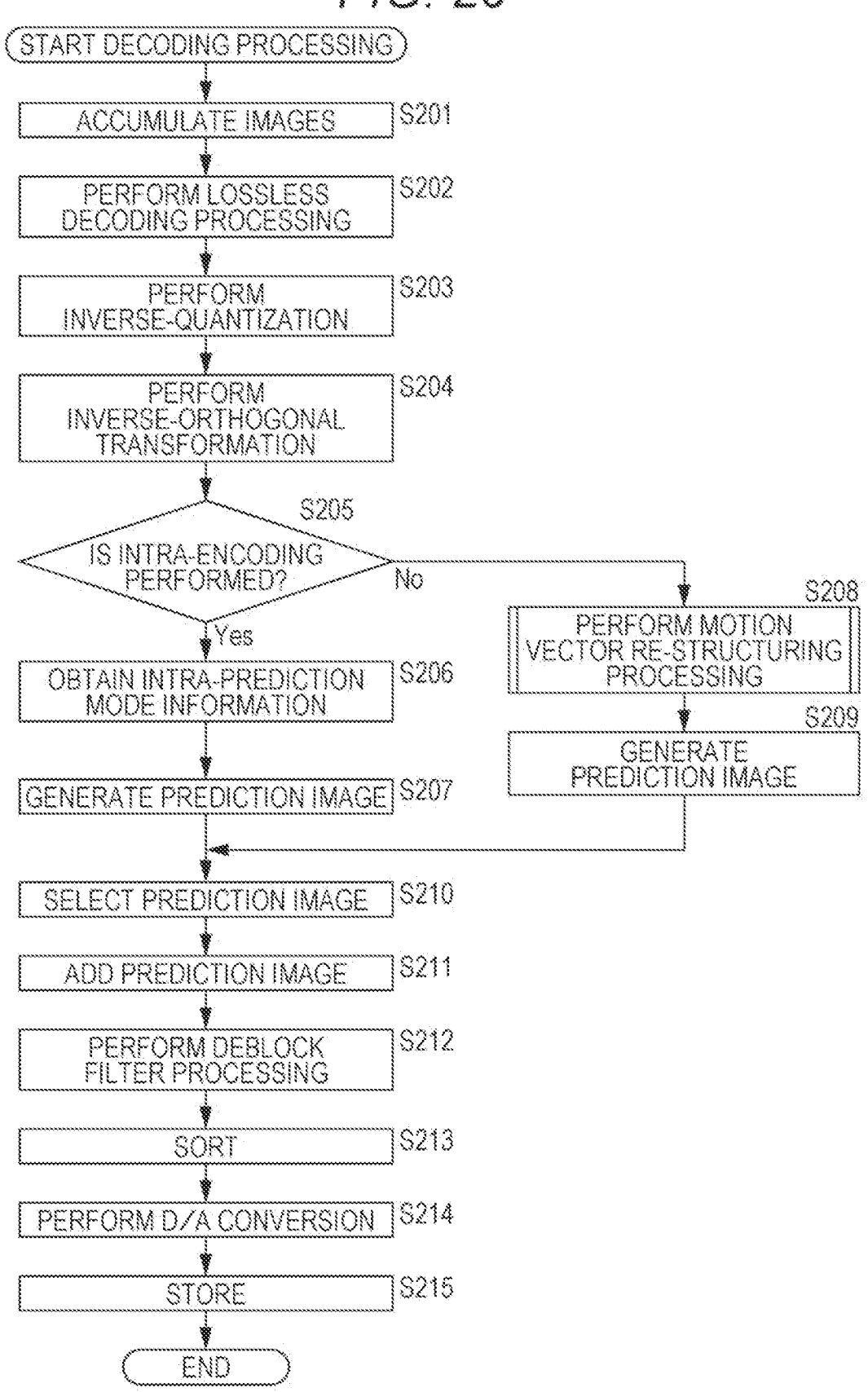

FIG. 20 is a flowchart explaining an example of a flow of decoding processing.

Figure 21:
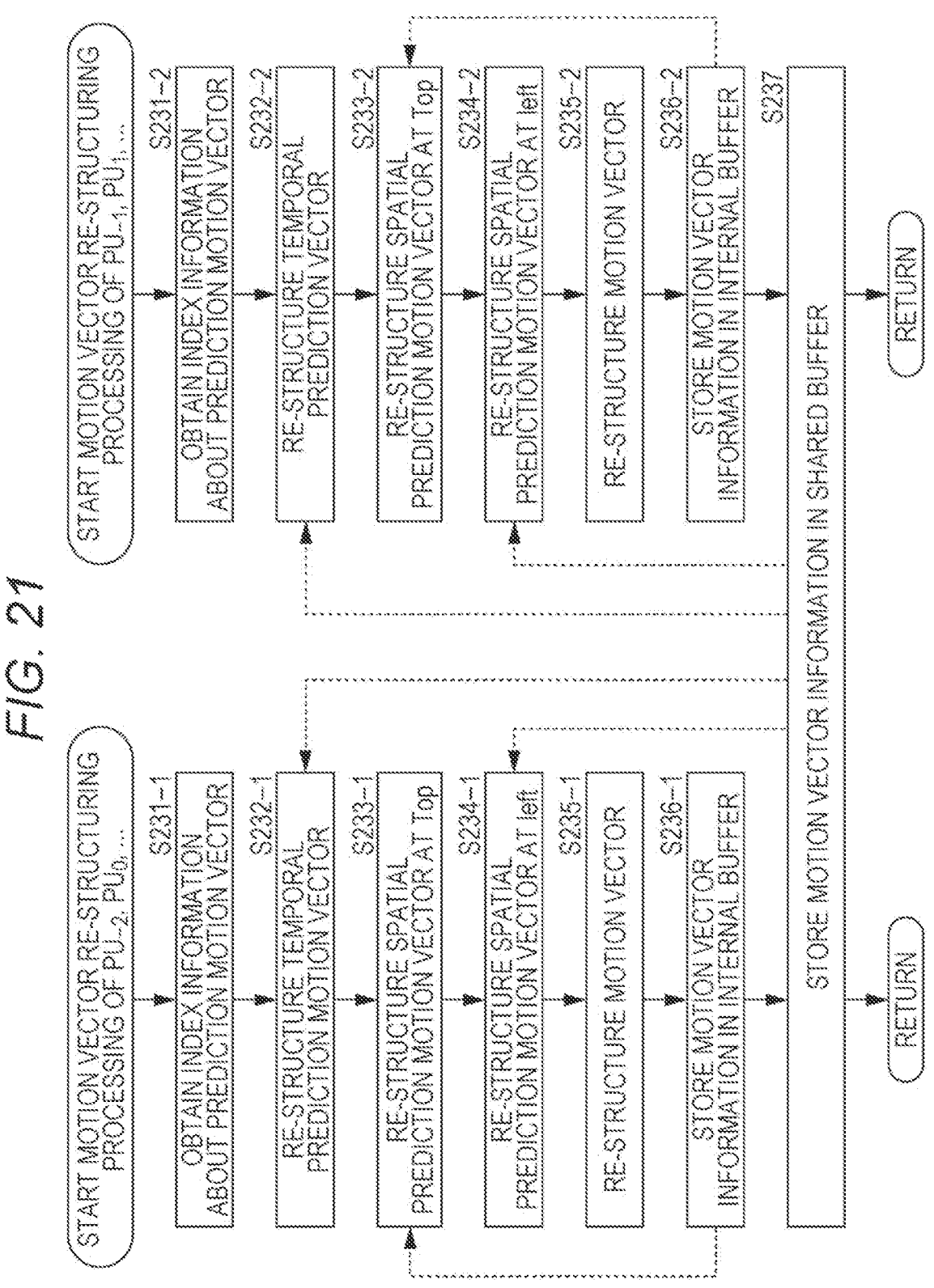

FIG. 21 is a flowchart explaining an example of a flow of motion vector re-structuring processing.

Figure 22:
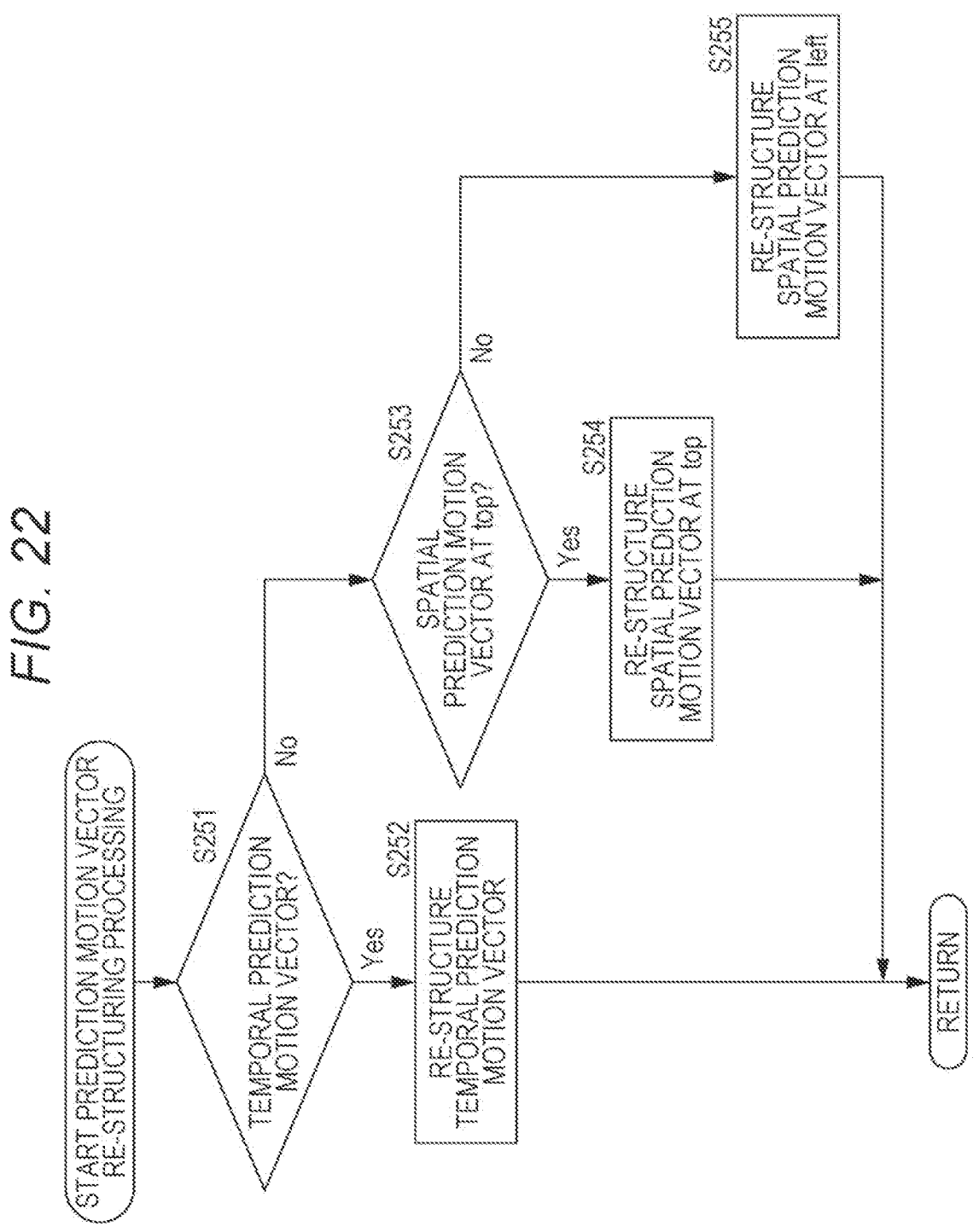

FIG. 22 is a flowchart explaining an example of a flow of prediction motion vector re-structuring processing.

Figure 23:
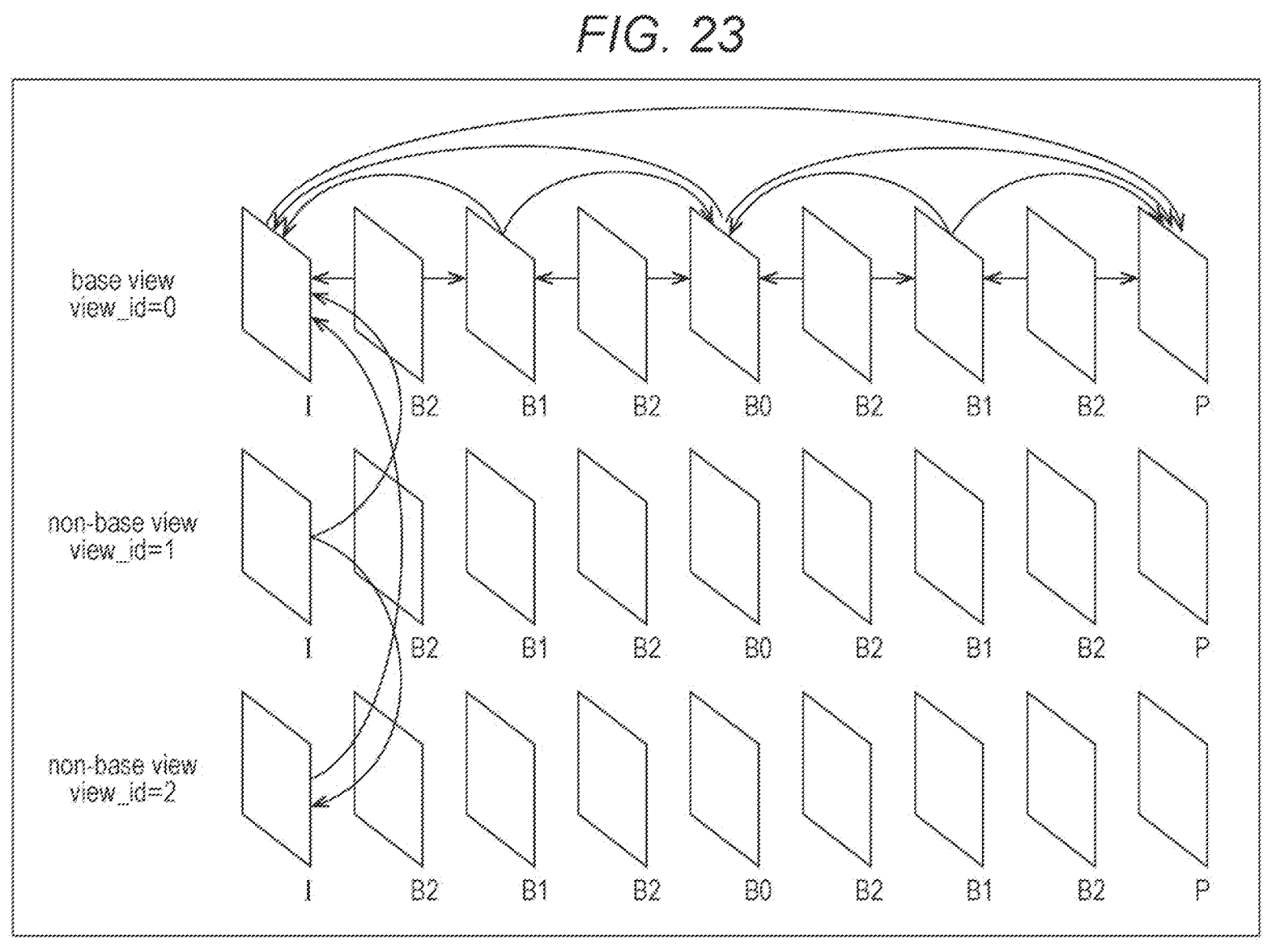

FIG. 23 is a figure illustrating an example of a multi-viewpoint image coding method.

Figure 24:
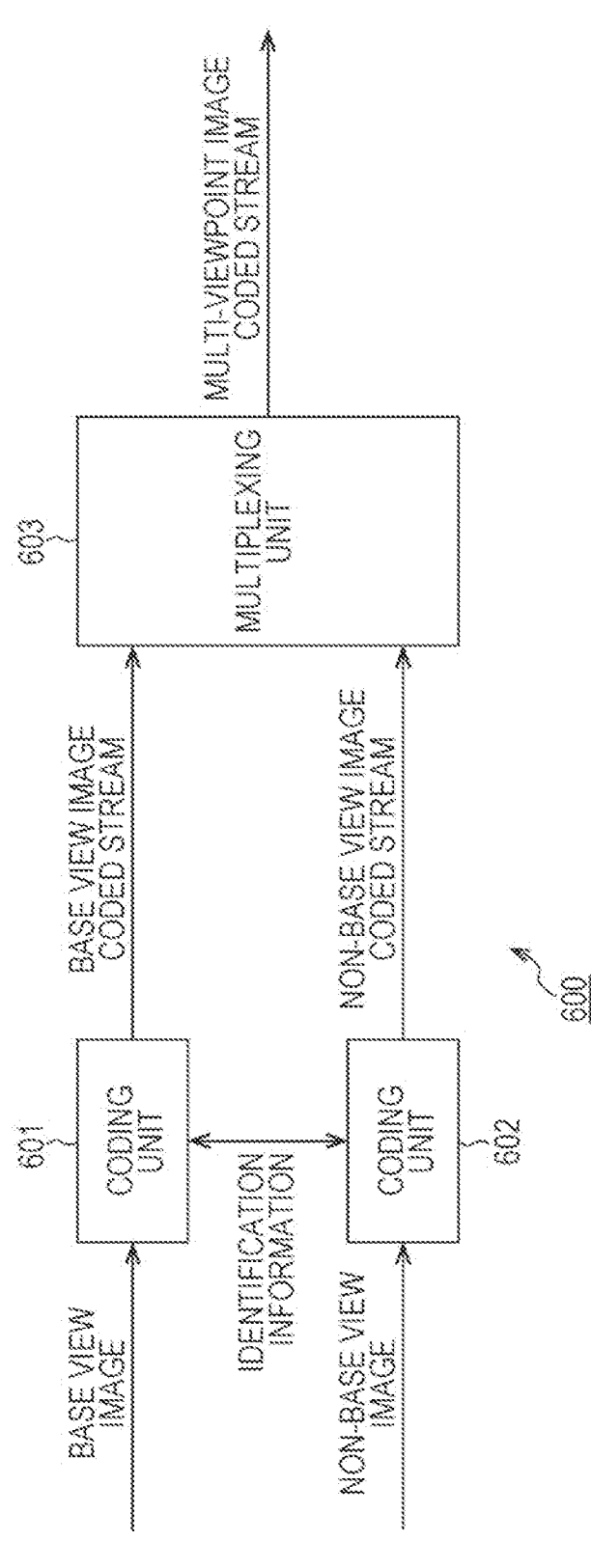

FIG. 24 is a figure illustrating an example of main configuration of a multi-viewpoint image coding device to which the present technique is applied.

Figure 25:
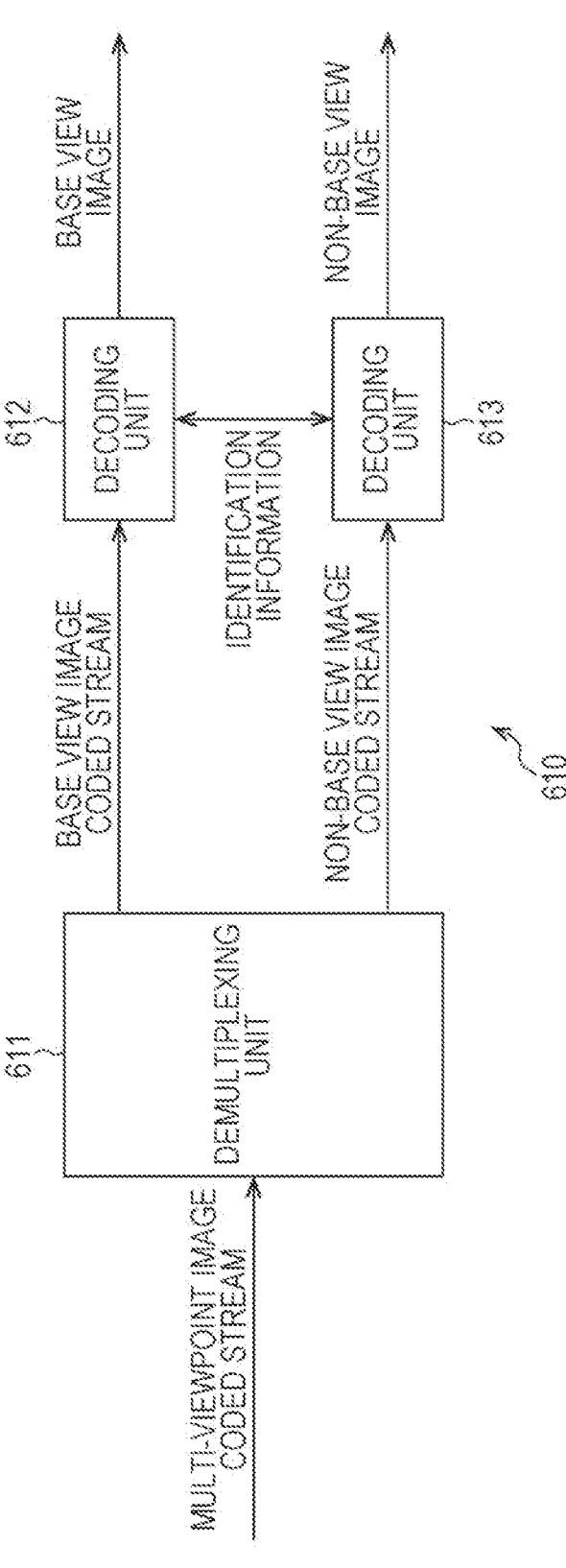

FIG. 25 is a figure illustrating an example of main configuration of a multi-viewpoint image decoding device to which the present technique is applied.

Figure 26:
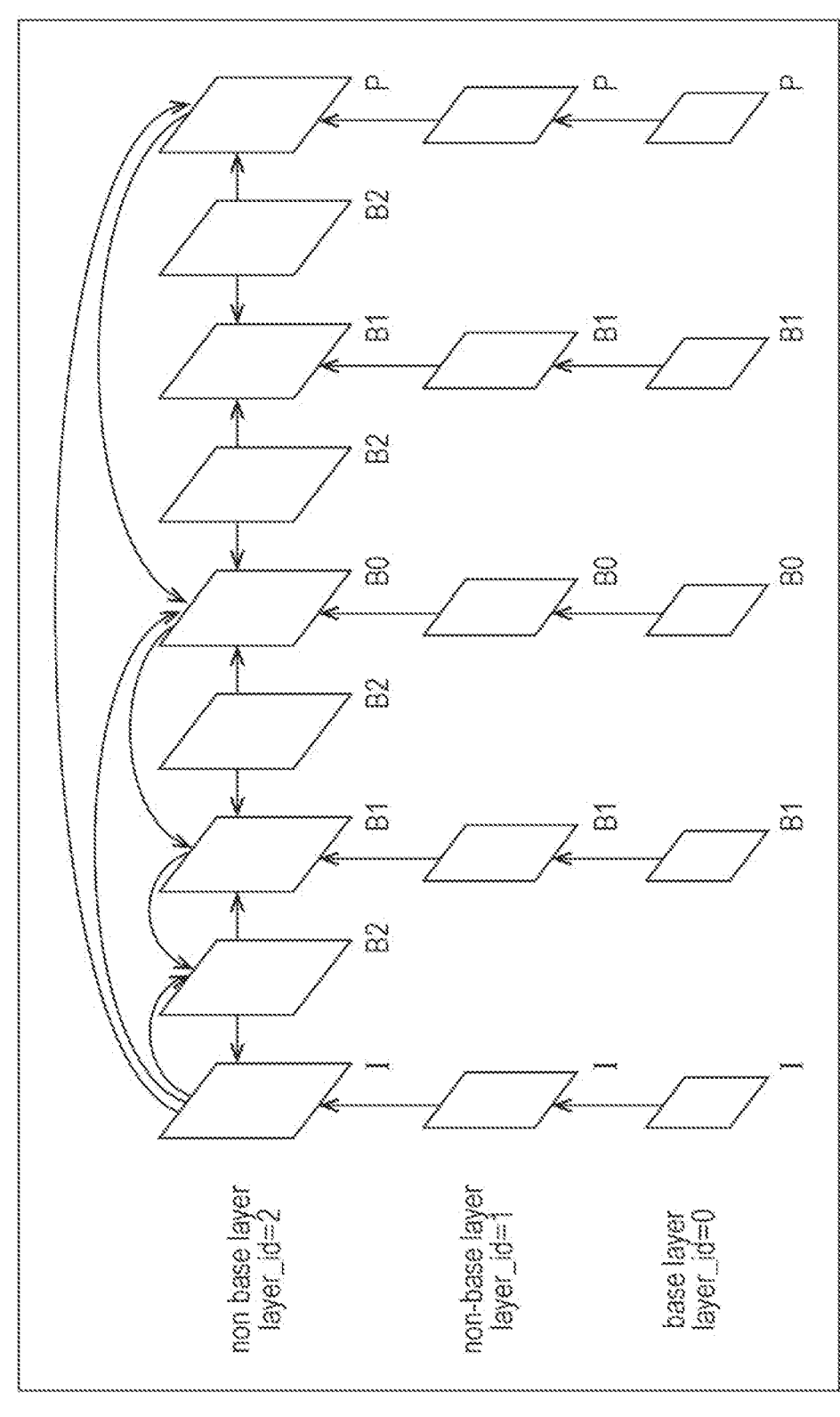

FIG. 26 is a figure illustrating an example of a hierarchical image coding method.

Figure 27:
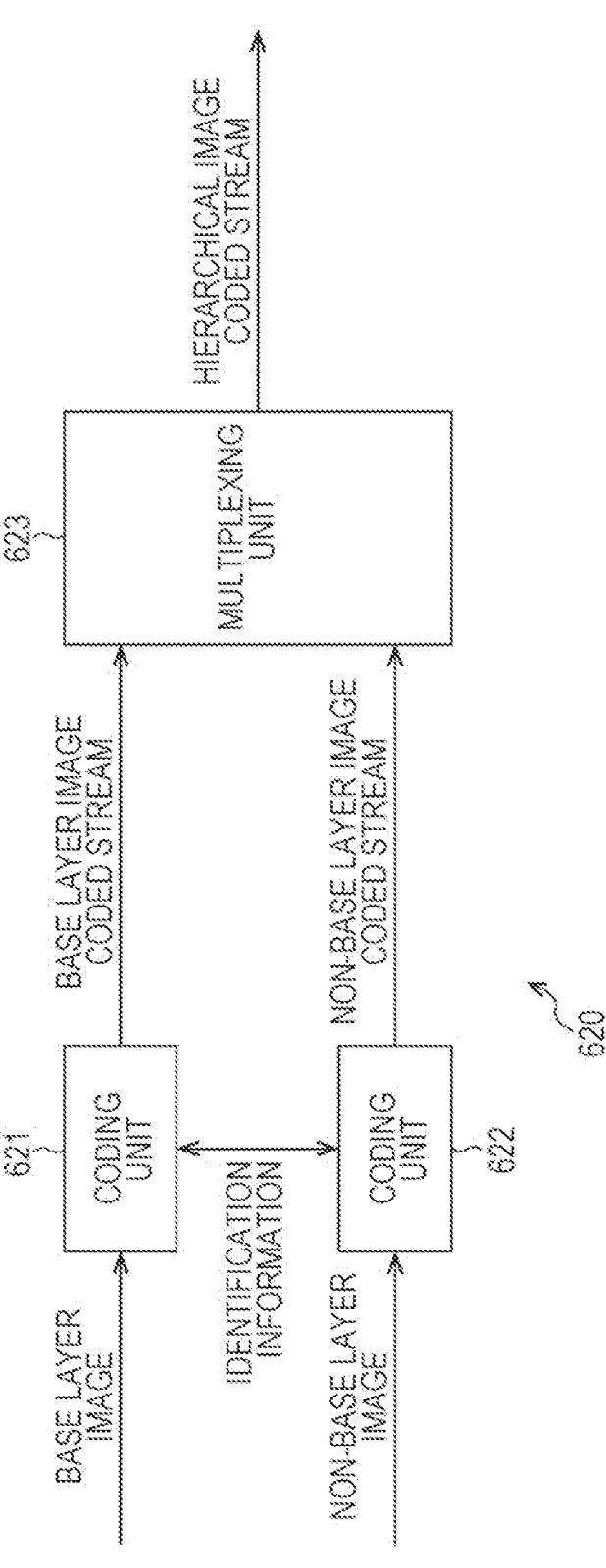

FIG. 27 is a figure illustrating an example of main configuration of a hierarchical image coding device to which the present technique is applied.

Figure 28:
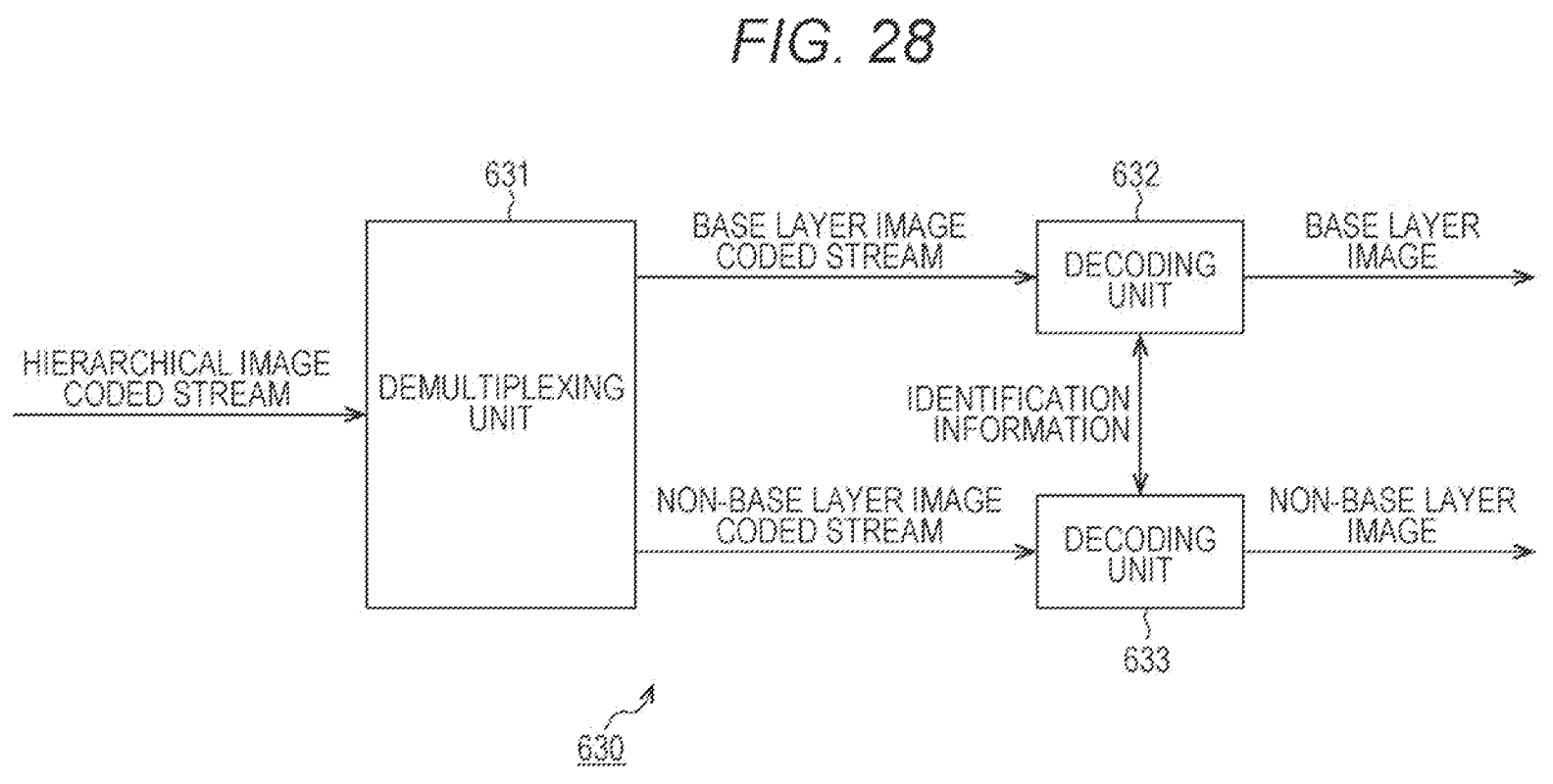

FIG. 28 is a figure illustrating an example of main configuration of a hierarchical image decoding device to which the present technique is applied.

Figure 29:
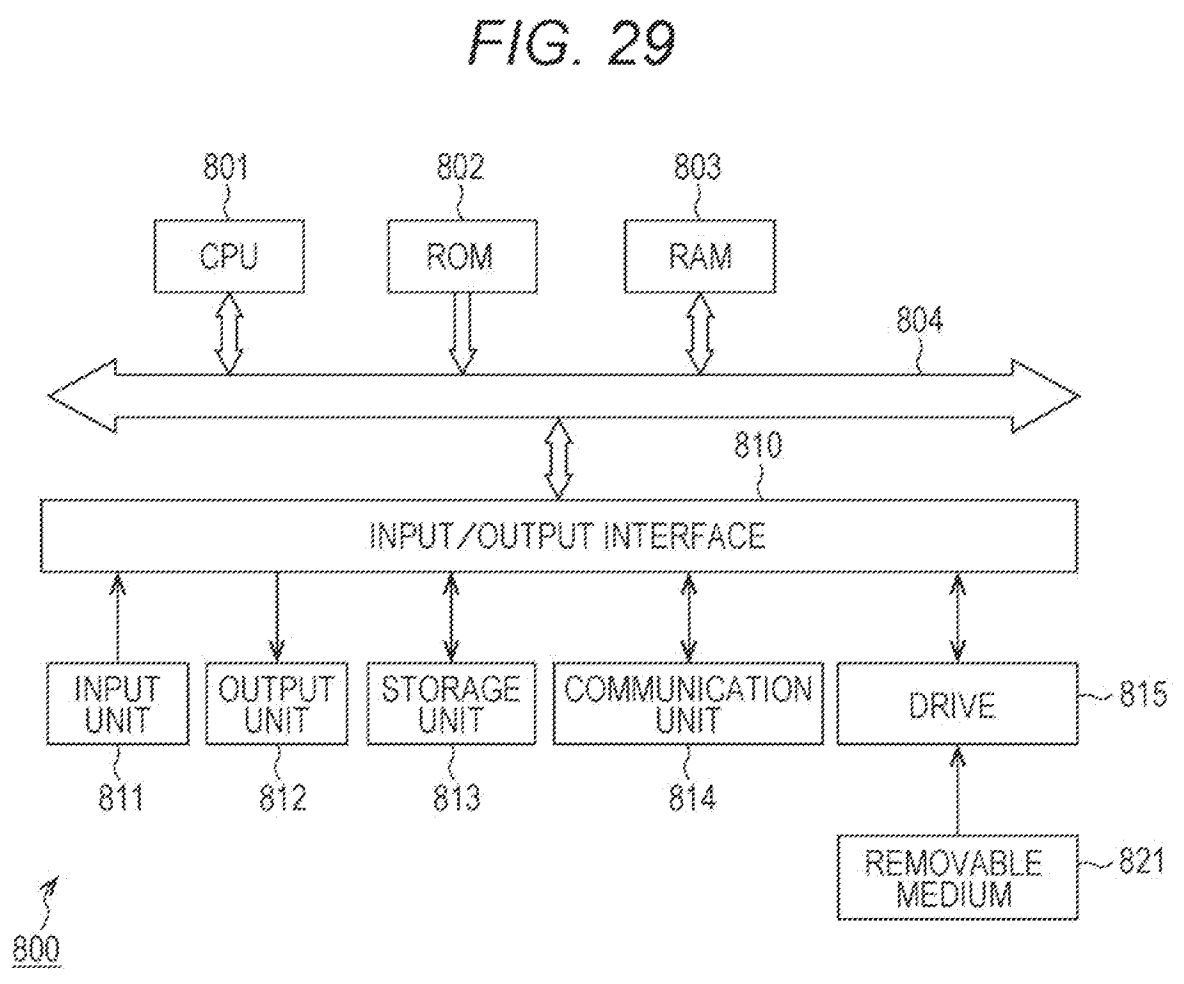

FIG. 29 is a block diagram illustrating an example of main configuration of a computer.

Figure 30:
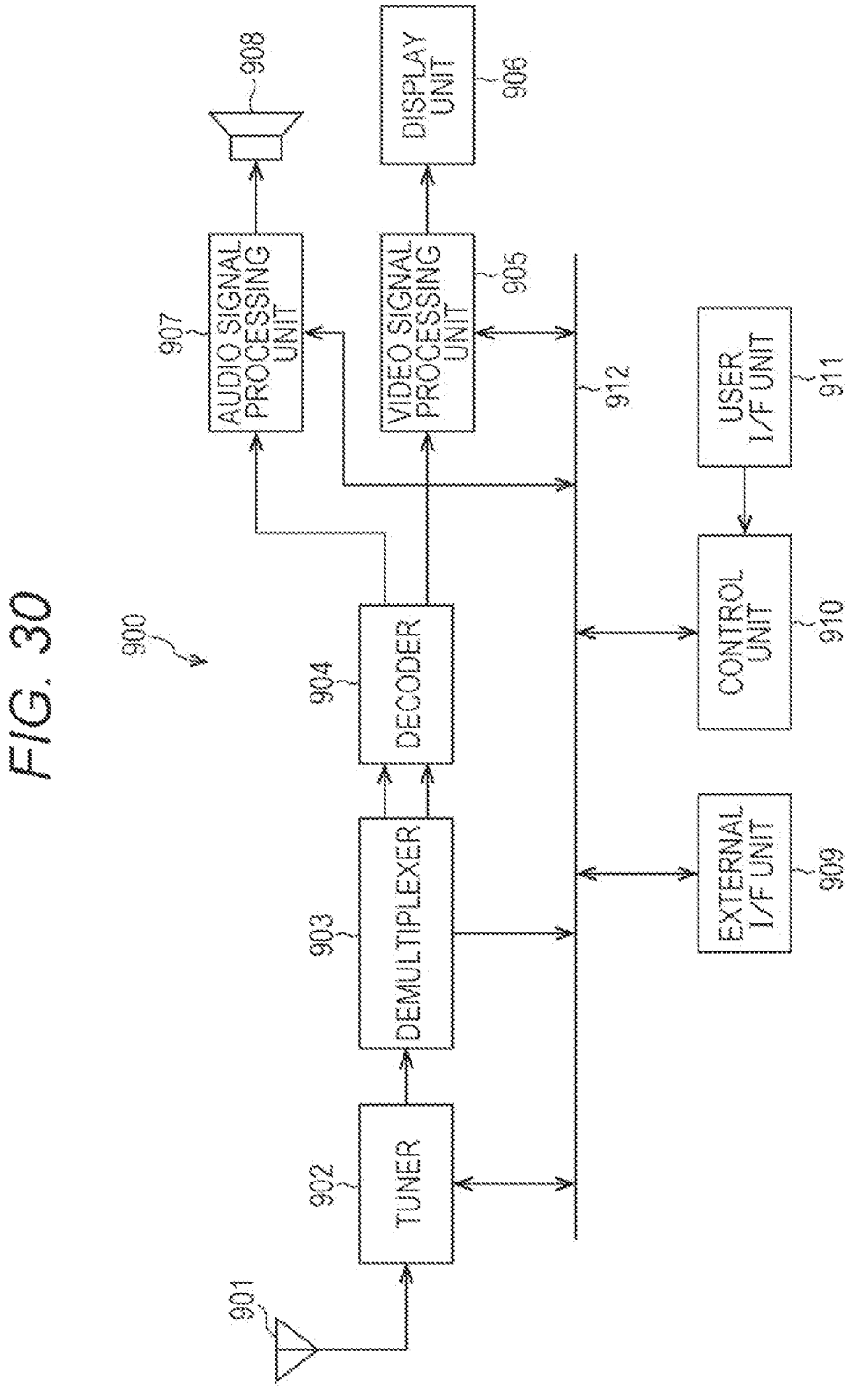

FIG. 30 is a block diagram illustrating an example of schematic configuration of a television device.

Figure 31:
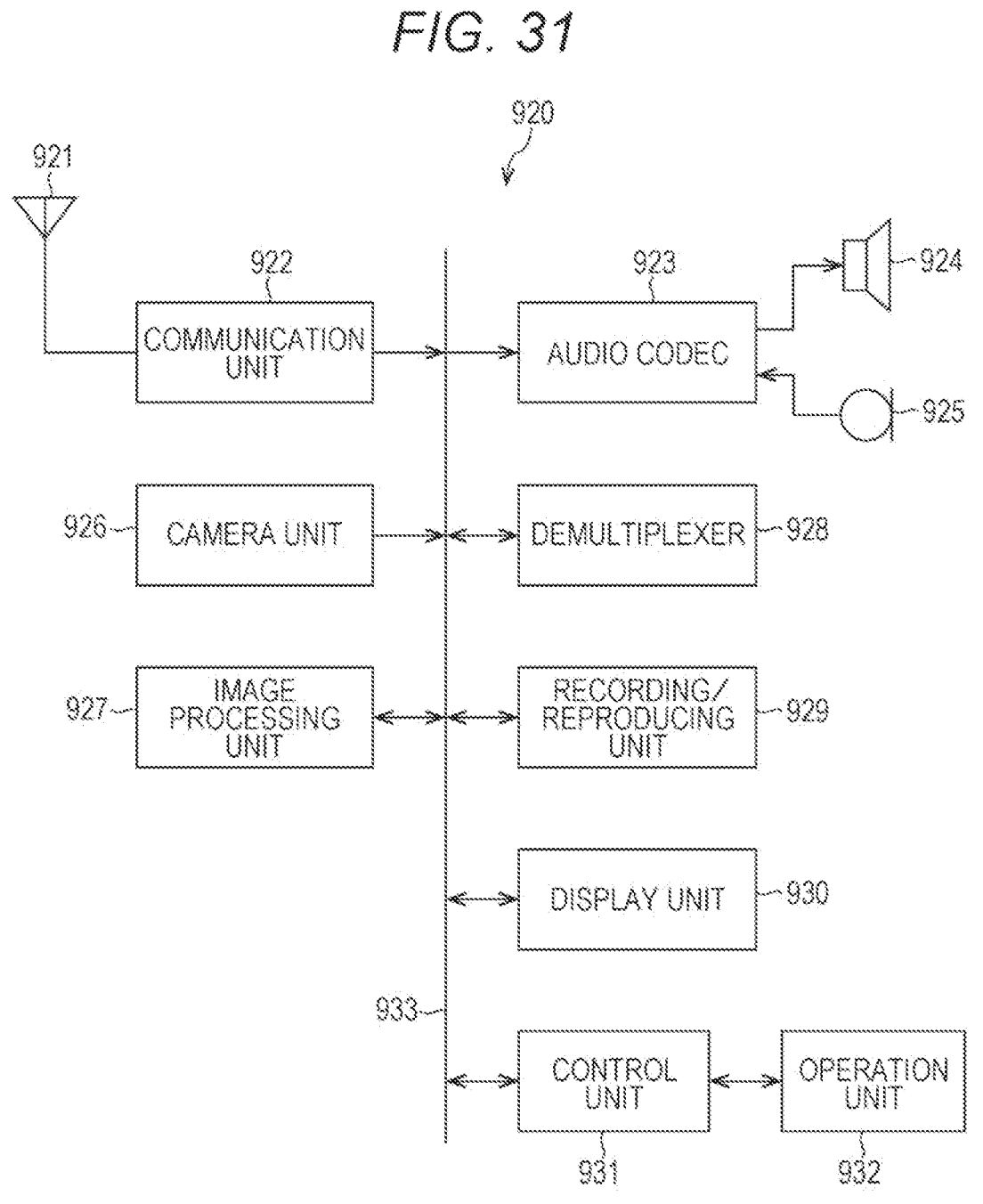

FIG. 31 is a block diagram illustrating an example of schematic configuration of a cellular phone.

Figure 32:
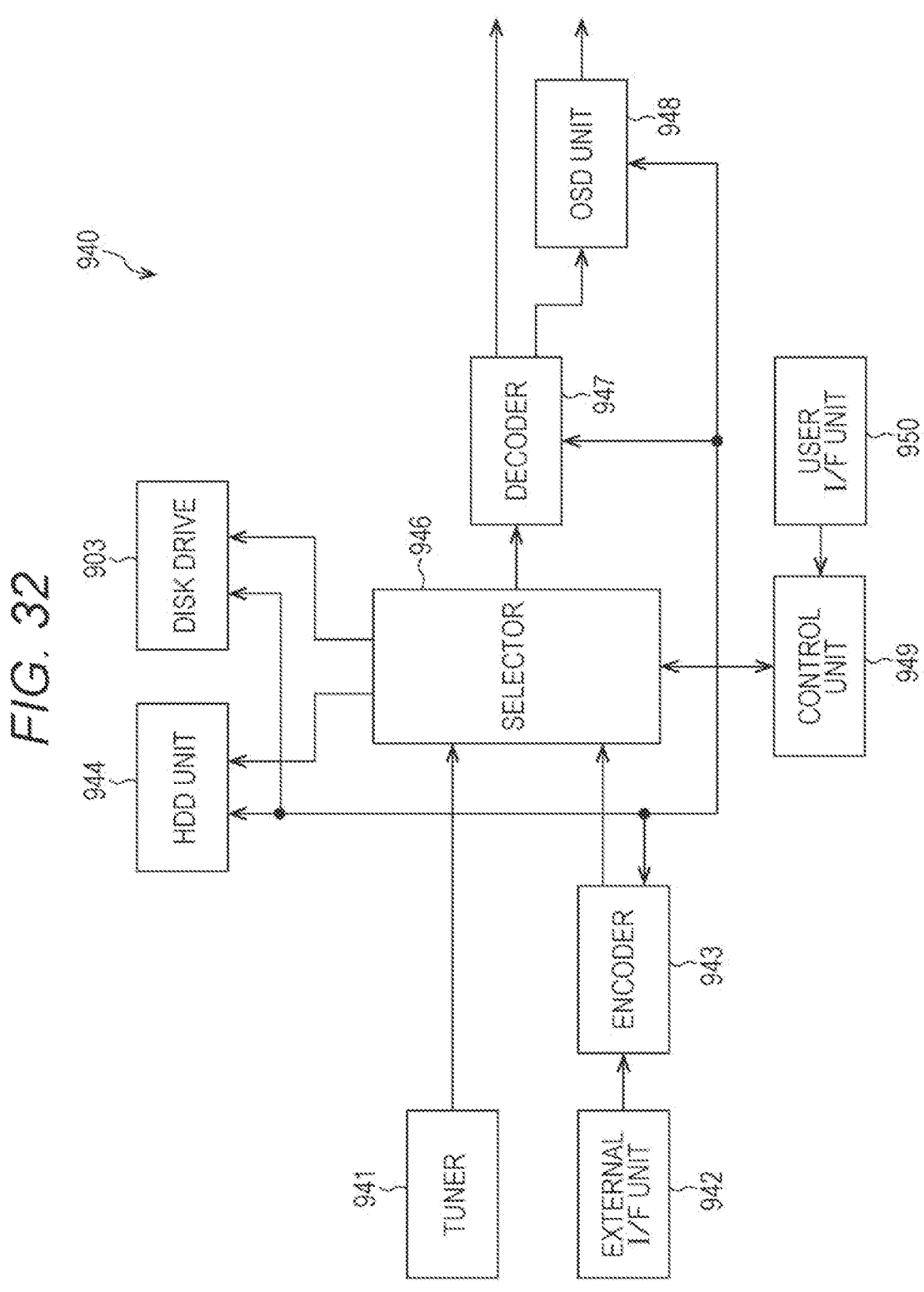

FIG. 32 is a block diagram illustrating an example of schematic configuration of a recording/reproducing device.

Figure 33:
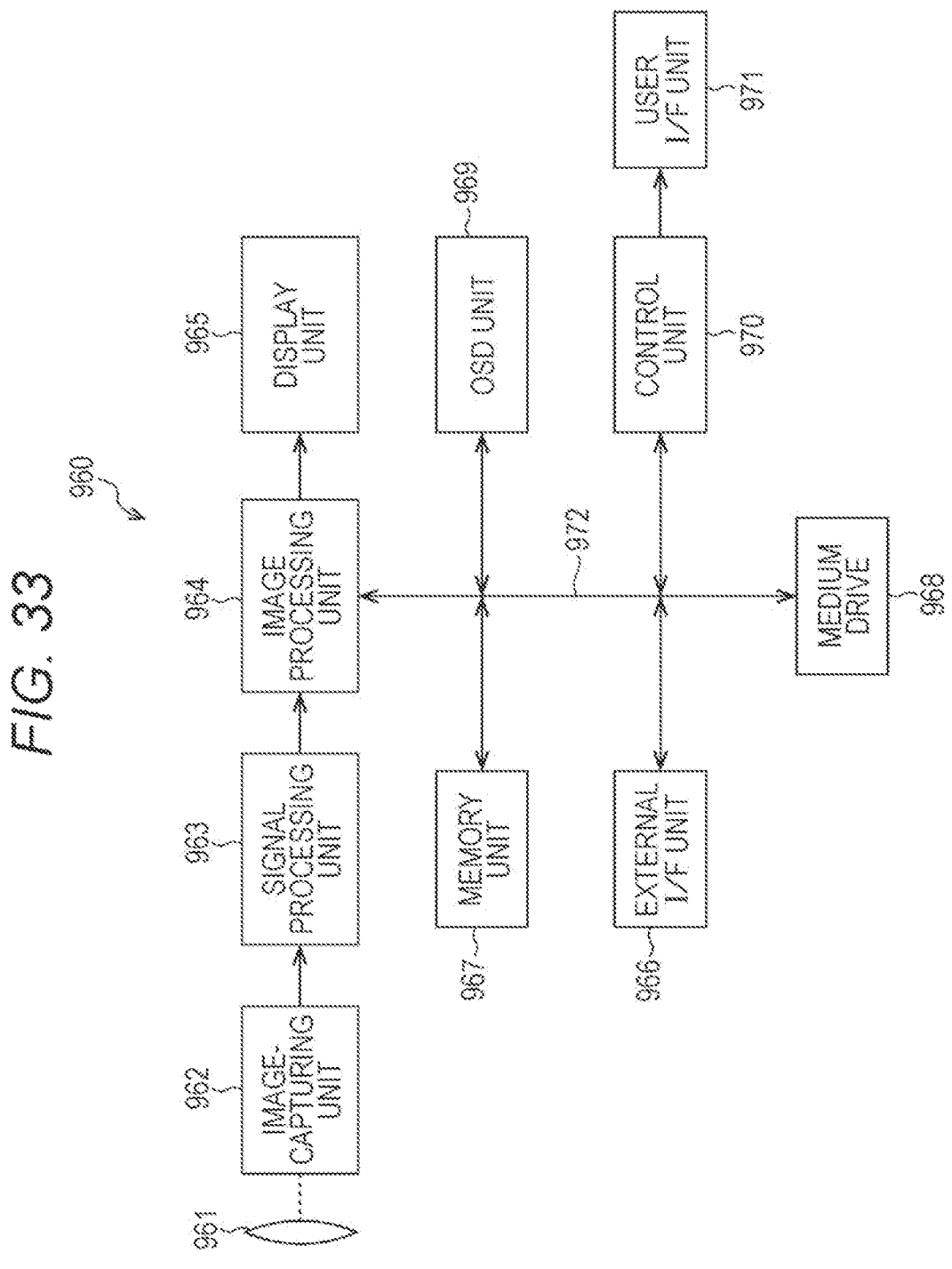

FIG. 33 is a block diagram illustrating an example of schematic configuration of an image-capturing device.

MODES FOR CARRYING OUT THE
INVENTION

Hereinafter, modes for carrying out the present disclosure (hereinafter referred to as embodiments) will be explained. It should be noted that the explanation will be made in the following order.

1. First embodiment (image coding device (control of PU unit))
2. Second embodiment (image decoding device (control of PU unit))
3. Third embodiment (control of LCU unit)
4. Fourth embodiment (multi-viewpoint image coding/multi-viewpoint image decoding device)
5. Fifth embodiment (hierarchical image coding/hierarchical image decoding device)
6. Sixth embodiment (computer)
7. Example of application 1. First Embodiment

[Image Coding Device]

FIG. 1 is a block diagram illustrating an example of main configuration of an image coding device.

The image coding device 100 as illustrated in FIG. 1 encodes image data using, for example, prediction processing according to a method based on HEVC (High Efficiency Video Coding).

As illustrated in FIG. 1, the image coding device 100 includes an A/D conversion unit 101, a screen sorting buffer 102, a calculation unit 103, an orthogonal transformation unit 104, a quantization unit 105, a lossless coding unit 106, and an accumulation buffer 107, an inverse-quantization unit 108, and an inverse-orthogonal transformation unit 109. The image coding device 100 also includes a calculation unit 110, a deblock filter 111, a frame memory 112, a selection unit 113, an intra-prediction unit 114, a motion prediction/compensation unit 115, a prediction image selection unit 116, and a rate control unit 117.

The image coding device 100 further includes a motion vector encoding unit 121 and an adjacent motion vector information setting unit 122.

The A/D conversion unit 101 performs A/D conversion on received image data, and provides converted image data (digital data) to the screen sorting buffer 102 to store the image data therein. The screen sorting buffer 102 sorts images of frames in the stored display order into the order of frames for coding in accordance with GOP (Group Of Picture), and provides the images of which frame order has been sorted to the calculation unit 103. The screen sorting buffer 102 also provides the images of which frame order has been sorted to the intra-prediction unit 114 and the motion prediction/compensation unit 115.

The calculation unit 103 subtracts a prediction image, which is provided from the intra-prediction unit 114 or the motion prediction/compensation unit 115 via the prediction image selection unit 116, from an image read from the screen sorting buffer 102, and provides difference information thereof to the orthogonal transformation unit 104.

For example, in a case of an inter-coded image, the calculation unit 103 subtracts a prediction image, which is provided from the motion prediction/compensation unit 115, from an image read from the screen sorting buffer 102.

The orthogonal transformation unit 104 applies orthogonal transformation such as discrete cosine transform and Karhunen-Loeve conversion on difference information provided from the calculation unit 103. It should be noted that the method of this orthogonal transformation may be any method. The orthogonal transformation unit 104 provides conversion coefficients to the quantization unit 105.

The quantization unit 105 quantizes the conversion coefficients from the orthogonal transformation unit 104. The quantization unit 105 sets and quantizes the quantization parameter on the basis of information about a target value of the amount of codes provided from the rate control unit 117. It should be noted that the method of quantization may be any method. The quantization unit 105 provides the quantized conversion coefficients to the lossless coding unit 106.

The lossless coding unit 106 encodes the conversion coefficients quantized by the quantization unit 105 using any coding method. The coefficient data are quantized under the control of the rate control unit 117, and therefore, the amount of codes becomes a target value set by the rate control unit 117 (or becomes close to the target value).

Further, the lossless coding unit 106 obtains information indicating a mode of intra-prediction and the like from the intra-prediction unit 114, and obtains information indicating a mode of inter-prediction, difference motion vector information, and the like from the motion prediction/compensation unit 115.

The lossless coding unit 106 encodes various kinds of information as described above using any coding method, and makes the information into a part of header information of coded data (also referred to as coded stream) (multiplexing). More specifically, the lossless coding unit 106 is also a setting unit which sets header information. The lossless coding unit 106 provides the coded data obtained from coding to the accumulation buffer 107 to accumulate the coded data therein.

Examples of coding methods of the lossless coding unit 106 include variable length coding or arithmetic coding. An example of variable length coding includes CAVLC (Context-Adaptive Variable Length Coding) and the like defined in H.264/AVC method. An example of arithmetic coding includes CABAC (Context-Adaptive Binary Arithmetic Coding).

The accumulation buffer 107 temporarily holds coded data provided by the lossless coding unit 106. With predetermined timing, the accumulation buffer 107 outputs the coded data held therein to, for example, a recording device (recording medium), and a transmission path, not shown, provided in a later stage. More specifically, the accumulation buffer 107 is also a transmission unit which transmits coded data.

The conversion coefficients quantized by the quantization unit 105 is also provided to the inverse-quantization unit 108. The inverse-quantization unit 108 dequantizes the quantized conversion coefficients according to a method corresponding to the quantization by the quantization unit 105. The method of the inverse-quantization may be any method as long as it is a method corresponding to the quantization processing by the quantization unit 105. The inverse-quantization unit 108 provides the obtained conversion coefficients to the inverse-orthogonal transformation unit 109.

The inverse-orthogonal transformation unit 109 performs inverse-orthogonal transformation on the conversion coefficients provided by the inverse-quantization unit 108 according to a method corresponding to the orthogonal transformation processing by the orthogonal transformation unit 104. The method of the inverse-orthogonal transformation may be any method as long as it is a method corresponding to the orthogonal transformation processing by the orthogonal transformation unit 104. The output obtained from the inverse-orthogonal transformation (restored difference information) is provided to the calculation unit 110.

The calculation unit 110 adds a prediction image, which is provided from the intra-prediction unit 114 or the motion prediction/compensation unit 115 via the prediction image selection unit 116, to restored difference information which is an inverse-orthogonal transformation result provided from the inverse-orthogonal transformation unit 109, thus obtaining a locally decoded image (decoded image). This decoded image is provided to the deblock filter 111 or the frame memory 112.

The deblock filter 111 performs, as necessary, deblock filter processing on the decoded image provided from the calculation unit 110. For example, the deblock filter 111 performs deblock filter processing on the decoded image, thus removing block distortion in the decoded image.

The deblock filter 111 provides the filter processing result (the decoded image after the filter processing) to the frame memory 112. It should be noted that, as described above, the decoded image which is output from the calculation unit 110 may be provided to the frame memory 112 without passing the deblock filter 111. More specifically, the filter processing that is performed by the deblock filter 111 may be omitted.

The frame memory 112 stores the provided decoded image, and with predetermined timing, provides the stored decoded image to the selection unit 113 as a reference image.

The selection unit 113 selects the destination of the reference image provided from the frame memory 112. For example, in a case of inter-prediction, the selection unit 113 provides the reference image, which is provided from the frame memory 112, to the motion prediction/compensation unit 115.

The intra-prediction unit 114 uses pixel values in a processing target picture which is a reference image provided from the frame memory 112 via the selection unit 113 to perform intra-prediction (prediction within screen) for generating a prediction image by basically adopting a prediction unit (PU) as a processing unit. The intra-prediction unit 114 performs this intra-prediction with multiple intra-prediction modes that are prepared in advance.

The intra-prediction unit 114 generates prediction images with all the intra-prediction modes which can be candidates, and uses an input image provided from the screen sorting buffer 102 to evaluate cost function value of each prediction image, thus selecting the optimum mode. When the optimum intra-prediction mode is selected, the intra-prediction unit 114 provides the prediction image generated with the optimum mode to the prediction image selection unit 116.

As described above, the intra-prediction unit 114 provides intra-prediction mode information and the like indicating the employed intra-prediction mode to the lossless coding unit 106 as necessary, and have the lossless coding unit 106 to perform encoding.

The motion prediction/compensation unit 115 uses an input image provided from the screen sorting buffer 102 and a reference image provided from the frame memory 112 via the selection unit 113 to perform the motion prediction (inter-prediction) basically adopting the PU as a processing unit. The motion prediction/compensation unit 115 provides the detected motion vector to the motion vector encoding unit 121, and at the same time performs the motion compensation processing in accordance with the detected motion vector, thus generating a prediction image (inter-prediction image information). The motion prediction/compensation unit 115 performs the inter-prediction, which has been explained above, with multiple inter-prediction modes that have been prepared in advance.

The motion prediction/compensation unit 115 generates a prediction image with all the inter-prediction modes which can be candidates. The motion prediction/compensation unit 115 generates a difference motion vector which is a difference between the motion vector of a target region and the prediction motion vector of the target region provided from the motion vector encoding unit 121. Further, the motion prediction/compensation unit 115 uses the input image provided from the screen sorting buffer 102, information of the difference motion vector which has been generated, and the like, to evaluate the cost function value of each prediction image, thus selecting the optimum mode. When the optimum inter-prediction mode is selected, the motion prediction/compensation unit 115 provides the prediction image generated with the optimum mode to the prediction image selection unit 116.

When information indicating the employed inter-prediction mode and the coded data are decoded, the motion prediction/compensation unit 115 provides information required for performing processing with the inter-prediction mode thereof and the like to the lossless coding unit 106, and causes the lossless coding unit 106 to encode the information. Examples of the required information include information of a difference motion vector which has been generated, and a flag indicating an index of a prediction motion vector serving as prediction motion vector information.

The prediction image selection unit 116 selects the source of the prediction image provided to the calculation unit 103 and the calculation unit 110. For example, in a case of inter-coding, the prediction image selection unit 116 selects the motion prediction/compensation unit 115 as a source of prediction image, and provides a prediction image, which is provided from the motion prediction/compensation unit 115 to the calculation unit 103 and the calculation unit 110.

The rate control unit 117 controls the rate of the quantization operation of the quantization unit 105 so as not to cause overflow and underflow, on the basis of the amount of codes of the coded data accumulated in the accumulation buffer 107.

The motion vector encoding unit 121 stores the motion vector derived by the motion prediction/compensation unit 115. The motion vector encoding unit 121 predicts the motion vector of the target region. More specifically, the motion vector encoding unit 121 generates a prediction motion vector (predictor) used for encoding or decoding of a motion vector. It should be noted that a target region with regard to a motion vector (current block) means a target PU (hereinafter also referred to as a PU in question as necessary).

In this case, the types of prediction motion vectors include a temporal prediction motion vector (temporal predictor) and a spatial prediction motion vector (spacial predictor). The temporal prediction motion vector is a prediction motion vector that is generated using a motion vector of an adjacent region which is adjacent to the target region in terms of time. The spatial prediction motion vector is a prediction motion vector that is generated using a motion vector of an adjacent region which is adjacent to the target region in terms of space.

More specifically, the motion vector encoding unit 121 uses a motion vector of an adjacent region (adjacent block) which is adjacent to the target region (the current block) in terms of time to generate a temporal prediction motion vector. Further, the motion vector encoding unit 121 uses a motion vector of an adjacent region of which use is not prohibited by the adjacent motion vector information setting unit 122 among adjacent regions adjacent to the target region in terms of space, to generate a spatial prediction motion vector. The motion vector encoding unit 121 provides an optimum prediction motion vector that can be optimum among the generated prediction motion vectors, to the motion prediction/compensation unit 115 and the adjacent motion vector information setting unit 122.

The adjacent motion vector information setting unit 122 makes such setting for the motion vector encoding unit 121 that the motion vector of certain adjacent region among adjacent regions adjacent to the target region in terms of space is to be used or to be prohibited from being used. More specifically, the adjacent motion vector information setting unit 122 prohibits the motion vector encoding unit 121 from using the motion vector of the adjacent region located adjacent to the top right with respect to the target region.

It should be noted that in the explanation about the present embodiment, it is assumed that prediction of a motion vector indicates processing for generating a prediction motion vector, and encoding of a motion vector indicates processing for deriving a difference motion vector by generating a prediction motion vector and using the prediction motion vector that has been generated. More specifically, the encoding processing of a motion vector includes prediction processing of a motion vector. Likewise, in the explanation, it is assumed that decoding of a motion vector indicates processing for re-structuring a motion vector by generating a prediction motion vector and using the prediction motion vector that has been generated. More specifically, the decoding processing of a motion vector includes prediction processing of a motion vector.

Further, in the explanation below, it is assumed that an adjacent region that is adjacent to the target region explained above is a surrounding region located around the target region, and both of the terms mean the same region.

It should be noted that the example of FIG. 1 shows an example where the adjacent motion vector information setting unit 122 is provided outside the motion vector encoding unit 121, but the adjacent motion vector information setting unit 122 may be configured to be included in the motion vector encoding unit 121.

[Median Prediction of Motion Vector]

FIG. 2 is an explanatory diagram illustrating median prediction of a motion vector achieved according to AVC method.

Each straight line as shown in FIG. 2 indicates a border of motion compensation blocks. In FIG. 2, reference symbol E denotes a motion compensation block in question, which is going to be encoded. Reference symbols A to D respectively denote motion compensation blocks which have been already encoded and which are adjacent to E.

Now, suppose that X=A, B, C, D, E, and motion vector information with respect to X is defined as mvx.

First, using the motion vector information about the motion compensation blocks A, B, and C, prediction motion vector information pmvE with respect to the motion compensation block E is generated by median operation according to the following expression (1).

[Mathematical Formula 1]

$$pmv_E = med(mv_A, mv_B, mv_C) \qquad (1)$$

When the information about the motion compensation block C is not available (unavailable) because, for example, it is at the end of the image frame, then the information about the motion compensation block D is used instead.

Data mvdE encoded as the motion vector information with respect to the motion compensation block E in the image compression information are generated using pmvE as shown by the following expression (2).

[Mathematical Formula 2]

$$mvd_E = mv_E - pmv_E \qquad (2)$$

It should be noted that the autoprocessing is performed independently on each of the components in the horizontal direction and the vertical direction of the motion vector information.

[Multi-Reference Frame]

Further, in the AVC method, a method called Multi-Reference Frame (multi-(multiple) reference frame), which has not been specified in conventional image coding methods such as MPEG2, H.263, and the like, is specified.

The multi-reference frame (Multi-Reference Frame), which is specified in the AVC method, will be hereinafter explained with reference to FIG. 3.

More specifically, in MPEG-2 and H.263, in a case of P picture, motion prediction/compensation processing is performed by referring to only one reference frame stored in the frame memory. In contrast, in the AVC method, as illustrated in FIG. 3, multiple reference frames are stored in memories, and different memories can be referred to for each macro block.

[Direct Mode]

With the multi-reference frames explained above, the amount of information in the motion vector information in B picture is enormous, but in the AVC method, a mode called Direct Mode (direct mode) is prepared.

In this direct mode, the motion vector information is not stored in the image compression information. In the image decoding device, the motion vector information of the block in question is calculated from the motion vector information of surrounding blocks or the motion vector information of a Co-Located block which is a block at the same position as the processing target block in a reference frame.

In the direct mode (Direct Mode), there are two types of modes, i.e., Spatial Direct Mode (spatial direct mode) and Temporal Direct Mode (time direct mode), which can be switched for each slice.

In the spatial direct mode (Spatial Direct Mode), as shown in the following expression (3), the motion vector information mvE of the processing target motion compensation block E is calculated.

$$mvE = pmvE \qquad (3)$$

More specifically, the motion vector information generated by Median (median) prediction is applied to the block in question.

In the explanation below, the time direct mode (Temporal Direct Mode) will be explained with reference to FIG. 4.

In FIG. 4, in an L0 reference picture, a block having the same address in the space as the block in question will be referred to as a Co-Located block, and motion vector information in the Co-Located block will be referred to as $mv_{col}$. A distance on the time axis between the picture in question and the L0 reference picture will be referred to as $TD_B$, and a distance on the time axis between the L0 reference picture and an L1 reference picture will be referred to as $TD_D$.

At this occasion, motion vector information mvL1 of motion vector information $mv_{L0}$ and $_{L1}$ of L0 in the picture in question is calculated according to the following expression (4) and expression (5).

[Mathematical Formula 3]

$$mv_{L0} = \frac{TD_B}{TD_D} mv_{col} \qquad (4)$$

[Mathematical Formula 4]

$$mv_{L1} = \frac{TD_D - TD_B}{TD_D} mv_{col} \qquad (5)$$

It should be noted that, in the AVC image compression information, there does not exist any information $T_D$ representing the distance on the time axis, and therefore, using the POC (Picture Order Count), the calculation of the expression (4) and the expression (5) explained above is performed.

Further, in the AVC image compression information, the direct mode (Direct Mode) can be defined in a 16 by 16 pixel macro block unit or in an 8 by 8 pixel block unit.

[MV Competition of Motion Vector]

By the way, in order to improve the encoding of a motion vector using the median prediction which has been explained with reference to FIG. 2, a method as described below has been suggested in Non-Patent Document 1.

More specifically, not only "Spatial Predictor (spatial prediction motion vector)" defined in the AVC but also any of "Temporal Predictor (temporal prediction motion vector)" and "Spatio-Temporal Predictor (prediction motion vector of time and space)" which will be explained below can be adaptively used as prediction motion vector information. This method suggested above is called MV Competition (MVCompetition) in the AVC. In contrast, in the HEVC, this is called Advanced Motion Vector Prediction (AMVP), and hereinafter the method suggested above will be referred to as AMVP in the explanation.

Figure 5:
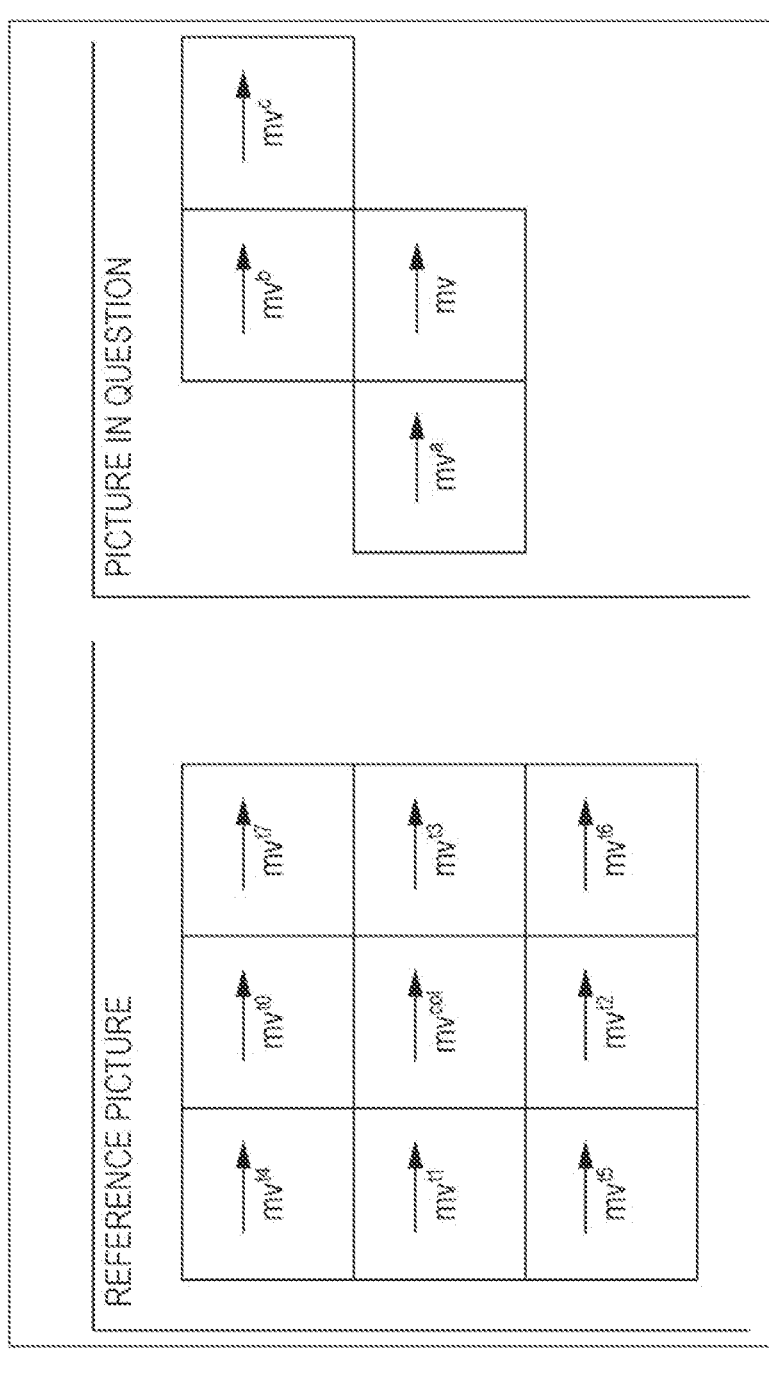

In FIG. 5, "$mv_{col}$" is the motion vector information with respect to the Co-Located block with respect to the block in question. Further, suppose that $mv_t$ (k=0 to 8) is motion vector information of the surrounding blocks thereof, prediction motion vector information (Predictor) of each of them is defined by the following expression (6) to expression (8). It should be noted that the Co-Located block with respect to the block in question means a block of which xy coordinate in the reference picture which is referred to by the picture in question is the same as the block in question.

Temporal Predictor:

[Mathematical Formula 5]

$$mv_{tm5} = median\{mv_{col}, mv_{t0}, \ldots, mv_{t3}\} \qquad (6)$$

[Mathematical Formula 6]

$$mv_{tm9} = median\{mv_{col}, mv_{t0}, \ldots, mv_{t8}\} \qquad (7)$$

Spatio-Temporal Predictor:

[Mathematical Formula 7]

$$mv_{spt} = median\{mv_{col}, mv_{col}, mv_a, mv_b, mv_c\} \qquad (8)$$

For each of the blocks the image coding device 100 calculates the cost function value in a case where each of pieces of the prediction motion vector information is used, and selects the optimum prediction motion vector information. In the image compression information, a flag indicating information (index) about the prediction motion vector information used for each block is transmitted.

[Coding Unit]

By the way, making a macro block size of 16 pixel by 16 pixels is not suitable for a large image frame such as UHD (Ultra High Definition; 4000 pixel by 2000 pixels) which is a target of next-generation coding method.

Therefore, in the AVC method, a hierarchical structure of macro blocks and sub-macro blocks is specified, but for example, in the HEVC method, a coding unit (CU (Coding Unit)) is specified as illustrated in FIG. 6.

The CU is also referred to as a Coding Tree Block (CTB), and is a partial region of an image of picture unit, which plays the same role as the macro block in the AVC method. In the latter, the size is fixed to 16 by 16 pixels, but in the former, the size is not fixed, and in each sequence, the size is designated in image compression information.

For example, in Sequence Parameter Set (SPS) included in the coded data which are to be output, the maximum size of the CU (LCU (Largest Coding Unit)) and the minimum size thereof ((SCU (Smallest Coding Unit)).

In each LCU, split-flag is 1 as long as the size is not less than the size of SCU, and accordingly, it is possible to divide a CU into CUs of a smaller size. In the example of FIG. 6, the size of the LCU is 128, and the maximum hierarchical depth is 5. When the value of split_flag is "1", a CU of which size is 2N by 2N is divided into CUs of which size is N by N, which is a hierarchy in one level below.

Further, the CU is divided into Prediction Units (PUs), which are areas serving as processing unit of intra- or inter-prediction (partial area s of image of picture unit), and divided into Transform Units (TUs) which are areas serving as processing unit of orthogonal transformation (partial area s of image of picture unit). Currently, in the HEVC method, not only 4 by 4 and 8 by 8 but also 16 by 16 and 32 by 32 orthogonal transformation can be used.

In a case of a coding method in which, as the HEVC method explained above, a CU is defined and various kinds of processing are performed by adopting the CU as a unit, the macro block according to the AVC method can be considered to correspond to the LCU, and the block (sub-block) can be considered to correspond to the CU. Further, the motion compensation block according to the AVC method can be considered to correspond to the PU. However, the CU has a hierarchical structure, and therefore, in general, the size of the LCU in the topmost level thereof is set to be larger than the macro block according to the AVC method, for example, 128 by 128 pixels.

Therefore, hereinafter, the LCU also includes the macro block according to the AVC method, and the CU also includes the block (sub-block) according to the AVC method.

[Merge of Motion Partition]

By the way, as one of coding methods of motion information, a method called Motion Partition Merging (Merge Mode) as shown in FIG. 7 has been suggested. In this method, two flags, i.e., MergeFlag and MergeLeftFlag, are transmitted as merge information which is information about Merge Mode.

MergeFlag=1 indicates that the motion information of a region X in question is the same as the motion information of a surrounding region T adjacent to the top of the region in question or a surrounding region L adjacent to the left of the region in question. At this occasion, MergeLeftFlag is included in the merge information, and is transmitted. MergeFlag=0 indicates that the motion information of the region X in question is different from any of the motion information of the surrounding region T and the surrounding region L. In this case, the motion information of the region X in question is transmitted.

When the motion information of the region X in question is the same as the motion information of the surrounding region L, MergeFlag=1 holds and MergeLeftFlag=1 holds. When the motion information of the region X in question is the same as the motion information of the surrounding region T, MergeFlag=1 holds and MergeLeftFlag=0 holds.

[Spatial Prediction Motion Vector (Spatial Predictor)]

In the AMVP explained above with reference to FIG. 5 or the Merge Mode explained above with reference to FIG. 7, the spatial prediction motion vector (spacial predictor) and the temporal prediction motion vector (temporal predictor) are generated as candidates of the prediction motion vector (predictor).

Subsequently, generation processing of the spatial prediction motion vector will be explained with reference to FIG. 8. The example of FIG. 8 shows a PU in question (current block) which is a target region of processing and $A_0, A_1, B_0, B_1, B_2$ which are PUs (blocks) adjacent in terms of predetermined positional relationship with respect to the PU in question.

$A_0$ is a PU adjacent to the lower left of the PU in question. $A_1$ is a PU located above $A_0$ among PUs adjacent to the left of the PU in question. $B_2$ is a PU adjacent to the top left of the PU in question. $B_0$ is a PU adjacent to the top right of the PU in question. $B_1$ is a PU located adjacent to the left of B) among PUs adjacent to the top of the PU in question.

It should be noted that $A_0, A_1$ are collectively referred to as a PU located at Left (left) of the PU in question. Likewise, $B_1, B_2$ are collectively referred to as a PU located at Top (top) of the PU in question. In contrast, $B_0$ is referred to as a PU located at Top-right (top right) of the PU in question.

Further, being adjacent to the left or top of the PU in question means being in surface (side) contact with the left or top of the PU in question. Being adjacent to the top left, lower left, and top right of the PU in question means being in contact with the PU in question at a point (one position).

Then, Non-Patent Document 3 suggests that the motion vectors of these adjacent PUs $(A_0, A_1, B_0, B_1, B_2)$ are used for generation of the spatial prediction motion vector of the PU in question as candidates of the spatial prediction motion vector of the PU in question.

More specifically, scanning is performed in the order of $A_0, A_1$ with the following procedure, and when motion vector information having a reference frame equivalent to the motion vector information of the PU in question is detected, the scanning is terminated. Likewise, scanning is also performed in the order of $B_0, B_1, B_2$ with the following procedure, and when motion vector information having a reference frame equivalent to the motion vector information of the PU in question is detected, the scanning is terminated.

Thereafter, the motion vector information detected from $A_0, A_1$ is adopted as spatial prediction motion vector information of the left adjacent PU, and the motion vector information detected from $B_0, B_1, B_2$ is adopted as spatial prediction motion vector information of the top adjacent PU. Then, the spatial prediction motion vector information of the left adjacent PU, the spatial prediction motion vector information of the top adjacent PU, and the temporal prediction motion vector information separately detected are adopted as candidates, and a better one is selected from among those candidates, so that a prediction motion vector is generated.

Subsequently, the scanning procedure will be explained. Firstly, scanning is performed to search whether there is one that has the same List and reference frame information as the motion vector information of the PU in question. Secondly, scanning is performed to search whether there is one that has a different List from but has the same reference frame information as the motion vector information of the PU in question.

Thirdly, scanning is performed to search whether there is one that has the same List as but has different reference frame information from the motion vector information of the PU in question. Fourth, scanning is performed to search whether there is one that has a different List and reference frame information from the motion vector information of the PU in question.

Here, as described above, in order to perform the generation processing of the prediction motion vector with respect to the PU in question, it is necessary to wait for the determination of the motion vector information with respect to $B_0$ which is a PU adjacent to the top right of the PU in question.

Therefore, there is such concern that when the encoding or decoding processing of the motion vector, i.e., the processing for deriving the spatial prediction motion vector in the AMVP or Merge mode is tried to be achieved with a pipeline, $B_0$ which is a PU adjacent to the top right causes delay.

[Generation Method of Spatial Prediction Motion Vector According to the Present Technique]

Accordingly, in the motion vector encoding unit 121, such configuration is adopted that when the spatial prediction motion vector of the PU in question is derived in the AMVP or Merge mode, it is prohibited to use the motion vector of B, which is a PU adjacent to the top right of the PU in question as illustrated in FIG. 8.

More specifically, as illustrated in FIG. 9, in the motion vector encoding unit 121 the encoding processing of the motion vector is performed by using only the motion vector information of $B_1$, $B_2$ which are PUs located at Top with respect to the PU in question and the motion vector information of $A_0$, $A_1$ which are PUs located at Left with respect to the PU in question.

The example as illustrated in FIG. 9 shows $A_0$ which is a PU adjacent to the lower left of the PU in question, and $A_1$ which is a PU located at the lower end among PUs adjacent to the left of the PU in question, $B_2$ which is a PU adjacent to the top left of the PU in question, and $B_1$ which is a PU located at the right end among PUs adjacent to the top of the PU in question.

The adjacent region of the PU in question in the example of FIG. 9 is different from the example of FIG. 8 only in that $B_0$ which is a PU located at Top-right (top right) of the PU in question is removed.

Further, in the motion vector encoding unit 121, such configuration may be adopted that in addition to the adjacent PUs as shown in FIG. 9, $B_3$ and $B_4$ which are top adjacent PUs adjacent to the top portion of the PU in question as shown in FIG. 10 or FIG. 11 are used. In this manner, by increasing the number of candidates, the decrease in the encoding efficiency can be suppressed.

The example of FIG. 10 shows not only $B_1$, $B_2$ which are PUs located at Top with respect to the PU in question in the example of FIG. 9 and $A_0$, $A_1$ which are PUs located at Left with respect to the PU in question in the example of FIG. 9 but also $B_3$ which is a PU located at Top with respect to the PU in question.

This $B_3$ is a PU which is adjacent to the top portion of the PU in question, and which is located adjacent to the left of $B_1$ which is a PU located at the right end, among PUs adjacent to the top portion of the PU in question.

In the case of the example of FIG. 10, $B_3$ is located adjacent to the left of $B_1$, and therefore, after detecting $B_1$, $B_3$ which is directly adjacent may be accessed, and therefore, the amount of computation for address calculation is low.

The example of FIG. 11 shows not only $B_1$, $B_2$ which are PUs located at Top with respect to the PU in question in the example of FIG. 9 and $A_0$, $A_1$ which are PUs located at Left with respect to the PU in question in the example of FIG. 9 but also $B_4$ located at Top with respect to the PU in question.

This $B_4$ is a PU which is adjacent to the top portion of the PU in question, and which is located around the center in the horizontal length of the PU in question, among PUs adjacent to the top portion of the PU in question.

It should be noted that the length of a PU is 4, 8, 16, . . . , and therefore, the center of the length thereof is not located on a pixel but is located between a pixel and a pixel. Therefore, it necessarily becomes a single PU that is located at the center in the horizontal length of the PU in question.

Just like the case of the example of FIG. 10, $B_3$ directly adjacent to $B_1$ is considered to also have similar motion information. In contrast, in the case of the example of FIG. 11, for the motion information, motion information can be selected from a PU group having greater degree of variety. Therefore, the encoding efficiency can be enhanced.

[Pipeline Processing]

Subsequently, the processing of the present technique as compared with a conventional technique will be explained with reference to FIG. 13 by using PUs in positional relationship as shown in FIG. 12.

The example of FIG. 12 shows $PU_0$ which is a PU in question, $PU_{-2}$ which is adjacent to the top of $PU_0$, and $PU_{-1}$ which is adjacent to the top right of $PU_0$. It should be noted that in the example of FIG. 12, for the sake of convenience of explanation, $PU_{-2}$, $PU_{-1}$, $PU_0$ are shown in the same size.

As shown by A of FIG. 13 and B of FIG. 13, it is assumed that encoding or decoding processing of motion vectors is performed in the order of $PU_{-2}$, $PU_{-1}$, $PU_0$.

In the method suggested in Non-Patent Document 3, as shown by A of FIG. 13, the processing of $PU_{-1}$ can be started only after t3 which is after t2 which is timing with which the processing of $PU_{-2}$ that was started at t0 is finished. Likewise, the processing of $PU_0$ can be started only after t7 which is after t6 which is timing with which the processing of $PU_{-1}$ that was started at t3 is finished. It should be noted that the processing of $PU_0$ is finished with the timing of t9.

In contrast, in the method according to the present technique, as shown by B of FIG. 13, the processing of $PU_{-1}$ can be started at t1 which is before t2 which is timing with which the processing of $PU_2$ that was started at t0 is finished. Likewise, the processing of $PU_0$ can be started at t4 which is after t5 which is timing with which the processing of $PU_{-1}$ that was started at t1 is finished. Therefore, the processing of $PU_0$ can be finished at t8 which is earlier timing in terms of time than t9 which is timing with which the PU of A of FIG. 13 is finished.

As described above, in the case of the method according to the present technique, generation processing of a spatial prediction motion vector in the encoding or decoding of a motion vector can be realized with pipeline, and therefore, a circuit operating at a higher speed can be structured.

It should be noted that B of FIG. 13 indicates that the processing of $PU_{-1}$ can be started before the timing with which the processing of $PU_{-2}$ is finished. However, in reality, even in the case of the present technique, since the motion vector of a PU at the position of A1 in $PU_{-1}$ is not stored, like A of FIG. 13, the processing of $PU_{-1}$ is not started unless the processing of $PU_2$ is finished. As described above, the method according to the present technique is effective for the positional relationship of $PU_{-1}$ and PUG. More specifically, the present technique can be applied in accordance with the positional relationship between the target region and the adjacent region.

[Example of Configuration of Motion Vector Encoding Unit]

FIG. 14 is a block diagram illustrating an example of main configuration of a motion vector encoding unit 121. It should be noted that, in the example of FIG. 14, portions not included in the motion vector encoding unit 121 are shown with broken lines.

The motion vector encoding unit 121 in the example of FIG. 14 is configured to include motion vector encoding units 131-1 and 131-2, a temporal adjacent motion vector shared buffer 132, and a spatial adjacent motion vector shared buffer 133.

The motion vector encoding unit 131-1 performs the prediction motion vector generation processing of $PU_{-2}$, $PU_0$, . . . , for example, as shown in FIG. 12. The motion vector encoding unit 131-2 performs the prediction motion vector generation processing of $PU_{-1}$, $PU_1$, . . . , for example, as shown in FIG. 12. More specifically, the motion vector encoding units 131-1 and 131-2 are different only in the PU of the processing target, and are basically configured in the same manner. It should be noted that the motion vector encoding units 131-1 and 131-2 will be hereinafter referred to as a motion vector encoding unit 131 when it is not necessary to distinguish the motion vector encoding units 131-1 and 131-2 from each other.

The motion vector encoding unit 131-1 is configured to include a spatial adjacent motion vector internal buffer 141-1, a candidate prediction motion vector generation unit 142-1, a cost function value calculation unit 143-1, and an optimum prediction motion vector determination unit 144-1.

The motion vector encoding unit 131-2 is configured to include a spatial adjacent motion vector internal buffer 141-2, a candidate prediction motion vector generation unit 142-2, a cost function value calculation unit 143-2, and an optimum prediction motion vector determination unit 144-2.

It should be noted that when it is not necessary to distinguish the spatial adjacent motion vector internal buffers 141-1 and 141-2 from each other, the spatial adjacent motion vector internal buffers 141-1 and 141-2 will be hereinafter referred to as a spatial adjacent motion vector internal buffer 141. When it is not necessary to distinguish the candidate prediction motion vector generation units 142-1 and 142-2 from each other, the candidate prediction motion vector generation units 142-1 and 142-2 will be referred to as a candidate prediction motion vector generation unit 142. When it is not necessary to distinguish the cost function value calculation units 143-1 and 143-2 from each other, the cost function value calculation units 143-1 and 143-2 will be referred to as a cost function value calculation unit 143. When it is not necessary to distinguish the optimum prediction motion vector determination units 144-1 and 144-2 from each other, the optimum prediction motion vector determination units 144-1 and 144-2 will be referred to as an optimum prediction motion vector determination unit 144.

Information of the motion vector of the PU in question searched by the motion prediction/compensation unit 115 is provided to the cost function value calculation unit 143.

Information of the motion vector ultimately determined by the motion prediction/compensation unit 115 is provided to the temporal adjacent motion vector shared buffer 132, the spatial adjacent motion vector shared buffer 133, and the spatial adjacent motion vector internal buffer 141.

The temporal adjacent motion vector shared buffer 132 is constituted by a memory, and is shared by the motion vector encoding units 131-1 and 131-2. The temporal adjacent motion vector shared buffer 132 accumulates the motion vector information provided from the motion prediction/compensation unit 115 as information of the motion vector of the temporal adjacent region which is adjacent in terms of time. It should be noted that a region adjacent in terms of time is a region which has the same address in the space as the region in question in a different picture in terms of a time axis.

The temporal adjacent motion vector shared buffer 132 reads information indicating the motion vector derived with respect to the temporal adjacent PU which is adjacent to the PU in question in terms of time, and provides the read information (temporal adjacent motion vector information) to the candidate prediction motion vector generation unit 142.

The spatial adjacent motion vector shared buffer 133 is constituted by a line buffer, and is shared by the motion vector encoding units 131-1 and 131-2. The spatial adjacent motion vector shared buffer 133 accumulates the motion vector information provided from the motion prediction/compensation unit 115 as information of the motion vector of the spatial adjacent region adjacent in terms of space. The spatial adjacent motion vector shared buffer 133 reads information indicating the motion vector derived with respect to the left adjacent PU adjacent to the left (for example, $A_0$, $A_1$ of FIG. 9), among the spatial adjacent PUs adjacent to the PU in question in terms of space. The spatial adjacent motion vector shared buffer 133 provides the read information (spatial adjacent motion vector information) to the candidate prediction motion vector generation unit 142.

The spatial adjacent motion vector internal buffer 141 is constituted by a line buffer. The spatial adjacent motion vector internal buffer 141 accumulates the motion vector information provided from the motion prediction/compensation unit 115 as information of the motion vector of the spatial adjacent region adjacent in terms of space.

The spatial adjacent motion vector internal buffer 141 reads information indicating the motion vector derived with respect to the top adjacent PU adjacent to the top (for example, $B_1$, $B_2$, $B_3$ of FIG. 10), among the spatial adjacent PUs adjacent to the PU in question in terms of space. At this occasion, the spatial adjacent motion vector internal buffer 141 provides the information of the PU in question to the adjacent motion vector information setting unit 122. Correspondingly, information of the PU, which is prohibited from being read, is provided from the adjacent motion vector information setting unit 122, and therefore, the spatial adjacent motion vector internal buffer 141 does not read the motion vector of the PU prohibited by the adjacent motion vector information setting unit 122 (for example, $B_0$ of FIG. 8), among the top adjacent PUs. The spatial adjacent motion vector internal buffer 141 provides the read information (spatial adjacent motion vector information) to the candidate prediction motion vector generation unit 142. It should be noted that such configuration may adopted that, for example, a command for reading the motion vector of $B_3$ of FIG. 10 is also performed by the adjacent motion vector information setting unit 122.

The candidate prediction motion vector generation unit 142 uses the spatial adjacent motion vector information of the left adjacent PU provided from the spatial adjacent motion vector shared buffer 133 to generate a spatial prediction motion vector which becomes a candidate of the PU in question, on the basis of the method according to the AMVP or Merge Mode. Further, the candidate prediction motion vector generation unit 142 uses the spatial adjacent motion vector information of the top adjacent PU provided from the spatial adjacent motion vector internal buffer 141 to generate a spatial prediction motion vector which becomes a candidate of the PU in question, on the basis of the method according to the AMVP or Merge Mode. It should be noted that, in the spatial adjacent motion vector internal buffer 141, reading of the spatial adjacent motion vector information of the top adjacent PU is controlled by the adjacent motion vector information setting unit 122. The candidate prediction motion vector generation unit 142 provides information indicating the generated candidate spatial prediction motion vector to the cost function value calculation unit 143.

The candidate prediction motion vector generation unit 142 refers to the temporal adjacent motion vector information provided from the temporal adjacent motion vector shared buffer 132 to generate a temporal prediction motion vector which becomes a candidate of the PU in question, on the basis of the method according to the AMVP or Merge Mode. The candidate prediction motion vector generation unit 142 provides information indicating the generated candidate temporal prediction motion vector to the cost function value calculation unit 143.

The cost function value calculation unit 143 calculates a cost function value for each candidate prediction motion vector and provides the calculated cost function values as well as the information of the candidate prediction motion vectors to the optimum prediction motion vector determination unit 144.

The optimum prediction motion vector determination unit 144 determines that the candidate prediction motion vector of which cost function value provided from the cost function value calculation unit 143 is the minimum is the optimum prediction motion vector with respect to the PU in question, and provides the information thereof to the motion prediction/compensation unit 115.

It should be noted that the motion prediction/compensation unit 115 uses the information of the optimum prediction motion vector provided from the optimum prediction motion vector determination unit 155 to generate a difference motion vector which is a difference from the motion vector, and calculates a cost function value for each prediction mode. The motion prediction/compensation unit 115 determines that, among them, the prediction mode in which the cost function value is the minimum is the inter-optimum prediction mode.

The motion prediction/compensation unit 115 provides a prediction image in the inter-optimum prediction mode to the prediction image selection unit 116. It should be noted that the motion prediction/compensation unit 115 provides the generated difference motion vector information to the lossless coding unit 106.

When the adjacent motion vector information setting unit 122 receives the information of the PU in question from the spatial adjacent motion vector internal buffer 141, the adjacent motion vector information setting unit 122 provides information of the address of the PU of which motion vector is prohibited from being used among the top adjacent PUs of the PU in question, to the spatial adjacent motion vector internal buffer 141. It should be noted that, at this occasion, as necessary (for example, in the case of FIG. 10 or FIG. 11), such configuration may be adopted that information of the addressee of a PU of which motion vector is allowed to be used among the top adjacent PUs of the PU in question is also provided to the spatial adjacent motion vector internal buffer 141.

[Flow of Coding Processing]

Subsequently, the flow of each processing executed by the image coding device 100 explained above will be explained. First, an example of flow of coding processing will be explained with reference to the flowchart of FIG. 15.

In step S101, the A/D conversion unit 101 performs A/D conversion on a received image. In step S102, the screen sorting buffer 102 stores images that have been subjected to the A/D conversion, and sorts them from the order in which pictures are displayed into the order in which they are encoded. In step S103, the intra-prediction unit 114 performs the intra-prediction processing of the intra-prediction mode.

In step S104, the motion prediction/compensation unit 115, the motion vector encoding unit 121, and the adjacent motion vector information setting unit 122 perform inter-motion prediction processing for performing motion prediction and motion compensation with the inter-prediction mode. The details of the inter-motion prediction processing will be explained later with reference to FIG. 16.

In the processing in step S104, the motion vector of the PU in question is searched, and with the pipeline processing, each prediction motion vector of the PU in question is generated, and among them, the prediction motion vector optimum for the PU in question is determined. Then, the optimum inter-prediction mode is determined, and a prediction image in the optimum inter-prediction mode is generated.

The prediction image and the cost function value in the determined optimum inter-prediction mode are provided from the motion prediction/compensation unit 115 to the prediction image selection unit 116. In addition, the information of the determined optimum inter-prediction mode, the information indicating the index of the prediction motion vector which is determined to be optimum, and the information indicating the difference between the prediction motion vector and the motion vector are also provided to the lossless coding unit 106, and in step S114 which will be explained later, the lossless coding is performed.

In step S105, the prediction image selection unit 116 determines the optimum mode on the basis of each cost function value which is output from the intra-prediction unit 114 and the motion prediction/compensation unit 115. More specifically, the prediction image selection unit 116 selects any one of the prediction image generated by the intra-prediction unit 114 and the prediction image generated by the motion prediction/compensation unit 115.

It should be noted that examples of a selection method of a prediction image can include a method implemented in reference software of the AVC method called JM (Joint Model) (published at http://iphome.hhi.de/suehring/tml/index.htm).

In the JM, two types of mode determination methods, i.e., High Complexity Mode and Low Complexity Mode, which will be explained later, can be selected. In either of High Complexity Mode and Low Complexity Mode, a cost function value for each prediction mode is calculated, and the prediction mode in which the cost function value is the minimum is selected as a sub-macro block in question or the optimum mode with respect to a macro block in question.

The cost f unction in the High Complexity Mode is indicated as shown in the following expression (9).

$$\text{Cost}(\text{Mode} \in \Omega) = D + \lambda^* R \qquad (9)$$

Here, $\Omega$ is a total set of candidate modes for encoding the block in question to the macro block, and D is difference energy between a decoded image and an input image in a case where encoding is performed with the prediction mode in question. $\lambda$ is a Lagrange undetermined multiplier which is given as a function of a quantization parameter. R is the total amount of codes in a case where encoding is performed with the mode in question, which includes orthogonal transformation coefficients.

More specifically, in order to perform encoding in the High Complexity Mode, it is necessary to calculate the parameters D and R which have been explained above, and therefore, to once perform provisional encoding processing with all the candidate modes, and this requires a higher amount of computation.

The cost function in the Low Complexity Mode is indicated as shown in the following expression (10).

$$\text{Cost}(\text{Mode} \in \Omega) = D + QP2\text{Quant}(QP)^*\text{HeaderBit} \qquad (10)$$

Here, D is difference energy between a prediction image and an input image, unlike the case of the High Complexity Mode. QP2Quant (QP) is given as a function of the quantization parameter QP, and HeaderBit is the amount of codes regarding information which belongs to Header such as a motion vector and a mode, which does not include the orthogonal transformation coefficients.

More specifically, in the Low Complexity Mode, the prediction processing needs to be performed for each of the candidate modes, but the decoded image is not required, and therefore, it is not necessary to perform the encoding processing. For this reason, the Low Complexity Mode can be realized with a lower amount of computation as compared with the High Complexity Mode.

Back to FIG. 15, in step S106, the calculation unit 103 calculates a difference between the images sorted by the processing in step S102 and the prediction image selected by the processing in step S105. The amount of data of the difference data is reduced as compared with the original image data. Therefore, the amount of data can be compressed as compared with a case where an image is compressed as it is.

In step S107, the orthogonal transformation unit 104 performs orthogonal transformation on difference information generated by the processing in step S106. More specifically, orthogonal transformation such as discrete cosine transform and Karhunen-Loeve conversion and like is performed and, conversion coefficients are output.

In step S108, the quantization unit 105 uses the quantization parameter provided from the rate control unit 117 to quantize the orthogonal transformation coefficients obtained in the processing in step S107.

As a result of the processing in step S108, the quantized difference information is locally decoded as follows. More specifically, in step S109, the inverse-quantization unit 108 dequantizes the quantized orthogonal transformation coefficient generated in the processing in step S108 (which may also referred to as quantization coefficients) according to the characteristics corresponding to the characteristics of the quantization unit 105. In step S110, the inverse-orthogonal transformation unit 109 performs inverse-orthogonal transformation on the orthogonal transformation coefficients obtained the processing in step S109 according to the characteristics corresponding to the characteristics of the orthogonal transformation unit 104.

In step S111, the calculation unit 110 adds the prediction image to difference information locally decoded, and generates a locally decoded image (image corresponding to input to the calculation unit 103). In step S112, as necessary, the deblock filter 111 performs the deblock filter processing on the locally decoded image obtained in the processing in step S111.

In step S113, the frame memory 112 stores the decoded image which having been subjected to the deblock filter processing in the processing in step S112. It should be noted that the frame memory 112 also receives an image, which has not yet been filtered by the deblock filter 111, from the calculation unit 110, and stores the image.

In step S114, the lossless coding unit 106 encodes the conversion coefficients quantized in the processing in step S108. More specifically, lossless coding such as variable length coding and arithmetic coding is applied to the difference image.

Further, at this occasion, the lossless coding unit 106 encodes information about the prediction mode of the prediction image selected in the processing in step S105, and adds the information to the coded data obtained by encoding the difference image. More specifically, the lossless coding unit 106 encodes, e.g., the optimum intra-prediction mode information provided from the intra-prediction unit 114 or information according to the optimum inter-prediction mode provided from the motion prediction/compensation unit 115, and adds the information to the coded data.

It should be noted that when a prediction image in the inter-prediction mode is selected in the processing in step S105, the information of the difference motion vector calculated in step S104 and a flag indicating the index of the prediction motion vector are also encoded.

In step S115, the accumulation buffer 107 accumulates the coded data obtained in the processing in step S114. The coded data accumulated in the accumulation buffer 107 are read as necessary, and transmitted to the decoding side via the transmission path and the recording medium.

In step S116, the rate control unit 117 controls the rate of the quantization operation of the quantization unit 105 so as not to cause overflow and underflow, on the basis of the amount of codes of the coded data accumulated in the accumulation buffer 107 (the amount of codes generated) in the processing in step S115. Further, the rate control unit 117 provides information about the quantization parameter to the quantization unit 105.

When the processing in step S116 is finished, the coding processing is terminated.

[Flow of Inter-Motion Prediction Processing]

Subsequently, an example of the flow of inter-motion prediction processing executed in step S104 of FIG. 15 will be explained with reference to the flowchart of FIG. 16.

In step S131, the motion prediction/compensation unit 115 performs motion search for each inter-prediction mode. The motion vector information of the PU in question searched by the motion prediction/compensation unit 115 is provided to the cost function value calculation unit 143.

In step S132, the motion vector encoding unit 131 generates a prediction motion vector of the PU in question on the basis of the method according to the AMVP or Merge Mode explained above with reference to FIG. 5 or FIG. 7. The details of the prediction motion vector generation processing will be explained later with reference to FIG. 17.

In the processing in step S132, adjacent motion vector information of the left adjacent PU provided from the spatial adjacent motion vector shared buffer 132 is referred to, and a spatial candidate prediction motion vector which becomes a candidate of the PU in question is generated. Adjacent motion vector information of the top adjacent PU provided from the spatial adjacent motion vector internal buffer 141 under the control of the adjacent motion vector information setting unit 122, is referred to, and a spatial candidate prediction motion vector which becomes a candidate of the PU in question is generated. Further, temporal adjacent motion vector information provided from the temporal adjacent motion vector shared buffer 132 is referred to, and a time candidate prediction motion vector which becomes a candidate of the PU in question is generated.

The information of the prediction motion vector generated is provided as candidate prediction motion vector information, and a cost function value for the candidate prediction motion vector thereof is calculated, and the optimum prediction motion vector with respect to the PU in question is determined, and the determined information is provided to the motion prediction/compensation unit 115.

In step S133, the motion prediction/compensation unit 115 uses the optimum prediction motion vector information provided from the optimum prediction motion vector determination unit 144 to generate a difference motion vector which is a difference from the motion vector, and calculates a cost function value for each inter-prediction mode. It should be noted that the expression (9) or the expression (10) explained above is used as the cost function.

In step S134, the motion prediction/compensation unit 115 determines that a prediction mode in which the cost function value is the minimum among the prediction modes is the optimum inter-prediction mode. In step S135, the motion prediction/compensation unit 115 generates a prediction image in the optimum inter-prediction mode, and provides the prediction image to the prediction image selection unit 116. It should be noted that at this occasion the motion vector information in the optimum inter-prediction mode is provided to the temporal adjacent motion vector shared buffer 132, the spatial adjacent motion vector shared buffer 133, and the spatial adjacent motion vector internal buffer 141 for generation of the prediction motion vector of a subsequent PU.

In step S136, the motion prediction/compensation unit 115 provides the information about the optimum inter-prediction mode to the lossless coding unit 106, and causes the lossless coding unit 106 to encode the information about the optimum inter-prediction mode.

It should be noted that the information about the optimum inter-prediction mode is, for example, information of the optimum inter-prediction mode, difference motion vector information of the optimum inter-prediction mode, reference picture information of the optimum inter-prediction mode, and a flag indicating the index of the prediction motion vector.

Corresponding to the processing in step S136, the information thus provided is encoded in step S114 of FIG. 15.

[Flow of Prediction Motion Vector Generation Processing]

Subsequently, an example of the flow of inter-motion prediction processing executed in step S132 of FIG. 16 will be explained with reference to the flowchart of FIG. 17. It should be noted that in the example of FIG. 17, in order to clearly indicate that this is processing with pipeline, the processing performed by the motion vector encoding unit 131-1 and the processing performed by the motion vector encoding unit 131-2 are shown separately. However, the processing in step S156 is the processing of the temporal adjacent motion vector shared buffer 132 and the spatial adjacent motion vector shared buffer 133, and therefore, the processing in step S156 is shown in a combined manner.

More specifically, in the example of FIG. 17, the prediction motion vector generation processing with respect to $PU_{-2}$, $PU_0$, . . . that is executed by the motion vector encoding unit 131-1 is shown at the left side. On the other hand, the prediction motion vector generation processing with respect to $PU_{-1}$, $PU_1$, . . . that is executed by the motion vector encoding unit 131-2 is shown at the right side.

Further, in the example of FIG. 17, broken lines are shown to clearly indicate in which step motion vector information is stored and in which step the motion vector information is used.

In step S151-1, the candidate prediction motion vector generation unit 142-1 determines the spatial prediction motion vector located at top (top) of the $PU_{-2}$ in question. More specifically, in step S155-1 which will be explained later, the motion vector information of the top adjacent PU that has been processed is stored in the spatial adjacent motion vector internal buffer 141-1. As indicated by an arrow of broken line, under the control of the adjacent motion vector information setting unit 122, the motion vector information of a predetermined PU among top adjacent PUs adjacent to the top of the $PU_{-2}$ in question is read from the spatial adjacent motion vector internal buffer 141-1. For example, the motion vector information of $B_1$, $B_2$, $B_3$ of FIG. 10 is read from the spatial adjacent motion vector internal buffer 141-1, and the motion vector information thus read is provided to the candidate prediction motion vector generation unit 142-1.

The candidate prediction motion vector generation unit 142-1 uses the motion vector information of the top adjacent PU, to perform scanning, for example, in the order of $B_1$, $B_3$, $B_2$ of FIG. 10 as explained with reference to FIG. 8, and determine the spatial prediction motion vector located at top (top) of the $PU_{-2}$ in question. The determined spatial prediction motion vector information is provided to the cost function value calculation unit 143-1.

In step S152-1, the candidate prediction motion vector generation unit 142-1 determines the spatial prediction motion vector located at left (left) of the $PU_{-2}$ in question. More specifically, the motion vector information of the left adjacent PU that has been processed is stored in the spatial adjacent motion vector shared buffer 133 in step S156 which will be explained later. As shown by an arrow of broken line, the motion vector information of a predetermined PU among left adjacent PUs adjacent to the left of the $PU_{-2}$ in question is read from the spatial adjacent motion vector shared buffer 133. For example, the motion vector information of $A_0$, $A_1$ of FIG. 10 is read from the spatial adjacent motion vector shared buffer 133, and the motion vector information thus read is provided to the candidate prediction motion vector generation unit 142-1.

The candidate prediction motion vector generation unit 142-1 uses the motion vector information of the left adjacent PU, to perform scanning, for example, in the order of $A_0$, $A_1$ of FIG. 10 as explained with reference to FIG. 8, and determine the spatial prediction motion vector located at left (left) of the $PU_{-2}$ in question. The determined spatial prediction motion vector information is provided to the cost function value calculation unit 143-1.

In step S153-1, the candidate prediction motion vector generation unit 142-1 determines the temporal prediction motion vector adjacent to the $PU_{-2}$ in question in terms of time. More specifically, the motion vector information of the temporal adjacent PU that has been processed is stored in the temporal adjacent motion vector shared buffer 132 in step S156 which will be explained later. As shown by an arrow of broken line, the motion vector information of a predetermined PU is read from the temporal adjacent motion vector shared buffer 132, and the motion vector information thus read is provided to the candidate prediction motion vector generation unit 142-1.

The candidate prediction motion vector generation unit 142-1 uses the motion vector information of the temporal adjacent PU to determine the temporal prediction motion vector of the $PU_{-2}$ in question. The determined temporal prediction motion vector information is provided to the cost function value calculation unit 143-1.

The cost function value calculation unit 143-1 calculates a cost function value for each piece of candidate prediction motion vector information, and provides the calculated cost function value and the candidate prediction motion vector information to the optimum prediction motion vector determination unit 144-1. It should be noted that the motion vector information of the PU in question provided from the motion prediction/compensation unit 115 in step S131 of FIG. 16 is used for calculation of the cost function value. In addition, for example, the expression (9) or the expression (10) which has been explained above is used as the cost function.

In step S154-1, the optimum prediction motion vector determination unit 144-1 determines that the candidate prediction motion vector of which cost function value provided from the cost function value calculation unit 143-1 is the minimum is the optimum prediction motion vector with respect to the $PU_{-2}$ in question. The optimum prediction motion vector determination unit 144-1 provides information of the optimum prediction motion vector with respect to the $PU_{-2}$ in question to the motion prediction/compensation unit 115.

Correspondingly, the motion prediction/compensation unit 115 generates a difference motion vector which is a difference between the motion vector of the target region and the prediction motion vector of the target region provided from the optimum prediction motion vector determination unit 144-1. Further, the motion prediction/compensation unit 115 uses, e.g., an input image provided from the screen sorting buffer 102 and information of a difference motion vector to evaluate the cost function value of each prediction image in step S133 of FIG. 16 explained above, and select the optimum mode in step S134. Then, the motion prediction/compensation unit 115 provides the motion vector information in the optimum mode to the temporal adjacent motion vector shared buffer 132, the spatial adjacent motion vector shared buffer 133, and the spatial adjacent motion vector internal buffer 141-1.

In step S155-1, the spatial adjacent motion vector internal buffer 141-1 stores the motion vector information of the $PU_{-2}$ in question as the spatial adjacent motion vector information for a subsequent PU.

In step S156, the temporal adjacent motion vector shared buffer 132 stores the motion vector information of the $PU_{-2}$ in question as the temporal adjacent motion vector information for subsequent and later PUs. Likewise, the spatial adjacent motion vector shared buffer 133 stores the motion vector information of the $PU_{-2}$ in question as the spatial adjacent motion vector information for subsequent and later PUs.

On the other hand, in step S151-2, the candidate prediction motion vector generation unit 142-2 determines the spatial prediction motion vector located at top (top) of the $PU_{-1}$ in question. More specifically, in step S155-2 which will be explained later, the motion vector information of the top adjacent PU that has been processed is stored in the spatial adjacent motion vector internal buffer 141-2. As indicated by an arrow of broken line, under the control of the adjacent motion vector information setting unit 122, the motion vector information of a predetermined PU among top adjacent PUs adjacent to the top of the $PU_{-1}$ in question is read from the spatial adjacent motion vector internal buffer 141-2. For example, the motion vector information of $B_1$, $B_2$, $B_3$ of FIG. 10 is read from the spatial adjacent motion vector internal buffer 141-2, and the motion vector information thus read is provided to the candidate prediction motion vector generation unit 142-2.

The candidate prediction motion vector generation unit 142-2 uses the motion vector information of the top adjacent PU, to perform scanning, for example, in the order of $B_1$, $B_3$, $B_2$ of FIG. 10 as explained with reference to FIG. 8, and determine the spatial prediction motion vector located at top (top) of the $PU_{-1}$ in question. The determined spatial prediction motion vector information is provided to the cost function value calculation unit 143-2.

In step S152-2, the candidate prediction motion vector generation unit 142-2 determines the spatial prediction motion vector located at left (left) of the $PU_{-1}$ in question. More specifically, the motion vector information of the left adjacent PU that has been processed is stored in the spatial adjacent motion vector shared buffer 133 in step S156 which will be explained later. As indicated by an arrow of broken line, the motion vector information of a predetermined PU among left adjacent PUs adjacent to the left of the $PU_{-1}$ in question is read from the spatial adjacent motion vector shared buffer 133. For example, the motion vector information of $A_0$, $A_1$ of FIG. 10 is read from the spatial adjacent motion vector shared buffer 133, and the motion vector information thus read is provided to the candidate prediction motion vector generation unit 142-2.

The candidate prediction motion vector generation unit 142-2 uses the motion vector information of the left adjacent PU, to perform scanning, for example, in the order of $A_0$, $A_1$ of FIG. 10 as explained with reference to FIG. 8, and determine the spatial prediction motion vector located at left (left) of the $PU_{-1}$ in question. The determined spatial prediction motion vector information is provided to the cost function value calculation unit 143-2.

In step S153-2, the candidate prediction motion vector generation unit 142-2 determines the temporal prediction motion vector which is adjacent to the $PU_{-1}$ in question in terms of time. More specifically, the motion vector information of the temporal adjacent PU that has been processed is stored in the temporal adjacent motion vector shared buffer 132 in step S156 which will be explained later. As indicated by an arrow of broken line, the motion vector information of a predetermined PU is read from the temporal adjacent motion vector shared buffer 132, and the motion vector information thus read is provided to the candidate prediction motion vector generation unit 142-2.

The candidate prediction motion vector generation unit 142-2 uses the motion vector information of the temporal adjacent PU to determine the temporal prediction motion vector of the $PU_{-1}$ in question. The determined temporal prediction motion vector information is provided to the cost function value calculation unit 143-2.

The cost function value calculation unit 143-2 calculates a cost function value for each piece of candidate prediction motion vector information, and provides the calculated cost function value and the candidate prediction motion vector information to the optimum prediction motion vector determination unit 144-2. It should be noted that the motion vector information of the PU in question provided from the motion prediction/compensation unit 115 in step S131 of FIG. 16 is used for calculation of the cost function value. In addition, the expression (9) or the expression (10) explained above is used as the cost function.

In step S154-2, the optimum prediction motion vector determination unit 144-2 determines that the candidate prediction motion vector of which cost function value provided from the cost function value calculation unit 143-2 is the minimum is the optimum prediction motion vector with respect to the PU$_{-1}$ in question. The optimum prediction motion vector determination unit 144-2 provides the information of the optimum prediction motion vector with respect to the PU$_{-1}$ in question to the motion prediction/compensation unit 115.

Correspondingly, the motion prediction/compensation unit 115 generates a difference motion vector which is a difference between the motion vector of the target region and the prediction motion vector of the target region provided from the optimum prediction motion vector determination unit 144-2. Further, the motion prediction/compensation unit 115 uses, e.g., an input image provided from the screen sorting buffer 102 and information of a difference motion vector to evaluate the cost function value of each prediction image in step S133 of FIG. 16 explained above, and select the optimum mode in step S134. Then, the motion prediction/compensation unit 115 provides the motion vector information in the optimum mode to the temporal adjacent motion vector shared buffer 132, the spatial adjacent motion vector shared buffer 133, and the spatial adjacent motion vector internal buffer 141-2.

In step S155-2, the spatial adjacent motion vector internal buffer 141-2 stores the motion vector information of the PU$_{-1}$ in question as the spatial adjacent motion vector information for a subsequent PU.

In step S156, the temporal adjacent motion vector shared buffer 132 stores the motion vector information of the PU$_{-1}$ in question as the temporal adjacent motion vector information for subsequent and later PUs. Likewise, the spatial adjacent motion vector shared buffer 133 stores the motion vector information of the PU$_{-1}$ in question as the spatial adjacent motion vector information for subsequent and later PUs.

As described above, in the generation processing of the prediction motion vector used for encoding of the motion vector of the PU in question, such configuration is adopted that the motion vector information of the PU located at the top right of the PU in question is prohibited from being used.

Accordingly, after the processing in step S155-1, the motion vector encoding unit 131-1 can immediately perform processing on a subsequent PU$_0$ even if the motion vector encoding unit 131-2 has not yet finished the processing on the PU$_{-1}$ in step S155-2. More specifically, as explained above with reference to FIG. 13, the processing with pipeline can be performed.

2. Second Embodiment

[Image Decoding Device]

Subsequently, decoding of the coded data (coded stream) which have been encoded as described above will be explained. FIG. 18 is a block diagram illustrating an example of main configuration of an image decoding device corresponding to the image coding device 100 of FIG. 1.

As illustrated in FIG. 18, an image decoding device 200 decodes coded data generated by the image coding device 100 in accordance with decoding method corresponding to the encoding method of the image coding device 100. It should be noted that like the image coding device 100, the image decoding device 200 performs inter-prediction for each prediction unit (PU).

As illustrated in FIG. 18, the image decoding device 200 includes an accumulation buffer 201, a lossless decoding unit 202, an inverse-quantization unit 203, an inverse-orthogonal transformation unit 204, a calculation unit 205, a deblock filter 206, a screen sorting buffer 207, and a D/A conversion unit 208. Further, the image decoding device 200 includes a frame memory 209, a selection unit 210, an intra-prediction unit 211, a motion prediction/compensation unit 212, and a selection unit 213.

Further, the image decoding device 200 includes a motion vector decoding unit 221, and an adjacent motion vector information setting unit 222.

The accumulation buffer 201 is also a reception unit which receives coded data transmitted. The accumulation buffer 201 receives and accumulates coded data transmitted, and provides the coded data to the lossless decoding unit 202 with predetermined timing. To the coded data, information required for decoding such as the prediction mode information, the motion vector difference information, and the index of the prediction motion vector are added. The lossless decoding unit 202 decodes information, which is provided by the accumulation buffer 201 and encoded by the lossless coding unit 106 of FIG. 1, in accordance with the method corresponding to the encoding method of the lossless coding unit 106. The lossless decoding unit 202 provides the inverse-quantization unit 203 with quantized coefficient data of the difference image obtained as a result of decoding.

The lossless decoding unit 202 determines whether the intra-prediction mode or the inter-prediction mode is selected as the optimum prediction mode, and provides information about the optimum prediction mode to the intra-prediction unit 211 or the motion prediction/compensation unit 212 of which mode is determined to be selected. More specifically, for example, when the image coding device 100 selects the inter-prediction mode as the optimum prediction mode, information about the optimum prediction mode is provided to the motion prediction/compensation unit 212.

The inverse-quantization unit 203 quantizes the quantized coefficient data, which are obtained from decoding process of the lossless decoding unit 202, in accordance with the method corresponding to the quantization method of the quantization unit 105 of the FIG. 1, and provides the obtained coefficient data to the inverse-orthogonal transformation unit 204.

The inverse-orthogonal transformation unit 204 performs inverse-orthogonal transformation on the coefficient data, which are provided from the inverse-quantization unit 203, in accordance with the method corresponding to the orthogonal transformation method of the orthogonal transformation unit 104 of the FIG. 1. As a result of this inverse-orthogonal transformation processing, the inverse-orthogonal transformation unit 204 obtains decoded residual data corresponding to residual data before the orthogonal transformation is performed by the image coding device 100.

The obtained decoded residual data obtained from the inverse-orthogonal transformation is provided to the calculation unit 205. The calculation unit 205 receives a prediction image from the intra-prediction unit 211 or the motion prediction/compensation unit 212 via the selection unit 213.

The calculation unit 205 adds the decoded residual data and the prediction image, and obtains decoded image data corresponding to image data before the prediction image is subtracted by the calculation unit 103 of the image coding device 100. The calculation unit 205 provides the decoded image data to the deblock filter 206.

The deblock filter 206 performs the deblock filter processing on the decoded image thus provided, and provides the processed decoded image to the screen sorting buffer 207. The deblock filter 206 performs the deblock filter processing on the decoded image, thus removing block distortion of the decoded image.

The deblock filter 206 provides the filter processing result (the decoded image after the filter processing) to the screen sorting buffer 207 and the frame memory 209. It should be noted that the decoded image which is output from the calculation unit 205 may be provided to the screen sorting buffer 207 and the frame memory 209 without passing the deblock filter 206. More specifically, the filter processing that is performed by the deblock filter 206 may be omitted.

The screen sorting buffer 207 sorts images. More specifically, the order of frames sorted for the order of encoding by the screen sorting buffer 102 of FIG. 1 is sorted into the original order for display. The D/A conversion unit 208 performs D/A conversion on an image provided from the screen sorting buffer 207, outputs the image to a display, not shown, and causes the display to show the image.

The frame memory 209 stores the provided decoded image, and provides the stored decoded image to the selection unit 210 as a reference image with predetermined timing or on the basis of external request such as the intra-prediction unit 211 and the motion prediction/compensation unit 212.

The selection unit 210 selects the destination of the reference image provided from the frame memory 209. When the intra-coded image is decoded, the selection unit 210 provides the intra-prediction unit 211 with the reference image provided from the frame memory 209. When the inter-coded image is decoded, the selection unit 210 provides the motion prediction/compensation unit 212 with the reference image provided from the frame memory 209.

As necessary, the lossless decoding unit 202 provides the intra-prediction unit 211 with, e.g., information indicating intra-prediction mode obtained by decoding the header information. The intra-prediction unit 211 performs intra-prediction mode using the reference image obtained from the frame memory 209 in the intra-prediction mode used by the intra-prediction unit 114 of FIG. 1, and generates prediction image. The intra-prediction unit 211 provides the generated prediction image to the selection unit 213.

The motion prediction/compensation unit 212 obtains information made by decoding the header information (e.g., optimum prediction mode information, reference image information) from the lossless decoding unit 202.

The motion prediction/compensation unit 212 performs inter-prediction using the reference image obtained from the frame memory 209, with the inter-prediction mode indicated by the optimum prediction mode information obtained from the lossless decoding unit 202, and generates a prediction image. It should be noted that, at this occasion, the motion prediction/compensation unit 212 uses the motion vector information re-structured by the motion vector decoding unit 221 to perform the inter-prediction.

The selection unit 213 provides the prediction image provided from the intra-prediction unit 211 or the prediction image provided from the motion prediction/compensation unit 212 to the calculation unit 205. Then, the calculation unit 205 adds the prediction image generated using the motion vector and the decoded residual data provided from the inverse-orthogonal transformation unit 204 (difference image information), thus decoding the original image. More specifically, the motion prediction/compensation unit 212, the lossless decoding unit 202, the inverse-quantization unit 203, the inverse-orthogonal transformation unit 204, and the calculation unit 205 are also a decoding unit that uses the motion vector to decode the coded data and generate the original image.

From among the information obtained by decoding the header information, the motion vector decoding unit 221 obtains the information of the index of the prediction motion vector and the information of the difference motion vector from the lossless decoding unit 202. Here, the index of the prediction motion vector is information indicating of which adjacent region among the adjacent regions adjacent in terms of time and space with respect to each PU the motion vector is used for the prediction processing of the motion vector (generation of the prediction motion vector). The information about the difference motion vector is information indicating the value of the difference motion vector.

The motion vector decoding unit 221 uses the motion vector of the PU indicated by the index of the prediction motion vector to re-structure the prediction motion vector. In particular, when the PU indicated by the index of the prediction motion vector is the spatial adjacent region adjacent to the target region in terms of space, the motion vector decoding unit 221 generates a spatial prediction motion vector by using the motion vector of the adjacent region of which use is not prohibited by the adjacent motion vector information setting unit 222. The motion vector decoding unit 221 re-structures the motion vector by adding the re-structured prediction motion vector and the difference motion vector provided from the lossless decoding unit 202, and provides the information of the re-structured motion vector to the motion prediction/compensation unit 212.

The adjacent motion vector information setting unit 222 makes such setting that the motion vector of certain adjacent region among adjacent regions adjacent to the target region in terms of space is to be used or to be prohibited from being used. More specifically, the adjacent motion vector information setting unit 222 prohibits the use of the motion vector of the adjacent region located adjacent to the top right with respect to the target region.

It should be noted that the basic operation principle related to the present technique in the motion vector decoding unit 221 and the adjacent motion vector information setting unit 222 is the same as that of the motion vector encoding unit 121 and the adjacent motion vector information setting unit 122 of FIG. 1. However, in the image coding device 100 as shown in FIG. 1, when from the candidate prediction motion vector information, the optimum one for each PU is selected, the present technique is applied to the spatial prediction motion vector.

On the other hand, the image decoding device 200 as shown in FIG. 18 receives, from the encoding side, information indicating which prediction motion vector is used with respect to each PU to perform encoding processing (the index of the prediction motion vector). Therefore, in the image decoding device 200, when the encoding is performed with the spatial prediction motion vector, the present technique is applied.

[Example of Configuration of Motion Vector Decoding Unit]

FIG. 19 is a block diagram illustrating an example of main configuration of the motion vector decoding unit 221. It should be noted that, in the example of FIG. 19, portions not included in the motion vector decoding unit 221 are shown with broken lines.

The motion vector decoding unit 221 of the example of FIG. 19 is configured to include motion vector decoding units 231-1 and 231-2, a temporal adjacent motion vector shared buffer 232, and a spatial adjacent motion vector shared buffer 233.

The motion vector decoding unit 231-1 performs the motion vector re-structuring processing including, for example, the prediction motion vector generation (re-structuring) processing of PU$_{-2}$, PU$_0$, . . . as shown in FIG. 12. The motion vector decoding unit 231-2 performs the motion vector re-structuring processing including, for example, the prediction motion vector generation (re-structuring) processing of PU$_{-1}$, PU$_1$, . . . as shown in FIG. 12. More specifically, the motion vector decoding units 231-1 and 231-2 are different only in the PU of the processing target, and are basically configured in the same manner. It should be noted that the motion vector decoding units 231-1 and 231-2 will be hereinafter referred to as a motion vector decoding unit 231 when it is not necessary to distinguish the motion vector decoding units 231-1 and 231-2 from each other.

The motion vector decoding unit 231-1 is configured to include a prediction motion vector information buffer 241-1, a difference motion vector information buffer 242-1, a prediction motion vector re-structuring unit 243-1, and a motion vector re-structuring unit 244-1. The motion vector decoding unit 231-1 is configured to further also include a spatial adjacent motion vector internal buffer 245-1.

The motion vector decoding unit 231-2 is configured to include a prediction motion vector information buffer 241-2, a difference motion vector information buffer 242-2, a prediction motion vector re-structuring unit 243-2, and a motion vector re-structuring unit 244-2. The motion vector decoding unit 231-2 is configured to further also include a spatial adjacent motion vector internal buffer 245-2.

It should be noted that the prediction motion vector information buffers 241-1 and 241-2 will be hereinafter referred to as a prediction motion vector information buffer 241 when it is not necessary to distinguish the prediction motion vector information buffers 241-1 and 241-2 from each other. The difference motion vector information buffers 242-1 and 241-2 will be hereinafter referred to as a difference motion vector information buffer 242 when it is not necessary to distinguish the difference motion vector information buffers 242-1 and 241-2 from each other. The prediction motion vector re-structuring units 243-1 and 243-2 will be hereinafter referred to as a prediction motion vector re-structuring unit 243 when it is not necessary to distinguish the prediction motion vector re-structuring units 243-1 and 243-2 from each other. The motion vector re-structuring units 244-1 and 244-2 will be hereinafter referred to as a motion vector re-structuring unit 244 when it is not necessary to distinguish the motion vector re-structuring units 244-1 and 244-2 from each other. Spatial adjacent motion vector internal buffers 245-1 and 245-2 will be hereinafter referred to as a spatial adjacent motion vector internal buffer 245 when it is not necessary to distinguish the spatial adjacent motion vector internal buffers 245-1 and 245-22 from each other.

The temporal adjacent motion vector shared buffer 232 is constituted by a memory, and is shared by the motion vector decoding units 231-1 and 231-2. The temporal adjacent motion vector shared buffer 232 accumulates the motion vector information provided from the motion vector re-structuring unit 244 as information of the motion vector of the temporal adjacent region adjacent in terms of time. It should be noted that a region adjacent in terms of time is a region which has the same address in the space as the region in question in a different picture in terms of a time axis.

The temporal adjacent motion vector shared buffer 232 reads information indicating the motion vector derived with respect to the temporal adjacent PU adjacent to the PU in question in terms of time, and provides the information thus read (temporal adjacent motion vector information) to the prediction motion vector re-structuring unit 244.

The spatial adjacent motion vector shared buffer 233 is constituted by a line buffer, and is shared by the motion vector decoding units 231-1 and 231-2. The spatial adjacent motion vector shared buffer 233 accumulates the motion vector information provided from the motion vector re-structuring unit 244, as information of the motion vector in the spatial adjacent region adjacent in terms of space. The spatial adjacent motion vector shared buffer 233 reads information indicating the motion vector derived with respect to the left adjacent PU adjacent to the left (for example, A$_0$, A$_1$ of FIG. 9), among the spatial adjacent PUs adjacent to the PU in question in terms of space. The spatial adjacent motion vector shared buffer 233 provides the information thus read (spatial adjacent motion vector information) to the prediction motion vector re-structuring unit 244.

The prediction motion vector information buffer 241 accumulates information indicating the index of the prediction motion vector of the target region (PU) decoded by the lossless decoding unit 202 (hereinafter referred to as information of the prediction motion vector). The prediction motion vector information buffer 241 reads the information of the prediction motion vector of the PU in question, and provides the information of the prediction motion vector of the PU in question to the prediction motion vector re-structuring unit 243.

The difference motion vector information buffer 242 accumulates the information of the difference motion vector of the target region (PU) decoded by the lossless decoding unit 202. The difference motion vector information buffer 242 reads the information of the difference motion vector of the PU in question, and provides the information of the difference motion vector of the PU in question to the motion vector re-structuring unit 244.

The prediction motion vector re-structuring unit 243 re-structures the prediction motion vector indicated by the index of the prediction motion vector of the PU in question provided from the prediction motion vector information buffer 241, on the basis of the method according to the AMVP or Merge Model. The prediction motion vector re-structuring unit 243 provides the information of the prediction motion vector, which has been re-structured, to the motion vector re-structuring unit 244.

More specifically, when the index of the prediction motion vector of the PU in question indicates the spatial prediction motion vector of the top adjacent PU, the prediction motion vector re-structuring unit 243 generates a spatial prediction motion vector of the PU in question by using the spatial adjacent motion vector information of the top adjacent PU adjacent to the PU in question in terms of space, which is provided from the spatial adjacent motion vector internal buffer 245. It should be noted that in the spatial adjacent motion vector internal buffer 245, reading of the spatial adjacent motion vector information of the top adjacent PU is controlled by the adjacent motion vector information setting unit 222.

When the index of the prediction motion vector of the PU in question indicates the spatial prediction motion vector of the left adjacent PU, the prediction motion vector re-structuring unit 243 generates a spatial prediction motion vector of the PU in question by using the spatial adjacent motion vector information of the left adjacent PU adjacent to the PU in question in terms of space, which is provided from the spatial adjacent motion vector shared buffer 233. Further, when the index of the prediction motion vector of the PU in question indicates the temporal prediction motion vector, the prediction motion vector re-structuring unit 243 generates a temporal prediction motion vector of the PU in question by using the temporal adjacent motion vector information adjacent to the PU in question in terms of time, which is provided from the temporal adjacent motion vector shared buffer 232.

The motion vector re-structuring unit 244 adds the difference motion vector of the PU in question indicated by the information provided from the difference motion vector information buffer 242 and the re-structured prediction motion vector of the PU in question, thus re-structuring the motion vector. The motion vector re-structuring unit 244 provides the information indicating the motion vector which has been re-structured to the motion prediction/compensation unit 212, the spatial adjacent motion vector internal buffer 245, the spatial adjacent motion vector shared buffer 233, and the temporal adjacent motion vector shared buffer 232.

The spatial adjacent motion vector internal buffer 245 is constituted by a line buffer. The spatial adjacent motion vector internal buffer 245 accumulates the motion vector information re-structured by the motion vector re-structuring unit 244 as the spatial adjacent motion vector information for the prediction motion vector information of subsequent and later PUs within the same picture.

The spatial adjacent motion vector internal buffer 245 reads information indicating the motion vector derived with respect to the top adjacent PU adjacent to the top (for example, $B_1$, $B_2$, $B_3$ of FIG. 10), among the spatial adjacent PUs adjacent to the PU in question in terms of space. At this occasion, the spatial adjacent motion vector internal buffer 245 provides the information of the PU in question to the adjacent motion vector information setting unit 222. Correspondingly, information of the PU, which is prohibited from being read, is provided from the adjacent motion vector information setting unit 222, and therefore, the spatial adjacent motion vector internal buffer 245 does not read the motion vector of the PU prohibited by the adjacent motion vector information setting unit 222 (for example, $B_0$ of FIG. 8), among the top adjacent PUs. The spatial adjacent motion vector internal buffer 245 provides the read information (spatial adjacent motion vector information) to the prediction motion vector re-structuring unit 243. It should be noted that such configuration may be adopted that, for example, a command for reading the motion vector of $B_3$ of FIG. 10 is also performed by the adjacent motion vector information setting unit 222.

When the adjacent motion vector information setting unit 222 receives the information of the PU in question from the spatial adjacent motion vector internal buffer 245, the adjacent motion vector information setting unit 222 provides information of the address of the PU of which motion vector is prohibited from being used among the top adjacent PUs of the PU in question, to the spatial adjacent motion vector internal buffer 245. It should be noted that, at this occasion, as necessary (for example, in the case of FIG. 10 or FIG. 11), such configuration may be adopted that information of the address of a PU of which motion vector is allowed to be used among the top adjacent PUs of the PU in question is also provided to the spatial adjacent motion vector internal buffer 245.

It should be noted that the motion prediction/compensation unit 212 uses the motion vector of the PU in question re-structured by the motion vector re-structuring unit 244, to generate a prediction image using the reference image with the inter-prediction mode indicated by the optimum prediction mode information obtained from the lossless decoding unit 202.

[Flow of Decoding Processing]

Subsequently, the flow of each processing executed by the image decoding device 200 explained above will be explained. First, an example of flow of decoding processing will be explained with reference to the flowchart of FIG. 20.

When the decoding processing is started, in step S201 the accumulation buffer 201 accumulates the code stream transmitted. In step S202, the lossless decoding unit 202 decodes the code stream provided from the accumulation buffer 201 (difference image information encoded). More specifically, Ipicture, Ppicture, and Bpicture encoded by the lossless coding unit 106 of FIG. 1 are decoded.

At this occasion, various kinds of information other than the difference image information included in the code stream such as the header information is also decoded. The lossless decoding unit 202 obtains, for example, the prediction mode information, the information about the difference motion vector, and a flag indicating the index of the prediction motion vector. The lossless decoding unit 202 provides the obtained information to a corresponding unit.

In in step S203, the inverse-quantization unit 203 dequantizes the quantized orthogonal transformation coefficients obtained in the processing in step S202. In step S204, the inverse-orthogonal transformation unit 204 performs inverse-orthogonal transformation on the orthogonal transformation coefficients dequantized in step S203.

In step S205, the lossless decoding unit 202 determines whether the coded data of the processing target are intra-encoded or not on the basis of the information about the optimum prediction mode decoded in step S202. When the coded data of the processing target are determined to be intra-encoded, the processing proceeds to step S206.

In step S206, the intra-prediction unit 211 obtains the intra-prediction mode information. In step S207, the intra-prediction unit 211 uses the intra-prediction mode information obtained in step S206 to perform the intra-prediction and generate a prediction image.

Further, in step S206, when the coded data of the processing target are determined not to be intra-encoded, i.e., when the coded data of the processing target are determined to be inter-encoded, the processing proceeds to step S208.

In step S208, when the motion vector decoding unit 221 and the adjacent motion vector information setting unit 222 perform the motion vector re-structuring processing. The details of the motion vector re-structuring processing will be explained later in detail with reference to FIG. 21.

In the processing in step S208, information about the prediction motion vector decoded is referred to, and with the pipeline processing, a prediction motion vector of the PU in question is generated. More specifically, the prediction motion vector indicated by the index of the prediction motion vector of the PU in question provided from the prediction motion vector information buffer 241 is re-structured. Then, the prediction motion vector of the PU in question that has been re-structured is used to re-structure the motion vector, and the re-structured motion vector is provided to the motion prediction/compensation unit 212.

More specifically, when the index of the prediction motion vector of the PU in question provided from the prediction motion vector information buffer 241 indicates the spatial prediction motion vector at the left, the prediction motion vector of the PU in question is re-structured by referring to the adjacent motion vector information of the left adjacent PU provided from the spatial adjacent motion vector shared buffer 233. When the index of the prediction motion vector of the PU in question provided from the prediction motion vector information buffer 241 indicates the spatial prediction motion vector at the top, the prediction motion vector of the PU in question is re-structured by referring to the adjacent motion vector information of the top adjacent PU provided from the spatial adjacent motion vector internal buffer 245, which is provided under the control of the adjacent motion vector information setting unit 222. Further, when the index of the prediction motion vector of the PU in question provided from the prediction motion vector information buffer 241 indicates the temporal prediction motion vector, the prediction motion vector of the PU in question is re-structured by referring to the temporal adjacent motion vector information provided from the temporal adjacent motion vector shared buffer 232.

In step S209, the motion prediction/compensation unit 212 performs the inter-motion prediction processing by using the motion vector re-structured in the processing in step S208, and generates a prediction image. The prediction image thus generated is provided to the selection unit 213.

In step S210, the selection unit 213 selects the prediction image generated in step S207 or step S209. In step S211, the calculation unit 205 adds the prediction image selected in step S210 to the difference image information obtained from the inverse-orthogonal transformation in step S204. Accordingly, the original image is decoded. More specifically, the motion vector is used to generate a prediction image, and the generated prediction image and the difference image information provided from the inverse-orthogonal transformation unit 204 are added, and thus the original image is decoded.

In step S212, the deblock filter 206 performs, as necessary, the deblock filter processing on the decoded image obtained in step S211.

In step S213, the screen sorting buffer 207 sorts images filtered in step S212. More specifically, the order of frames sorted for encoding by the screen sorting buffer 102 of the image coding device 100 is sorted into the original order for display.

In step S214, the D/A conversion unit 208 performs D/A conversion on the images in which frames are sorted in step S213. The images are output to a display, not shown, and the images are displayed.

In step S215, the frame memory 209 stores the image filtered in step S212.

When the processing in step S215 is finished, the decoding processing is terminated.

[Flow of Motion Vector Re-Structuring Processing]

Subsequently, an example of the flow of motion vector re-structuring processing executed in step S208 in FIG. 20 will be explained with reference to the flowchart of FIG. 21. It should be noted that this motion vector re-structuring processing is processing for decoding the motion vector using the information which has been transmitted from the encoding side and which has been decoded by the lossless decoding unit 202.

Further, in the example of FIG. 21, in order to clearly indicate that this is processing with pipeline, the processing performed by the motion vector decoding unit 231-1 and the processing performed by the motion vector decoding unit 231-2 are shown separately. However, the processing in step S237 is the processing of the temporal adjacent motion vector shared buffer 232 and the spatial adjacent motion vector shared buffer 233, and therefore, the processing in step S237 is shown in a combined manner.

More specifically, in the example of FIG. 21, the motion vector re-structuring processing with respect to $PU_{-2}$, $PU_0$, ... that is executed by the motion vector decoding unit 231-1 is shown at the left side. On the other hand, the motion vector re-structuring processing with respect to $PU_{-1}$, $PU_1$, ... that is executed by the motion vector decoding unit 231-2 is shown at the right side.

Further, in the example of FIG. 21, broken lines are shown to clearly indicate in which step motion vector information is stored and in which step the motion vector information is used.

In step S202 of FIG. 20, the lossless decoding unit 202 provides the information of the decoded parameters and the like to corresponding units.

In step S231-1, the prediction motion vector information buffer 241-1 obtains, among the information of the decoded parameters, information indicating the index about the prediction motion vector (prediction motion vector information), and accumulates the obtained information. Then, the prediction motion vector information buffer 241-1 provides the prediction motion vector information to the prediction motion vector re-structuring unit 243-1 with predetermined timing.

It should be noted that, at this occasion, the difference motion vector information buffer 242-1 obtains, among the information of the decoded parameters, information of the difference motion vector, and accumulates the obtained information. Then, the difference motion vector information buffer 242-1 provides the information of the difference motion vector to the motion vector re-structuring unit 244-1.

In step S232-1, the prediction motion vector re-structuring unit 243-1 re-structures the temporal prediction motion vector of the $PU_{-2}$ in question on the basis of the method according to the MVP or Merge Mode explained above by referring to FIG. 5 or FIG. 7. More specifically, the motion vector information of the temporal adjacent PU that has been processed is stored in the temporal adjacent motion vector shared buffer 232 in step S237 which will be explained later. As indicated by an arrow of broken line, the motion vector information of a predetermined PU is read from the temporal adjacent motion vector shared buffer 232, and the read motion vector information is provided to the prediction motion vector re-structuring unit 243-1.

The prediction motion vector re-structuring unit 243-1 generates a temporal prediction motion vector of the $PU_{-2}$ in question by using the temporal adjacent motion vector information adjacent to the $PU_{-2}$ in question in terms of time provided from the temporal adjacent motion vector shared buffer 232.

In step S233-1, the prediction motion vector re-structuring unit 243-1 re-structures the prediction motion vector at Top (top) of the $PU_{-2}$ in question on the basis of the method according to the AMVP or Merge Mode. More specifically, the motion vector information of the top adjacent PU that has been processed is stored in the spatial adjacent motion vector internal buffer 245-1 in step S236-1 which will be explained later. As indicated by an arrow of broken line, under the control of the adjacent motion vector information setting unit 222, the motion vector information of a predetermined PU among top adjacent PUs adjacent to the top of the $PU_{-2}$ in question is read from the spatial adjacent motion vector internal buffer 245-1. For example, the motion vector information of $B_1$, $B_2$, $B_3$ of FIG. 10 is read from the spatial adjacent motion vector internal buffer 245-1, and the motion vector information thus read is provided to the prediction motion vector re-structuring unit 243-1.

The prediction motion vector re-structuring unit 243-1 uses the spatial adjacent motion vector information of the top adjacent PU adjacent to the PU in question in terms of space provided from the spatial adjacent motion vector internal buffer 245-1, to generate a spatial prediction motion vector of the $PU_{-2}$ in question.

It should be noted that, in the spatial adjacent motion vector internal buffer 245-1, reading of the spatial adjacent motion vector information of the top adjacent PU is controlled by the adjacent motion vector information setting unit 222.

More specifically, the spatial adjacent motion vector internal buffer 245-1 reads information indicating the motion vector derived with respect to the top adjacent PU adjacent to the top (for example, $B_1$, $B_2$, $B_3$ of FIG. 10), among the spatial adjacent PUs adjacent to the $PU_{-2}$ in question in terms of space. At this occasion, the spatial adjacent motion vector internal buffer 245-1 provides the information of the $PU_{-2}$ in question to the adjacent motion vector information setting unit 222, and does not read the motion vector of the PU which is prohibited (for example, $B_0$ of FIG. 8), among the top adjacent PUs provided correspondingly. The spatial adjacent motion vector internal buffer 245-1 provides the information which has been read as described above (spatial adjacent motion vector information) to the prediction motion vector re-structuring unit 243-1.

In step S234-1, the prediction motion vector re-structuring unit 243-1 re-structures the prediction motion vector at left (left) of the $PU_{-2}$ in question on the basis of the method according to the AMVP or Merge Mode. More specifically, the motion vector information of the left adjacent PU that has been processed is stored in the spatial adjacent motion vector shared buffer 233 in step S237 which will be explained later. As indicated by an arrow of broken line, the motion vector information of a predetermined PU among the left adjacent PUs adjacent to the left of the $PU_{-2}$ in question is read from the spatial adjacent motion vector shared buffer 233. For example, the motion vector information of $A_0$, $A_1$ of FIG. 10 is read from the spatial adjacent motion vector shared buffer 233, and the motion vector information thus read is provided to the prediction motion vector re-structuring unit 243-1.

The prediction motion vector re-structuring unit 243-1 uses the spatial adjacent motion vector information of the left adjacent PU adjacent to the PU in question in terms of space provided from the spatial adjacent motion vector shared buffer 233, to generate a spatial prediction motion vector of the $PU_{-2}$ in question.

It should be noted that the processing in step S232-1 to step S234-1 is processing that is performed on the basis of the index of the prediction motion vector of the $PU_{-2}$ in question provided from the prediction motion vector information buffer 241-1, and in reality, the processing in only one of these steps is executed. It should be noted that the processing in steps S232-1 to S234-1 will be explained in detail with reference to FIG. 22 later. The prediction motion vector re-structuring unit 243-1 provides the information of the prediction motion vector that has been re-structured to the motion vector re-structuring unit 244-1.

In step S235-1, the motion vector re-structuring unit 244-1 re-structures the motion vector. More specifically, the motion vector re-structuring unit 244-1 re-structures the motion vector by adding the difference motion vector of the $PU_{-2}$ in question indicated by the information provided from the difference motion vector information buffer 242-1 and the re-structured prediction motion vector of the $PU_{-2}$ in question. The motion vector re-structuring unit 244-1 provides the information indicating the re-structured motion vector to the motion prediction/compensation unit 212, the spatial adjacent motion vector internal buffer 245-1, the spatial adjacent motion vector shared buffer 233, and the temporal adjacent motion vector shared buffer 232.

In step S236-1, the spatial adjacent motion vector internal buffer 245-1 stores the motion vector information of the $PU_{-2}$ in question as the spatial adjacent motion vector information for a subsequent PU.

In step S237, the temporal adjacent motion vector shared buffer 232 stores the motion vector information of the $PU_{-2}$ in question as the temporal adjacent motion vector information for subsequent and later PUs. Likewise, the spatial adjacent motion vector shared buffer 233 stores the motion vector information about the $PU_{-2}$ in question as the spatial adjacent motion vector information for subsequent and later PUs.

On the other hand, in step S231-2, the prediction motion vector information buffer 241-2 obtains, among the information of the decoded parameters, information indicating the index about the prediction motion vector (prediction motion vector information), and accumulates the obtained information. Then, the prediction motion vector information buffer 241-2 provides the prediction motion vector information to the prediction motion vector re-structuring unit 243-2 with predetermined timing.

It should be noted that at this occasion, the difference motion vector information buffer 242-2 obtains, among the information of the decoded parameters, information of the difference motion vector, and accumulates the obtained information. Then, the difference motion vector information buffer 242-2 provides the information of the difference motion vector to the motion vector re-structuring unit 244-2.

In step S232-2, the prediction motion vector re-structuring unit 243-2 generates a temporal prediction motion vector of the $PU_{-1}$ in question on the basis of the method according to the AMVP or Merge Mode. More specifically, the motion vector information of the temporal adjacent PU that has been processed is stored in the temporal adjacent motion vector shared buffer 232 in step S237 which will be explained later. As indicated by an arrow of broken line, the motion vector information of a predetermined PU is read from the temporal adjacent motion vector shared buffer 232, and the motion vector information thus read is provided to the prediction motion vector re-structuring unit 243-2.

The prediction motion vector re-structuring unit 243-2 generates a temporal prediction motion vector of the $PU_{-1}$ in question by using the temporal adjacent motion vector information adjacent to the $PU_{-1}$ in question in terms of time provided from the temporal adjacent motion vector shared buffer 232.

In step S233-2, the prediction motion vector re-structuring unit 243-2 generates a prediction motion vector of Top (top) of the $PU_{-1}$ in question, on the basis of the method according to the AMVP or Merge Mode. More specifically, the motion vector information of the top adjacent PU that has been processed is stored in the spatial adjacent motion vector internal buffer 245-2 In step S236-2 which will be explained later. As indicated by an arrow of broken line, under the control of the adjacent motion vector information setting unit 222, the motion vector information of a predetermined PU among top adjacent PUs adjacent to the top of the PU$_{-1}$ in question is read from the spatial adjacent motion vector internal buffer 245-2. For example, the motion vector information of B$_1$, B$_2$, B$_3$ of FIG. 10 is read from the spatial adjacent motion vector internal buffer 245-2, and the motion vector information thus read is provided to the prediction motion vector re-structuring unit 243-2.

The prediction motion vector re-structuring unit 243-2 uses the spatial adjacent motion vector information of the top adjacent PU adjacent to the PU in question in terms of space provided from the spatial adjacent motion vector internal buffer 245-2, to generate a spatial prediction motion vector of the PU$_{-1}$ in question.

It should be noted that, in the spatial adjacent motion vector internal buffer 245-2, reading of the spatial adjacent motion vector information of the top adjacent PU is controlled by the adjacent motion vector information setting unit 222.

More specifically, the spatial adjacent motion vector internal buffer 245-2 reads information indicating the motion vector derived with respect to the top adjacent PU adjacent to the top (for example, B$_1$, B$_2$, B$_3$ of FIG. 10), among the spatial adjacent PUs adjacent to the PU$_{-1}$ in question in terms of space. At this occasion, the spatial adjacent motion vector internal buffer 245-2 provides the information of the PU$_{-1}$ in question to the adjacent motion vector information setting unit 222, and does not read the motion vector of the PU which is prohibited (for example, B$_0$ of FIG. 8), among the top adjacent PUs provided correspondingly. The spatial adjacent motion vector internal buffer 245-2 provides the information which has been read as described above (spatial adjacent motion vector information) to the prediction motion vector re-structuring unit 243-2.

In step S234-2, the prediction motion vector re-structuring unit 243-2 generates a prediction motion vector of left (left) of the PU$_{-1}$ in question on the basis of the method according to the AMVP or Merge Mode. More specifically, the motion vector information of the left adjacent PU that has been processed is stored in the spatial adjacent motion vector shared buffer 233 in step S237 which will be explained later. As indicated by an arrow of broken line, the motion vector information of a predetermined PU among the left adjacent PUs adjacent to the left of the PU$_{-1}$ in question is read from the spatial adjacent motion vector shared buffer 233. For example, the motion vector information of A$_0$, A$_1$ of FIG. 10 is read from the spatial adjacent motion vector shared buffer 233, and the motion vector information thus read is provided to the prediction motion vector re-structuring unit 243-2.

The prediction motion vector re-structuring unit 243-2 uses the spatial adjacent motion vector information of the left adjacent PU adjacent to the PU in question in terms of space provided from the spatial adjacent motion vector shared buffer 233, to generate a spatial prediction motion vector of the PU$_{-1}$.

It should be noted that the processing in step S232-2 to step S234-2 is processing that is performed on the basis of the index of the prediction motion vector of the PU$_{-1}$ in question provided from the prediction motion vector information buffer 241-2, and in reality, the processing in only one of these steps is executed. It should be noted that the processing in steps S232-2 to S234-2 will be explained in detail with reference to FIG. 22 later. The prediction motion vector re-structuring unit 243-2 provides the information of the prediction motion vector that has been re-structured to the motion vector re-structuring unit 244-2.

In step S235-2, the motion vector re-structuring unit 244-2 re-structures the motion vector. More specifically, the motion vector re-structuring unit 244-2 re-structures the motion vector by adding the difference motion vector of the PU$_1$ in question indicated by the information provided from the difference motion vector information buffer 242-2 and the re-structured prediction motion vector of the PU$_{-1}$ in question. The motion vector re-structuring unit 244-2 provides the information indicating the re-structured motion vector to the motion prediction/compensation unit 212, the spatial adjacent motion vector internal buffer 245-2, the spatial adjacent motion vector shared buffer 233, and the temporal adjacent motion vector shared buffer 232.

In step S236-2, the spatial adjacent motion vector internal buffer 245-2 stores the motion vector information of the PU$_{-1}$ in question as the spatial adjacent motion vector information for a subsequent PU.

In step S237, the temporal adjacent motion vector shared buffer 232 stores the motion vector information of the PU$_{-1}$ in questions the temporal adjacent motion vector information for subsequent and later PUs. Likewise, the spatial adjacent motion vector shared buffer 233 stores the motion vector information of the PU$_{-1}$ in question as the spatial adjacent motion vector information for subsequent and later PUs.

It should be noted that in the Merge Mode, the difference motion vector information is not transmitted from the encoding side, and the re-structured prediction motion vector is adopted as the motion vector, and therefore, the re-structuring processing of the motion vector in step S235-1 and step S235-2 is skipped.

[Flow of Prediction Motion Vector Re-Structuring Processing]

Subsequently, an example of the flow of prediction motion vector re-structuring processing executed in step S232-1 to step S234-1, and step S232-2 to step S234-2 of FIG. 21 will be explained with reference to the flowchart of FIG. 22.

In step S251, the prediction motion vector re-structuring unit 243 determines whether what is indicated by the index of the prediction motion vector of the PU in question provided from the prediction motion vector information buffer 241 is a temporal prediction motion vector or not.

When what is indicated by the index of the prediction motion vector of the PU in question provided from the prediction motion vector information buffer 241 is determined to be a temporal prediction motion vector in step S251, the processing proceeds to step S252.

In step S252, the prediction motion vector re-structuring unit 243 re-structures the temporal prediction motion vector. It should be noted that the processing in step S252 is the same processing as the processing in step S232-1 and step S232-2 of FIG. 21 described above, and therefore, the detailed description thereof is omitted.

When what is indicated by the index of the prediction motion vector of the PU in question provided from the prediction motion vector information buffer 241 is determined not to be a temporal prediction motion vector in step S251, the processing proceeds to step S253. In step S253, the prediction motion vector re-structuring unit 243 determines whether what is indicated by the index of the prediction motion vector of the PU in question provided from the prediction motion vector information buffer 241 is a spatial prediction motion vector at Top.

When what is indicated by the index of the prediction motion vector of the PU in question provided from the prediction motion vector information buffer 241 is determined to be a spatial prediction motion vector at Top in step S253, the processing proceeds to step S254.

In step S254, the prediction motion vector re-structuring unit 243 re-structures the spatial prediction motion vector at Top. It should be noted that the processing in step S254 is the same processing as the processing in step S233-1 and step S233-2 of FIG. 21 described above, and therefore, the detailed description thereof is omitted.

When what is indicated by the index of the prediction motion vector of the PU in question provided from the prediction motion vector information buffer 241 is determined not to be a spatial prediction motion vector at Top in step S253, the processing proceeds to step S255. In step S255, the prediction motion vector re-structuring unit 243 re-structures the spatial prediction motion vector at left. It should be noted that the processing in step S255 is the same processing as the processing in step S234-1 and step S234-2 of FIG. 21 described above, and therefore, the detailed description thereof is omitted.

As described above, in the decoding processing of the motion vector of the PU in question, i.e., in there-structuring processing of the prediction motion vector, such configuration is adopted that the motion vector information of the PU located at the top right of the PU in question is prohibited from being used.

Accordingly, for example, after the processing in step S236-1, the motion vector decoding unit 231-1 can immediately perform processing on a subsequent $PU_0$ even if the motion vector decoding unit 231-2 has not yet finished the processing on the $PU_{-1}$ in step S236-2. More specifically, as explained above with reference to FIG. 13, the processing with pipeline can be performed.

By performing each processing as described above, the image decoding device 200 can correctly decode the coded data encoded by the image coding device 100, and can improve the encoding efficiency.

More specifically, in the decoding processing of the motion vector of the PU in question, i.e., in the re-structuring processing of the prediction motion vector, the motion vector information of the PU located at the top right of the PU in question is prohibited from being used in the image decoding device 200.

Accordingly, processing with pipeline can be performed efficiently, and the processing efficiency can be improved.

3. Third Embodiment

[Control of LCU Unit]

It is noted that, in the above explanation, the PU is explained as a unit of control. Instead of the PU, an LCU may be adopted as a unit of control. More specifically, such configuration may be adopted that in an LCU unit which is a maximum encoding unit, a PU located at the top right of the LCU ($B_0$ of FIG. 8) is prohibited from being used.

The explanation will be made again with reference to FIG. 8. Only when the top and right borders of the PU in question are an LCU border, $B_0$ is prohibited from being used. More specifically, only in a case where, in the LCU including the PU in question, the PU in question is a PU located at the top right of the LCU, $B_0$ is prohibited from being used.

Accordingly, the pipeline processing can be performed in the LCU unit.

It should be noted that in a case of the LCU unit, a determination unit which determines whether the border of the PU in question is the border of the LCU or not may be constituted in adjacent motion vector information setting units 122 and 222 or may be constituted in a motion vector encoding unit 131 and a motion vector decoding unit 231. Further, such configuration may be adopted that the processing for determining whether the border of the PU in question is the border of the LCU or not is determined by spatial adjacent motion vector internal buffers 141 and 245.

The explanation will be made again with reference to FIG. 13. The example illustrated in FIG. 13 is an example in a case where PUs are of the same size, but in reality, PUs are likely to be set with various sizes. Therefore, when control is performed in the PU unit, the length of processing time of each PU, e.g., the length of processing time of a $PU_{-2}$ (from t0 to t2), the length of processing time of a $PU_{-1}$ (from t1 to t5), and the length of processing time of a $PU_0$ (from t4 to t8) as shown in FIG. 13, may vary.

In contrast, when control is performed in the LCU unit, the length of processing time of an LCU is the same (does not vary). Therefore, when the processing is controlled in the LCU unit, the control of the pipeline processing becomes easy as compared with a case where the processing is controlled in the PU unit.

It should be noted that a typical example has been explained above using the LCU, but the present technique is also applicable in a unit other than the LCU as long as it is such a unit that the length of processing time does not vary as described above.

Further, identification information for identifying whether processing for prohibiting the use of the motion vector of the top right region is performed in the prediction unit (PU unit) or in the maximum encoding unit (LCU unit) can also be set.

This identification information is set in a unit in which control is to be performed at an encoding side, and transmitted together with a coded stream. For example, when control is to be performed in a slice unit, this identification information is set in a slice header. For example, when control is to be performed in a picture unit, this identification information is set in a picture parameter set. When control is to be performed in a sequence unit, this identification information is set in a sequence parameter set.

Then, a decoding side receives the coded stream as well as the identification information thereof, and in accordance with the received identification information, the use of the motion vector of the top right region is prohibited.

As described above, in the re-structuring processing of the prediction motion vector, the motion vector information of the PU located at the top right of the target region (PU or LCU) is prohibited from being used.

Accordingly, processing with pipeline can be performed efficiently, and the processing efficiency can be improved.

It is noted that, in the above explanation, an example of the case based on the HEVC has been explained, but the present technique can also be applied in an apparatus using other coding methods as long as it is an apparatus which performs encoding processing and decoding processing of the motion vector information according to the AMVP and the Merge Mode.

Further, for example, the present technique can be applied to an image coding device and an image decoding device which are used for receiving image information (bit stream) compressed by orthogonal transformation such as discrete cosine transform and motion compensation similarly to MPEG, H.26x and the like, via network media such as satellite broadcasting, cable television, the Internet, and cellular phone. The present technique can be applied to an image coding device and an image decoding device used for processing on recording media such as optical, magnetic disks, and flash memories. Further, this technique can also be applied to a motion prediction compensation device included in the image coding device, the image decoding device, and the like.

4. Fourth Embodiment

Application to [Multi-View Image Point Coding/Multi-Viewpoint Image Decoding]

The above series of processing can be applied to multi-viewpoint image coding/multi-viewpoint image decoding. FIG. 23 illustrates an example of multi-viewpoint image coding method.

As illustrated in FIG. 23, a multi-viewpoint image includes images for multiple view points, and images of predetermined viewpoint of the multiple viewpoints are designated as base view images. Images of viewpoints other than the base view image are treated as non-base view images.

When the multi-viewpoint image coding as shown in FIG. 23 is performed, the prohibition of use of the motion vector information of a predetermined region (more specifically, the top right region located at the top right of the target region explained above) in the generation or re-structuring of the prediction vector can be set in each view (the same view). Further, in each view (different view), the prohibition of use of the motion vector information of a predetermined region that is set in another view can also be applied.

In this case, the prohibition of use of the motion vector that is set in a base view is applied to at least one non-base view. Alternatively, for example, the prohibition of use of the motion vector that is set in a non-base view (view_id=i) is applied to at least any one of the base view and the non-base view (view_id=j).

Further, in each view (the same view), it is also possible to set the identification information for identifying whether the processing for prohibiting the use of the motion vector of a predetermined region is performed in the prediction unit or in the maximum encoding unit. Further, in each view (different views), it is also possible to share the identification information for identifying whether the processing for prohibiting the use of the motion vector of a predetermined region that is set in another view is performed in the prediction unit or in the maximum encoding unit.

In this case, the identification information that is set in the base view is used in at least one non-base view. Alternatively, for example, the identification information that is set in the non-base view (view_id=i) is used in at least any one of the base view and the non-base view (view_id=j).

Accordingly, processing with pipeline can be performed efficiently, and the processing efficiency can be improved.
[Multi-Viewpoint Image Coding Device]

FIG. 24 is a figure illustrating a multi-viewpoint image coding device performing the multi-viewpoint image coding explained above. As illustrated in FIG. 24, a multi-viewpoint image coding device 600 includes a coding unit 601, a coding unit 602, and a multiplexing unit 603.

The coding unit 601 encodes base view images, and generates a base view image coded stream. The coding unit 602 encodes non-base view images, and generates a non-base view image coded stream. The multiplexing unit 603 multiplexes the base view image coded stream generated by the coding unit 601 and the non-base view image coded stream generated by the coding unit 602, and generates a multi-viewpoint image coded stream.

The image coding device 100 (FIG. 1) can be applied to the coding unit 601 and coding unit 602 of the multi-viewpoint image coding device 600. In this case, the multi-viewpoint image coding device 600 sets the identification information which is set by the coding unit 601 and the identification information which is set by the coding unit 602, and transmits the identification information.

It should be noted that such configuration may be adopted that the identification information which is set by the coding unit 601 as described above is set so as to be shared and used in the coding unit 601 and the coding unit 602 and is transmitted. On the contrary, such configuration may be adopted that the identification information which is set by the coding unit 602 is set so as to be shared and used in the coding unit 601 and the coding unit 602 and is transmitted.
[Multi-Viewpoint Image Decoding Device]

FIG. 25 is a figure illustrating a multi-viewpoint image decoding device that performs the multi-viewpoint image decoding explained above. As illustrated in FIG. 25, the multi-viewpoint image decoding device 610 includes a demultiplexing unit 611, a decoding unit 612, and a decoding unit 613.

The demultiplexing unit 611 demultiplexes the multi-viewpoint image coded stream obtained by multiplexing the base view image coded stream and the non-base view image coded stream, and extracts the base view image coded stream and the non-base view image coded stream. The decoding unit 612 decodes the base view image coded stream extracted by the demultiplexing unit 611, and obtains the base view images. The decoding unit 613 decodes the non-base view image coded stream extracted by the demultiplexing unit 611, and obtains the non-base view images.

The image decoding device 200 (FIG. 18) can be applied to the decoding unit 612 and decoding unit 613 of the multi-viewpoint image decoding device 610. In this case, the multi-viewpoint image decoding device 610 performs processing using the identification information which is set by the coding unit 601 and decoded by the decoding unit 612 and the identification information which is set by the coding unit 602 and decoded by the decoding unit 613.

It should be noted that the identification information which is set by the coding unit 601 (or, the coding 602) as described above may be set so as to be shared and used in the coding unit 601 and the coding unit 602 and is transmitted. In this case, in the multi-viewpoint image decoding device 610 the processing is performed by using the identification information which is set by the coding unit 601 (or, the coding 602) and decoded by the decoding unit 612 (or decoding unit 613).

5. Fifth Embodiment

[Application to Hierarchical Image Point Coding/Hierarchical Image Decoding]

The above series of processing can be applied to hierarchical image coding/hierarchical image decoding. FIG. 26 illustrates an example of multi-viewpoint image coding method.

As illustrated in FIG. 26, a hierarchical image includes images of multiple hierarchical (resolution), and a hierarchical image of a predetermined one of the multiple resolution is designated as a base layer image. Images of hierarchies other than the base layer image are treated as non-base layer images.

When the hierarchical image coding (spatial scalability) as shown in FIG. 26 is performed, the prohibition of use of the motion vector information of a predetermined region in the generation or re-structuring of the prediction vector can be set in each layer (the same layer). Further, in each layer (different layers), the prohibition of use of the motion vector information of a predetermined region which is set in another layer can be applied.

In this case, the prohibition of use of the motion vector which is set in the base layer is used in at least one non-base layer. Alternatively, for example, the prohibition of use of the motion vector which is set in the non-base layer (layer_id=i) is used in at least any one of the base layer and the non-base layer (layer_id=j).

Further, in each layer (the same layer), it is also possible to set the identification information for identifying whether the processing for prohibiting the use of the motion vector of a predetermined region is performed in the prediction unit or in the maximum encoding unit. Further, in each layer (different layers), it is also possible to share the identification information for identifying whether the processing for prohibiting the use of the motion vector of a predetermined region that is set in another view is performed in the prediction unit or in the maximum encoding unit.

In this case, the identification information which is set in the base layer is used in at least one non-base layer. Alternatively, for example, the identification information which is set in the non-base layer (layer_id=i) is used in at least any one of the base layer and the non-base layer (layer_id=j).

Accordingly, processing with pipeline can be performed efficiently, and the processing efficiency can be improved.

[Hierarchical Image Coding Device]

FIG. 27 is a figure illustrating a hierarchical image coding device that performs the hierarchical image coding explained above. As illustrated in FIG. 27, the hierarchical image coding device 620 includes a coding unit 621, a coding unit 622, and a multiplexing unit 623.

The coding unit 621 encodes base layer images, and generates a base layer image coded stream. The coding unit 622 encodes non-base layer images, and generates a non-base layer image coded stream. The multiplexing unit 623 multiplexes the base layer image coded stream generated by the coding unit 621 and the non-base layer image coded stream generated by the coding unit 622, and generates a hierarchical image coded stream.

The image coding device 100 (FIG. 1) can be applied to the coding unit 621 and the coding unit 622 of the hierarchical image coding device 620. In this case, the hierarchical image coding device 620 sets the identification information which is set by the coding unit 621 and the identification information which is set by the coding unit 622, and transmits the identification information.

It should be noted that such configuration may be adopted that the identification information which is set by the coding unit 621 as described above is set so as to be shared and used in the coding unit 621 and the coding unit 622, and is transmitted. On the contrary, such configuration may be adopted that the identification information which is set by the coding unit 622 is set so as to be shared and used in the coding unit 621 and the coding unit 622, and is transmitted.

[Hierarchical Image Decoding Device]

FIG. 28 is a figure illustrating a hierarchical image decoding device that performs the hierarchical image decoding explained above. As illustrated in FIG. 28, the hierarchical image decoding device 630 includes a demultiplexing unit 631, a decoding unit 632, and a decoding unit 633.

The demultiplexing unit 631 demultiplexes the hierarchical image coded stream obtained by multiplexing the base layer image coded stream and the non-base layer image coded stream, and extracts the base layer image coded stream and the non-base layer image coded stream. The decoding unit 632 decodes the base layer image coded stream extracted by the demultiplexing unit 631, and obtains the base layer image. The decoding unit 633 decodes the non-base layer image coded stream extracted by the demultiplexing unit 631, and obtains the non-base layer image.

The image decoding device 200 (FIG. 18) can be applied to the decoding unit 632 and the decoding unit 633 of the hierarchical image decoding device 630. In this case, the hierarchical image decoding device 630 performs processing by using the identification information which is set by the coding unit 621 and which is decoded by the decoding unit 632 and the identification information which is set by the coding unit 622 and which is decoded by the decoding unit 633.

It should be noted that, the identification information which is set by the coding unit 621 (or, the coding 622) described above may be set so as to be shared and used in the coding unit 621 and the coding unit 622, and is transmitted. In this case, in the hierarchical image decoding device 630 the processing is performed by using the identification information which is set by the coding unit 621 (or, the coding 622) and decoded by the decoding unit 632 (or, the decoding unit 633).

6. Sixth Embodiment

[Computer]

The above series of processing may be executed by hardware, or may be executed by software. When the series of processing is executed by software, programs constituting the software are installed to the computer. Here, the computer includes a computer incorporated into dedicated hardware and a general-purpose personal computer capable of executing various kinds of functions by installing various kinds of programs.

FIG. 29 is a block diagram illustrating an example of configuration of hardware of a computer executing the above series of processing using a program.

In a computer 800, a CPU (Central Processing Unit) 801, a ROM (Read Only Memory) 802, and a PAM (Random Access Memory) 803 are connected with each other via a bus 804.

The bus 804 is further connected with an input/output interface 805. The input/output interface 805 is connected with an input unit 806, an output unit 807, a storage unit 808, a communication unit 809, and a drive 810.

The input unit 806 is constituted by a keyboard, a mouse, a microphone, and the like. The output unit 807 is constituted by a display, a speaker, and the like. The storage unit 808 is constituted by a hard disk, a nonvolatile memory, and the like. The communication unit 809 is constituted by a network interface and the like. The drive 810 drives a removable medium 811 such as a magnetic disk, an optical disk, a magneto-optical disk, and a semiconductor memory.

In the computer configured as described above, the CPU 801 performs the above series of processing by, e.g., executing the program stored in the storage unit 808 by loading the program to the RAM 803 via the input/output interface 805 and the bus 804.

The program executed by the computer 800 (CPU 801) may be provided as being recorded to the removable medium 811 serving as, for example, a package medium. Further, the program can be provided via wired or wireless transmission media such as local area network, the Internet, and digital satellite broadcasting.

In the computer, the program can be installed to the storage unit 808 via the input/output interface 805 by loading the removable medium 811 to the drive 810. Further, the program can be installed to the storage unit 808 by receiving the program with the communication unit 809 via wired or wireless transmission media. Also, the program can be installed to the ROM 802 and the storage unit 808 beforehand.

The program executed by the computer may be a program with which processing in performed in time sequence according to the order explained in this specification, or may be a program with which processing is performed in parallel or with necessary timing, e.g., upon call.

In this specification, steps describing the program recorded in the recording medium include processing performed in time sequence according to the described order. The steps may not be necessarily performed in time sequence, and the steps include processing executed in parallel or individually.

In this specification, the system includes the entire apparatus constituted by a plurality of devices.

A configuration explained as a device (or a processing unit) in the above explanation may be divided, and structured as multiple devices (or processing units). A configuration explained as multiple devices (or processing units) in the above explanation may be combined, and structured as a device (or a processing unit). Alternatively, it is to be understood that the configuration of each device (or each processing unit) may be added with any configuration other than the above. Further, when the configuration and operation of the entire system are substantially the same, a part of configuration of a certain device (or processing unit) may be included in the configuration of another device (or another processing unit). More specifically, this technique is not limited to the above embodiment, and may be changed in various manners as long as it is within the gist of this technique.

The image coding device and image decoding device according to the embodiments explained above can be applied to various kinds of electronic devices such as a transmitter or a receiver for distribution to terminals by satellite broadcasting, cable broadcasting such as cable television, distribution on the Internet, cellular communication, recording devices for recording images to a medium such as an optical disk, magnetic disk, and flash memory, or a reproduction device for reproducing images from these recording media. Hereinafter, four examples of applications will be explained.

7. Example of Application

[First Example of Application: Television Reception Device]

FIG. 30 illustrates an example of schematic configuration illustrating a television device to which the above embodiments are applied. The television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901, and demodulates the extracted signal. Then the tuner 902 outputs the encoded bit stream obtained from the demodulation to the demultiplexer 903. More specifically, the tuner 902 plays a role of a transmission means in the television device 900 for receiving the coded stream in which an image is encoded.

The demultiplexer 903 separates a video stream and an audio stream of a program of viewing target from the encoded bit stream, and outputs the separated streams to the decoder 904. Further, the demultiplexer 903 extracts auxiliary data such as EPG (Electronic Program Guide) from the encoded bit stream, and provides the extracted data to the control unit 910. It should be noted that the demultiplexer 903 may perform descrambling in a case where the encoded bit stream is scrambled.

The decoder 904 decodes the video stream and the audio stream received from the demultiplexer 903. Then, decoder 904 outputs the video data generated from the decoding processing to the video signal processing unit 905. The decoder 904 outputs the audio data generated from the decoding processing to the audio signal processing unit 907.

The video signal processing unit 905 plays the video data received from the decoder 904, and causes the display unit 906 to display the video. The video signal processing unit 905 may display, on the display unit 906, an application screen provided via the network. The video signal processing unit 905 may perform additional processing such as noise reduction on the video data in accordance with setting. Further, the video signal processing unit 905 generates an image of GUI (Graphical User Interface) such as menu, buttons, or cursor, and overlays the generated image on the output image.

The display unit 906 is driven by a driving signal provided from the video signal processing unit 905, and displays video or image on a video screen of a display device (such as liquid crystal display, plasma display or OLED (Organic ElectroLuminescence Display) (organic ELdisplay) and the like).

The audio signal processing unit 907 performs reproduction processing such as D/A conversion and amplification of audio data received from the decoder 904, and causes the speaker 908 to output audio. The audio signal processing unit 907 may perform additional processing such as noise reduction on the audio data.

The external interface 909 is an interface for connection between the television device 900 and external device or network. For example, a video stream or an audio stream received via the external interface 909 may be decoded by the decoder 904. More specifically, the external interface 909 also plays a role of a transmission means in the television device 900 for receiving the coded stream in which an image is encoded.

The control unit 910 has a memory such as a processor for a CPU and the like, and a RAM and a ROM. The memory stores, e.g., programs executed by the CPU, program data, EPG data, and data obtained via the network. The program stored in the memory may be, for example, read and executed by the CPU when the television device 900 is activated. The CPU executes the program to control operation of the television device 900 in accordance with operation signal received from the user interface 911, for example.

The user interface 911 is connected to the control unit 910. The user interface 911 includes, e.g., buttons and switches with which the user operates the television device 900, and a reception unit for receiving a remote control signal. The user interface 911 generates an operation signal by detecting user's operation via these constituent elements, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 with each other.

In the television device 900 configured as described above, the decoder 904 has a function of an image decoding device according to the embodiments explained above. According, in the decoding of the images in the television device 900, the processing efficiency can be improved by pipeline processing in the decoding of the motion vectors.

[Second Example of Application: Cellular Phone]

FIG. 31 illustrates an example of schematic configuration illustrating a cellular phone to which the above embodiments are applied. The cellular phone 920 includes an antenna 921, a communication unit 922, an audio codec 923, speaker 924, a microphone 925, a camera unit 926, an image processing unit 927, a demultiplexer 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the demultiplexer 928, the recording/reproducing unit 929, the display unit 930, and the control unit 931 with each other.

The cellular phone 920 performs operation such as transmission/reception of audio signals, transmission/reception of e-mails or image data, capturing images, and recording data in various kinds of modes including audio phone call mode, data communication mode, shooting mode, and video call mode.

In the audio phone call mode, an analog audio signal generated by the microphone 925 is provided to the audio codec 923. The audio codec 923 converts an analog audio signal into audio data, performs A/D conversion on the converted audio data, and compresses the audio data. Then, the audio codec 923 outputs the compressed audio data to the communication unit 922. The communication unit 922 encodes and modulates the audio data, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. Then, the communication unit 922 generates audio data by demodulating and decoding a reception signal, and outputs the generated audio data to the audio codec 923. The audio codec 923 decompresses the audio data, performs D/A conversion, and generates an analog audio signal. Then, the audio codec 923 provides the generated audio signal to the speaker 924, and outputs audio.

In the data communication mode, for example, the control unit 931 generates text data constituting an e-mail in accordance given with user's operation with operation unit 932. The control unit 931 displays characters on the display unit 930. The control unit 931 generates e-mail data in accordance with user's transmission instruction given with the operation unit 932, and outputs the generated e-mail data to the communication unit 922. The communication unit 922 encodes and modulates e-mail data, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. Then, the communication unit 922 restores e-mail data by demodulating and decoding the reception signal, and outputs the restored e-mail data to the control unit 931. The control unit 931 displays the contents of the e-mail on the display unit

930, and stores the e-mail data to the recording medium of the recording/reproducing unit 929.

The recording/reproducing unit 929 has any given recording medium that can be read and written. For example, the recording medium may be an internal recording medium such as a RAM or a flash memory, and may be an externally-attached recording medium such as a hard disk, a magnetic disk, a magneto-optical disk, an optical disk, a USB (Unallocated Space Bitmap) memory, or a memory card.

In the shooting mode, for example, the camera unit 926 captures an image of a subject, generates image data, and outputs the generated image data to the image processing unit 927. The image processing unit 927 encodes the image data, which are input from the camera unit 926, and stores the coded stream in the storage medium of the recording/reproducing unit 929.

In the video call mode, for example, the demultiplexer 928 multiplexes the video stream encoded by the image processing unit 927 and the audio stream received from the audio codec 923, and outputs the multiplexed stream to the communication unit 922. The communication unit 922 encodes and modulates the stream, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. The transmission signal and the reception signal may include the encoded bitstream. Then, the communication unit 922 restores the stream by demodulating and decoding the reception signal, and outputs the restored stream to the demultiplexer 928. The demultiplexer 928 separates the video stream and the audio stream from the received stream, and outputs the video stream to the image processing unit 927 and the audio stream to the audio codec 923. The image processing unit 927 decodes the video stream, and generates video data. The video data are provided to the display unit 930, and the display unit 930 displays a series of images. The audio codec 923 decompresses the audio stream, performs D/A conversion, and generates an analog audio signal. Then, the audio codec 923 provides the generated audio signal to the speaker 924, and outputs audio.

In the cellular phone 920 configured as described above, the image processing unit 927 has a function of the image coding device and the image decoding device according to the embodiments explained above. Accordingly, in the encoding and decoding of images in the cellular phone 920, the processing efficiency can be improved with pipeline processing in the encoding or decoding of the motion vectors.

[Third Example of Application: Recording/Reproducing Device]

FIG. 32 illustrates an example of schematic configuration illustrating a recording/reproducing device to which the above embodiments are applied. For example, the recording/reproducing device 940 encodes the audio data and the video data of received broadcasting program, and records them to the recording medium. For example, the recording/reproducing device 940 may encode the audio data and the video data of obtained from another device, and may record them to the recording medium. For example, the recording/reproducing device 940 reproduces the data recorded on the recording medium using the monitor and the speaker in accordance with user's instruction. At this occasion, the recording/reproducing device 940 decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcasting signal received via an antenna (not shown), and demodulates the extracted signal. Then, the tuner 941 outputs the encoded bit stream obtained from the decoding to the selector 946. More specifically, the tuner 941 plays a role of a transmission means in the recording/reproducing device 940.

The external interface 942 is an interface for connection between the recording/reproducing device 940 and external device or network. The external interface 942 may be, for example, an IEEE1394 interface, a network interface, a USB interface, a flash memory interface, or the like. For example, the video data and audio data received via the external interface 942 are input into the encoder 943. More specifically, the external interface 942 plays a role of a transmission means in the recording/reproducing device 940.

When the video data and the audio data received from the external interface 942 are not encoded, the encoder 943 encodes the video data and the audio data. Then, the encoder 943 outputs the encoded bit stream to the selector 946.

The HDD 944 records the encoded bit stream obtained by compressing content data such as video and audio, various kinds of programs, and other data to the hard disk provided therein. When the video and audio are reproduced, the HDD 944 reads the data from the hard disk.

The disk drive 945 records and reads data to/from the recording medium loaded. The recording medium loaded to the disk drive 945 may be, for example, a DVD disk (DVD-Video, DVD-RAM, DVD-R, DVD-RW, DVD+R, DVD+RW, and the like) or Blu-ray (registered trademark) disk.

When the video and the audio are recorded, the selector 946 selects the encoded bit stream which is input from the tuner 941 or the encoder 943, and outputs the selected encoded bit stream to the HDD 944 or the disk drive 945. Further, when the video and the audio are reproduced, the selector 946 outputs the encoded bit stream which is input from the HDD 944 or the disk drive 945 to the decoder 947.

The decoder 947 decodes the encoded bit stream, and generates video data and audio data. Then, the decoder 947 outputs the generated video data to an OSD 94. The decoder 904 outputs the generated audio data to an external speaker.

The OSD 948 reproduces the video data received from the decoder 947, and displays video. The OSD 948 may overlays images of GUI such as menu, buttons, or cursor, on the displayed video.

The control unit 949 has a memory such as a processor for a CPU and the like, and a RAM and a ROM. The memory records programs executed by the CPU, program data, and the like. The program stored in the memory may be, for example, read and executed by the CPU when the recording/reproducing device 940 is activated. The CPU executes the program to control operation of the recording/reproducing device 940 in accordance with operation signal received from the user interface 950, for example.

The user interface 950 is connected to the control unit 949. The user interface 950 includes, e.g., buttons and switches with which the user operates the recording/reproducing device 940, and a reception unit for receiving a remote control signal. The user interface 950 generates an operation signal by detecting user's operation via these constituent elements, and outputs the generated operation signal to the control unit 949.

In the recording/reproducing device 940 configured as described above, the encoder 943 has a function of the image coding device according to the above embodiment. The decoder 947 has a function of an image decoding device according to the embodiments explained above. Accordingly, in the encoding and decoding of images in the recording/reproducing device 940, the processing efficiency can be improved with pipeline processing in the encoding or decoding of the motion vectors.

[Fourth Example of Application: Image-Capturing Device]

FIG. 33 illustrates an example of schematic configuration illustrating an image-capturing device to which the above embodiments are applied. An image-capturing device 960 captures an image of a subject, generates image data, and records the image data to a recording medium.

The image-capturing device 960 includes an optical block 961, an image-capturing unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected the image-capturing unit 962. The image-capturing unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970 with each other.

The optical block 961 includes a focus lens and a diaphragm mechanism. The optical block 961 causes an optical image of a subject to be formed on an image-capturing surface of the image-capturing unit 962. The image-capturing unit 962 includes an image sensor such as a CCD (Charge Coupled Device) or a CMOS (Complementary Metal Oxide Semiconductor), and converts the optical image formed on the image-capturing surface into an image signal which is an electric signal by photoelectric conversion. Then, the image-capturing unit 962 outputs the image signal to the signal processing unit 963.

The signal processing unit 963 performs various kinds of camera signal processing such as knee correction, gamma correction, and color correction on an image signal received from the image-capturing unit 962. The signal processing unit 963 outputs the image data which have been subjected to the camera signal processing to the image processing unit 964.

The image processing unit 964 encodes the image data received from the signal processing unit 963, and generates coded data. Then, the image processing unit 964 outputs the generated coded data to the external interface 966 or the medium drive 968. The image processing unit 964 decodes the coded data received from the external interface 966 or the medium drive 968, and generates image data. Then, the image processing unit 964 outputs the generated image data to the display unit 965. The image processing unit 964 may output the image data received from the signal processing unit 963 to the display unit 965, and may display the image thereon. The image processing unit 964 may also overlay display data obtained from the OSD 969 on the image which is to be output to the display unit 965.

For example, the OSD 969 may generate images of GUI such as menu, buttons, or cursor, and output the generated image to the image processing unit 964.

The external interface 966 is configured as, for example, a USB input/output terminal. The external interface 966 connects the image-capturing device 960 and a printer during printing of an image, for example. The external interface 966 is connected to a drive, as necessary. In the drive, for example, a removable medium such as a magnetic disk or an optical disk may be loaded. A program which is read from the removable medium may be installed to the image-capturing device 960. Further, the external interface 966 may be configured as a network interface connected to a network such as a LAN or the Internet. More specifically, the external interface 966 plays a role of a transmission means in the image-capturing device 960.

The recording medium loaded to the medium drive 968 may be any given removable medium which can be read and written, such as a magnetic disk, an optical magnetic disk, an optical disk, or a semiconductor memory. The recording medium loaded to the medium drive 968 in a fixed manner, and, for example, a non-removable storage unit such as an internal hard disk drive or SSD (Solid State Drive) may be configured.

The control unit 970 has a memory such as a processor for a CPU and the like, and a RAM and a ROM. The memory records programs executed by the CPU, program data, and the like. The program stored in the memory may be, for example, read and executed by the CPU when the image-capturing device 960 is activated. The CPU executes the program to control operation of the image-capturing device 960 in accordance with operation signal received from the user interface 950, for example.

The user interface 971 is connected to the control unit 970. The user interface 971 includes, e.g., buttons and switches with which the user operates the image-capturing device 960. The user interface 971 generates an operation signal by detecting user's operation via these constituent elements, and outputs the generated operation signal to the control unit 970.

In the image-capturing device 960 configured as described above, the image processing unit 964 has a function of the image coding device and the image decoding device according to the embodiments explained above. Accordingly, in the encoding and decoding of images in the image-capturing device 960, the processing efficiency can be improved with pipeline processing in the encoding or decoding of the motion vectors.

It is noted that, in this specification, the example has been explained in which various kinds of information such as the index of the prediction motion vector, difference motion vector information, and the identification information for identifying the unit with which the use of the motion vector of the top right region is prohibited are multiplexed into the coded stream, and transmitted from the encoding side to the decoding side. However, the method for transmitting information is not limited to such example. For example, the information may not be multiplexed into the encoded bit stream, and may be transmitted or recorded as separate data associated with the encoded bit stream. In this case, the term "associated" means that the image included in the bit stream (which may be a part of image such as slice or block) and information corresponding to the image is linked during decoding. More specifically, the information may be transmitted through a transmission path which is separate from the image (or bit stream). The information may be recorded to another recording medium which is different from the image (orbit stream) (or another recording area of the same recording medium). Further, the information and the image (or bit stream) may be associated with each other in any given unit such as multiple frames, a frame, or a portion of a frame.

The preferred embodiments of the present disclosure have been herein above described in detail with reference to attached drawings, but the present disclosure is not limited to such example. It is evident that a person of ordinarily skilled in the art to which the technique of the present disclosure pertains can conceive of various kinds of changes or modifications within the scope of the technical gist described in the claims, and it is understood that various kinds of changes or modifications within the scope of the technical gist described in the claims are also included in the technical scope of the present disclosure.

It should be noted that this technique can also be configured as follows.

(1) An image processing apparatus including an adjacent motion vector information setting unit which, when a spatial prediction motion vector is generated with a prediction motion vector used for decoding of a motion vector of a current block of an image being as a target, prohibits use of a motion vector of a top right block located adjacent to top right of the current block; a prediction motion vector generation unit which generates a spatial prediction vector of the current block, using a motion vector other than the motion vector of the top right block which is prohibited from being used by the adjacent motion vector information setting unit, with a motion vector of a spatial adjacent block located adjacent to the current block in terms of space being as a target; and a motion vector decoding unit which decodes the motion vector of the current block, using the prediction motion vector of the current block.

(2) The image processing apparatus according to (1) described above, wherein the prediction motion vector generation unit performs, with pipeline, generation processing of the spatial prediction vector with respect to the current block and generation processing of a spatial prediction vector with respect to a block subsequent to the current block in scan order.

(3) The image processing apparatus according to (1) or (2) described above, wherein the prediction motion vector generation unit generates the spatial prediction vector of the current block, using a motion vector of a first block which is a spatial adjacent block of the current block and which is located at a right end with a top block in surface contact with a top of the current block being as a target.

(4) The image processing apparatus according to (1) or (2) described above, wherein the prediction motion vector generation unit generates the spatial prediction vector of the current block, using a motion vector of a first block which is a spatial adjacent block of the current block and which is located at a right end with a top block in surface contact with a top of the current block being as a target, and a motion vector of a second block other than the first block with the top block being as a target.

(5) The image processing apparatus according to (4) described above, wherein the second block is a block which is located adjacent to left of the first block with the top block being as a target.

(6) The image processing apparatus according to (4) described above, wherein the second block is a block which is located around a center of a length in a horizontal direction of the current block with the top block being as a target.

(7) The image processing apparatus according to (1) to (6) described above, wherein the adjacent motion vector information setting unit prohibits the use of the motion vector of the top right block in a maximum encoding unit.

(8) The image processing apparatus according to (7) described above further including a border determination unit which determines whether a border of the current block is a border of the maximum encoding unit, wherein the adjacent motion vector information setting unit prohibits the use of the motion vector of the top right block only when the border determination unit determines that the border of the current block is the border of the maximum encoding unit.

(9) The image processing apparatus according to (7) described above, wherein the adjacent motion vector information setting unit prohibits the use of the motion vector of the top right block in accordance with identification information for identifying whether the use of the motion vector of the top right block is prohibited in a prediction unit or the use of the motion vector of the top right block is prohibited in the maximum encoding unit.

(10) An image processing method, wherein when a spatial prediction motion vector is generated with a prediction motion vector used for decoding of a motion vector of a current block of an image being as a target, an image processing apparatus prohibits use of a motion vector of a top right block located adjacent to top right of the current block; generates a spatial prediction vector of the current block, using a motion vector other than the motion vector of the top right block which is prohibited from being used, with a motion vector of a spatial adjacent block located adjacent to the current block in terms of space being as a target; and decodes the motion vector of the current block, using the prediction motion vector of the current block.

(11) An image processing apparatus including an adjacent motion vector information setting unit which, when a spatial prediction motion vector is generated with a prediction motion vector used for encoding of a motion vector of a current block of an image being as a target, prohibits use of a motion vector of a top right block located adjacent to top right of the current block; a prediction motion vector generation unit which generates a spatial prediction vector of the current block, using a motion vector other than the motion vector of the top right block which is prohibited from being used by the adjacent motion vector information setting unit, with a motion vector of a spatial adjacent block located adjacent to the current block in terms of space being as a target; and a motion vector encoding unit which encodes the motion vector of the current block, using the prediction motion vector of the current block.

(12) The image processing apparatus according to (11) described above, wherein the prediction motion vector generation unit performs, with pipeline, generation processing of the spatial prediction vector with respect to the current block and generation processing of a spatial prediction vector with respect to a block subsequent to the current block in scan order.

(13) The image processing apparatus according to (11) or (12) described above, wherein the prediction motion vector generation unit generates the spatial prediction vector of the current block, using a motion vector of a first block which is a spatial adjacent block of the current block and which is located at a right end with a top block in surface contact with a top of the current block being as a target.

(14) The image processing apparatus according to (11) or (12) described above, wherein the prediction motion vector generation unit generates the spatial prediction vector of the current block, using a motion vector of a first block which is a spatial adjacent block of the current block and which is located at a right end with a top block in surface contact with a top of the current block being as a target, and a motion vector of a second block other than the first block with the top block being as a target.

(15) The image processing apparatus according to (14) described above, wherein the second block is a block which is located adjacent to left of the first block with the top block being as a target.

(16) The image processing apparatus according to (14) described above, wherein the second block is a block which is located around a center of a length in a horizontal direction of the current block with the top block being as a target.

(17) The image processing apparatus according to any one of (11) to (16) described above, wherein the adjacent motion vector information setting unit prohibits the use of the motion vector of the top right block in a maximum encoding unit.

(18) The image processing apparatus according to (17) described above further including a border determination unit which determines whether a border of the current block is a border of the maximum encoding unit, wherein the adjacent motion vector information setting unit prohibits the use of the motion vector of the top right block only when the border determination unit determines that the border of the current block is the border of the maximum encoding unit.

(19) The image processing apparatus according to (17) described above further including an identification information setting unit which sets identification information for identifying whether the use of the motion vector of the top right block is prohibited in a prediction unit or the use of the motion vector of the top right block is prohibited in the maximum encoding unit; and a transmission unit which transmits the identification information, which is set by the identification information setting unit, and a coded stream.

(20) An image processing method, wherein when a spatial prediction motion vector is generated with a prediction motion vector used for encoding of a motion vector of a current block of an image being as a target, an image processing apparatus prohibits use of a motion vector of a top right block located adjacent to top right of the current block; generates a spatial prediction vector of the current block, using a motion vector other than the motion vector of the top right block which is prohibited from being used, with a motion vector of a spatial adjacent block located adjacent to the current block in terms of space being as a target; and encodes the motion vector of the current block, using the prediction motion vector of the current block.

REFERENCE SIGNS LIST

100 Image coding device
106 Lossless coding unit
115 Motion prediction/compensation unit
121 Motion vector encoding unit
122 Adjacent motion vector information setting unit
131, 131-1, 131-2 Motion vector encoding unit
132 Temporal adjacent motion vector shared buffer
133 Spatial adjacent motion vector shared buffer
141, 141-1, 141-2 Spatial adjacent motion vector internal buffer
142, 142-1, 142-2 Candidate prediction motion vector generation unit
143, 143-1, 143-2 Cost function value calculation unit
144, 144-1, 144-2 Optimum prediction motion vector determination unit
200 Image decoding device
202 Lossless decoding unit

212 Motion prediction/compensation unit
221 Motion vector decoding unit
222 Adjacent motion vector information setting unit
231, 231-1, 231-2 Motion vector encoding unit
232 Temporal adjacent motion vector shared buffer
233 Spatial adjacent motion vector shared buffer
241, 241-1, 241-2 Prediction motion vector information buffer
242, 242-1, 242-2 Difference motion vector information buffer
243, 243-1, 243-2 Prediction motion vector re-structuring unit
244, 244-1, 244-2 Motion vector re-structuring unit
245, 245-1, 245-2 Spatial adjacent motion vector buffer
The invention claimed is:

1. An image processing apparatus comprising:
a circuitry configured to:
    set identification information for identifying whether or not to use merge mode for candidates of prediction motion vector;
    prohibit use of a motion vector of a top right block located adjacent to top right of a current block as one of the candidates of prediction motion vector of the merge mode based on the set identification information;
    generate a spatial prediction vector of the current block, using as one of the candidates of the prediction motion vector of the merge mode a motion vector adjacent in terms of space to the current block other than the motion vector of the top right block which is prohibited from being used, and set an index of the spatial prediction vector; and
    encode the motion vector of the current block, using the spatial prediction vector as a prediction motion vector of the current block,
wherein the identification information is set in a unit in which control is to be performed,
wherein the circuitry is further configured to:
    prohibit the use of the motion vector of the top right block in a maximum encoding unit;
    determine whether a border of the current block is a border of the maximum encoding unit; and
    prohibit the use of the motion vector of the top right block when the circuitry determines that the border of the current block is the border of the maximum encoding unit.

2. The image processing apparatus according to claim 1, wherein the circuitry is further configured to transmit a coded stream including the encoded motion vector.

3. The image processing apparatus according to claim 2, wherein the circuitry is further configured to transmit prediction mode information that is included in the coded stream.

4. The image processing apparatus according to claim 1, wherein the circuitry is further configured to perform generation processing of the spatial prediction vector with respect to the current block and generation processing of a spatial prediction vector with respect to a block subsequent to the current block in scan order.

5. The image processing apparatus according to claim 4, wherein the circuitry is further configured to generate the spatial prediction vector of the current block, using a motion vector of a first block which is a spatial adjacent block of the current block and which is located at a right end with a top block in surface contact with a top of the current block being as a target, and a motion vector of a second block other than the first block.

6. The image processing apparatus according to claim 1, wherein the identification information is set in a picture parameter set based on the control to be performed in a picture unit at an encoding side,
wherein the identification information is set in a slice header based on the control to be performed in a slice unit, and
wherein the identification information is set in a sequence parameter set based on the control to be performed in a sequence unit.

7. An image processing method comprising:
setting identification information for identifying whether or not to use merge mode for candidates of prediction motion vector;
prohibiting use of a motion vector of a top right block located adjacent to top right of a current block as one of the candidates of prediction motion vector of the merge mode based on the set identification information;
generating a spatial prediction vector of the current block, using as one of the candidates of the prediction motion vector of the merge mode a motion vector adjacent in terms of space to the current block other than the motion vector of the top right block which is prohibited from being used, and setting an index of the spatial prediction vector;
encoding the motion vector of the current block, using the spatial prediction vector as a prediction motion vector of the current block, wherein the identification information is set in a unit in which control is to be performed;
prohibiting the use of the motion vector of the top right block in a maximum encoding unit;
determining whether a border of the current block is a border of the maximum encoding unit; and
prohibiting the use of the motion vector of the top right block when it is determined that the border of the current block is the border of the maximum encoding unit.

8. An image processing apparatus comprising:
a circuitry configured to:
    prohibit use of a motion vector of a top right block located adjacent to top right of a current block as one of candidates of prediction motion vector of merge mode based on identification information for identifying whether or not to use the merge mode for the candidates of prediction motion vector;
    generate a spatial prediction vector of the current block, using as one of the candidates of the prediction motion vector of the merge mode a motion vector adjacent in terms of space to the current block other than the motion vector of the top right block which is prohibited from being used and an index of the spatial prediction vector;
    decode a motion vector of the current block, using the spatial prediction vector as a prediction motion vector of the current block;
    prohibit the use of the motion vector of the top right block in a maximum encoding unit;
    determine whether a border of the current block is a border of the maximum encoding unit; and
    prohibit the use of the motion vector of the top right block when the circuitry determines that the border of the current block is the border of the maximum encoding unit.

9. An image encoding method comprising:
prohibiting use of a motion vector of a top right block located adjacent to top right of a current block as one of candidates of prediction motion vector of merge mode based on identification information for identifying whether or not to use the merge mode for the candidates of prediction motion vector;

generating a spatial prediction vector of the current block, using as one of the candidates of the prediction motion vector of the merge mode a motion vector adjacent in terms of space to the current block other than the motion vector of the top right block which is prohibited from being used and an index of the spatial prediction vector;

decoding a motion vector of the current block, using the spatial prediction vector as a prediction motion vector of the current block;

prohibiting the use of the motion vector of the top right block in a maximum encoding unit;

determining whether a border of the current block is a border of the maximum encoding unit; and prohibiting the use of the motion vector of the top right block when it is determined that the border of the current block is the border of the maximum encoding unit.

* * * * *